United States Patent
Walker et al.

(10) Patent No.: US 8,790,187 B2
(45) Date of Patent: Jul. 29, 2014

(54) METHODS AND SYSTEMS FOR REPLAYING A PLAYER'S EXPERIENCE IN A CASINO ENVIRONMENT

(75) Inventors: Jay S. Walker, Ridgefield, CT (US); James A. Jorasch, New York, NY (US); Robert C. Tedesco, Huntington, CT (US); Daniel E. Tedesco, Huntington, CT (US); Geoffrey M. Gelman, Boston, MA (US); Magdalena M. Fincham, Ridgefield, CT (US)

(73) Assignee: IGT, Las Vegas, NV (US)

( * ) Notice: Subject to any disclaimer, the term of this patent is extended or adjusted under 35 U.S.C. 154(b) by 1457 days.

(21) Appl. No.: 12/104,155

(22) Filed: Apr. 16, 2008

(65) Prior Publication Data

US 2008/0274808 A1    Nov. 6, 2008

Related U.S. Application Data

(63) Continuation of application No. 10/946,496, filed on Sep. 21, 2004, now abandoned, which is a continuation-in-part of application No. 10/176,765, filed on Jun. 20, 2002, now abandoned.

(60) Provisional application No. 60/504,880, filed on Sep. 22, 2003, provisional application No. 60/299,870, filed on Jun. 21, 2001.

(51) Int. Cl.
*A63F 9/24* (2006.01)

(52) U.S. Cl.
USPC .............. 463/43; 463/16; 463/20; 463/42; 463/1

(58) Field of Classification Search
USPC ......... 463/1, 9–13, 16, 25, 29, 36–38, 39–43, 463/46, 47, 20, 34; 273/138.1, 274; 365/201, 244
See application file for complete search history.

(56) References Cited

U.S. PATENT DOCUMENTS

| | | |
|---|---|---|
| 4,760,245 A | 7/1988 | Fukaya |
| 4,948,138 A | 8/1990 | Pease et al. |
| 5,127,651 A | 7/1992 | Okada |
| 5,259,613 A | 11/1993 | Marnell, II |

(Continued)

OTHER PUBLICATIONS

Office Action for U.S. Appl. No. 10/946,496 dated Jun. 23, 2010.

(Continued)

*Primary Examiner* — David L Lewis
*Assistant Examiner* — Chase Leichliter
(74) *Attorney, Agent, or Firm* — Neal, Gerber & Eisenberg LLP

(57) ABSTRACT

A method and system is provided wherein an event experienced by a player is documented and the documentation of the event is stored (e.g., in association with an indication of the event). One example of an event experienced by a player is an outcome obtained by a player on a gaming device. In such an embodiment the documentation of the event may comprise an image of the player's reaction to the outcome and/or a still or video image of the outcome. In accordance with some embodiments of the present invention a player may subsequently access (e.g., purchase) an output of the documentation. In one embodiment an outcome of a prior game play that was documented is replayed. When the outcome of the prior game play is output, the outcome may be output in a manner that indicates to a viewer that the outcome is an outcome of a prior game play and not an outcome of a current game play.

42 Claims, 12 Drawing Sheets

(56) References Cited

U.S. PATENT DOCUMENTS

| | | | |
|---|---|---|---|
| 5,397,125 A | 3/1995 | Adams | |
| 5,505,461 A | 4/1996 | Bell et al. | |
| 5,526,041 A | 6/1996 | Glatt | |
| 5,539,454 A | 7/1996 | Williams | |
| 5,558,339 A * | 9/1996 | Perlman | 463/42 |
| 5,613,912 A | 3/1997 | Slater | |
| 5,751,346 A | 5/1998 | Dozier et al. | |
| 5,770,533 A | 6/1998 | Franchi | |
| 5,772,509 A | 6/1998 | Weiss | |
| RE35,864 E | 7/1998 | Weingardt | |
| 5,801,766 A | 9/1998 | Alden | |
| 5,971,271 A | 10/1999 | Wynn et al. | |
| 5,984,780 A | 11/1999 | Takemoto et al. | |
| 6,142,876 A | 11/2000 | Cumbers | |
| 6,224,485 B1 | 5/2001 | Dickinson et al. | |
| 6,231,443 B1 * | 5/2001 | Asai et al. | 463/32 |
| 6,336,865 B1 * | 1/2002 | Kinjo | 463/34 |
| 6,350,199 B1 | 2/2002 | Williams et al. | |
| 6,368,216 B1 | 4/2002 | Hedrick et al. | |
| 6,508,709 B1 | 1/2003 | Karmarkar | |
| 6,575,834 B1 | 6/2003 | Lindo | |
| 6,699,127 B1 * | 3/2004 | Lobb et al. | 463/43 |
| 6,780,106 B2 * | 8/2004 | DeMar et al. | 463/16 |
| 6,863,608 B1 * | 3/2005 | LeMay et al. | 463/24 |
| 6,918,831 B2 | 7/2005 | Nguyen et al. | |
| 7,048,630 B2 * | 5/2006 | Berg et al. | 463/30 |
| 7,322,887 B2 | 1/2008 | Belger et al. | |
| 7,384,339 B2 * | 6/2008 | LeMay et al. | 463/30 |
| 7,572,183 B2 | 8/2009 | Olivas et al. | |
| 7,722,460 B2 | 5/2010 | Walker et al. | |
| 7,753,789 B2 | 7/2010 | Walker et al. | |
| 7,993,195 B2 | 8/2011 | Belger et al. | |
| 7,997,974 B2 | 8/2011 | Walker et al. | |
| 2002/0196342 A1 * | 12/2002 | Walker et al. | 348/157 |
| 2003/0027632 A1 | 2/2003 | Sines et al. | |
| 2003/0157985 A1 | 8/2003 | Shteyn | |
| 2006/0111171 A1 | 5/2006 | Berg et al. | |
| 2010/0124973 A1 | 5/2010 | De Waal et al. | |
| 2010/0227683 A1 | 9/2010 | Walker et al. | |
| 2011/0124402 A1 | 5/2011 | De Waal et al. | |
| 2011/0256923 A1 | 10/2011 | Walker et al. | |
| 2011/0263315 A1 | 10/2011 | Belger et al. | |

OTHER PUBLICATIONS

Sher, Hanan, "The Big Picture," The Jerusalem Report, Jul. 31, 2000, p. 36.

"Dave & Buster's Video Gameland Beckons Grown-up and Kids Alike," Pittsburgh Post-Gazette, Aug. 18, 2000, Section: Arts & Entertainment, p. W-1.

Kelsey, Dick, "NJ Lawmakers Consider Online Casino Gambling Bill," Newsbytes, Jan. 28, 2001.

"Remote heartbeat monitor unveiled," NewScientist.com, Jan. 28, 2002, (http//www.newscientist.com/news/newsjsp?id=ns99991827).

Website: "ImageID—Security," (http//www.imageid.com/po-security.html), download date: May 29, 2002.

Website: "Megaluck and Megabucks," (http//www.gamblingmagazine.com/articles/31/31-05.htm), download date: Jun. 25, 2003.

* cited by examiner

| PLAYER IDENTIFIER 305 | NAME 310 | CONTACT INFORMATION 315 | PAYMENT INFORMATION 320 | PLAYER IMAGE FILE NAME 325 | DOCUMENTATION PACKAGE IDENTIFIER 330 | ASSOCIATED PERSON IDENTIFIER 335 | DOCUMENTED DATA 340 |
|---|---|---|---|---|---|---|---|
| P-123-45678 | JOHN SMITH | JSMITH@ AOL.COM | VISA 2222-1111-3333-4444 | 12345678.PDF | B | P-678-90123 | [JACKPOT.JPG] |
| P-234-56789 | ANN BROWN | ABROWN @MAIL.COM; (444) 555-6666 | ACCOUNT # 666-22-1111, BIG BANK, BIG CITY, USA | 23456789.PDF | - | P-901-23456; P-123-45678; P-012-34567 | [BONUS.MPG] |
| P-345-67890 | MARY JONES | 3 MAIN ST. SMALL TOWN, USA | - | - | | - | FILEPATH: C:/7-7.EXE |

| DEVICE IDENTIFIER 405 | DEVICE TYPE 410 | DEVICE LOCATION 415 | DEVICE STATUS 420 |
|---|---|---|---|
| D12345 | EVENT DETECTION DEVICE | CASINO 1, AREA B, 3RD QUADRANT | AVAILABLE |
| D23456 | DOCUMENTING DEVICE | CASINO 1, AREA B, 3RD QUADRANT | AVAILABLE |
| D34567 | SLOT MACHINE | CASINO 3, AREA A, 4TH QUADRANT | OFF-LINE |
| D45678 | CAMERA | CASINO 2, AREA 2, 2ND QUADRANT | LOCKED |
| D56789 | MICROPHONE; SPEAKER | CASINO 2, AREA 2, 3RD QUADRANT | IN USE |

| CAMERA IDENTIFIER 455 | CAMERA COVERAGE DESCRIPTION 460 | CAMERA STATUS 465 | ASSOCIATED GAMING DEVICE(S) 470 |
|---|---|---|---|
| C-1-234-55 | AREA A, CASINO 3, 4TH QUADRANT | AVAILABLE | G-10-5349; G-12-8912; G-10-1035; G-18-5511; G-12-8912 |
| C-1-345-66 | CASINO 2, TABLE 182 | OFF-LINE | , |
| C-2-345-88 | CASINO 3, ENTRANCE, AREA B, 1ST QUADRANT | LOCKED | G-10-1099; G-10-5349; G-70-5111; G-12-3310 |
| C-2-456-77 | CASINO 2, AREA B, 2ND QUADRANT | IN USE | G-10-5342 |

450 ← (table reference)

475 → (row 1), 480 → (row 2), 485 → (row 3), 490 → (row 4)

FIG. 4B

| EVENT IDENTIFIER 605 | EVENT DESCRIPTION 610 | DOCUMENTATION TYPE 615 | DOCUMENTATION RULE(S) 620 |
|---|---|---|---|
| E-12345 | PLAYER OBTAINS OUTCOME THAT CORRESPONDS TO PAYOUT > $50 | GRAPHICAL DATA: IMAGE OF PLAYER | CAPTURE IMAGE OF PLAYER'S EXPRESSION; START 2 SEC. BEFORE OUTCOME DISPLAY AND END... |
| E-23456 | PLAYER LOSES ALL CHIPS AT ROULETTE TABLE | GRAPHICAL DATA: IMAGE OF PLAYER AUDIO DATA: SOUND OF DEALER ANNOUNCING GAME RESULT | CAPTURE DATA IF PLAYER IS NOT A REGULAR PLAYER |
| E-34567 | PLAYER WINS JACKPOT ON GAME X | GRAPHICAL DATA: IMAGE OF PERSONS FACING PLAYER AND WITHIN 10' OF PLAYER | CAPTURE IMAGE OF PERSONS STARTING WHEN GAME THEME SONG STARTS AND ENDING AFTER... |
| E-5678 | PLAYER PARTICIPATES IN SIMULATED RIDE | GRAPHICAL DATA: CAPTURE IMAGE OF PLAYER AND PLAYER'S COMPANION DURING PORTION X OF RIDE | ONLY CAPTURE IF PLAYER HAS NOT PARTICIPATED IN RIDE WITHIN THE LAST 90 DAYS |
| E-6789 | PLAYER HAS DINNER AT RESTAURANT Z | TEXTUAL DATA: CAPTURE DESCRIPTION OF MENU ITEMS ORDERED | ONLY CAPTURE IF PLAYER HAS EATEN AT RESTAURANT < 5 TIMES WITHIN 90 DAYS AND DOES NOT... |

FIG. 6A

| OUTCOME IDENTIFIER 655 | OUTCOME 660 | DOCUMENTATION TYPE 665 | DOCUMENTATION RULE(S) 670 |
|---|---|---|---|
| O-123,456 | ANY OUTCOME THAT CORRESPONDS TO A PAYOUT ≥ $50 | GRAPHICAL DATA: IMAGE OF PLAYER REACTION TO DISPLAY OF OUTCOME | START CAPTURING IMAGE 1 SEC. BEFORE OUTCOME DISPLAY AND END 2 SEC. AFTER OUTCOME DISPLAY |
| O-234,567 | OUTCOME THAT QUALIFIES PLAYER FOR $1M BONUS ROUND | GRAPHICAL DATA: IMAGE OF PLAYER REACTION TO DISPLAY OF OUTCOME | CAPTURE IMAGE AT MOMENT WHEN LAST SYMBOL OF OUTCOME IS DISPLAYED ALONG PAYLINE |
| O-345,678 | ANY FINAL HAND THAT IS NOT A FLUSH | GRAPHICAL DATA: IMAGE OF PLAYER REACTION TO DISPLAY OF FINAL HAND | ONLY CAPTURE IF INITIAL HAND WAS FOUR CARDS TO A FLUSH |
| O-456,789 | FINAL HAND IS A ROYAL FLUSH | GRAPHICAL DATA: CAPTURE IMAGE OF PLAYER AND OF ANY PERSON LOOKING OVER PLAYER'S SHOULDER | ONLY CAPTURE IF INITIAL HAND DID NOT CONTAIN ANY CARDS TOWARD A ROYAL FLUSH |
| O-567,891 | OUTCOME THAT CORRESPONDS TO JACKPOT ≥ $10,000 | GRAPHICAL DATA: IMAGE OF PLAYER SPOUSE, AUDIO DATA: REACTION OF PLAYER TO OUTCOME DISPLAY | ONLY CAPTURE GRAPHICAL DATA IF SPOUSE OF PLAYER KNOWN AND PRESENT IN KNOWN LOCATION |

| DOCUMENTATION PACKAGE IDENTIFIER 705 | PACKAGE PRICE 710 | DOCUMENTATION RULES 715 | INCLUDED IN OUTPUT 720 | PACKAGE OUTPUT TYPE 725 |
|---|---|---|---|---|
| TDP-101-22 | $35.00 | DOCUMENT: REACTION OF PLAYER AND ALL OTHER PERSONS AT ALL TABLE GAMES; UPON PLAYER REQUEST | UP TO 1 HOUR OF VIDEO | VHS VIDEO TAPE |
| TDP-505-33 | $75.00 | DOCUMENT: 2 DINING EXPERIENCES; REACTION TO ALL OUTCOMES MATCHING PREDETERMINED OUTCOMES; 2 SHOW EXPERIENCES... | UP TO: 25 STILL IMAGES; 3 MINS. OF AUDIO/VIDEO; 500 WORDS OF TEXT DATA | ACCESS TO PERSONALIZED WEB PAGE OF IMAGES |
| TDP-606-88 | $3.00 | DOCUMENT PLAYER'S REACTION TO ANY OUTCOME CORRESPONDING TO PAYOUT ≥ $500 | UP TO 2 MINS. OF AUDIO/VIDEO DATA | CD-ROM |
| TDP-909-11 | $20.00 + $0.50 FOR EACH EXTRA IMAGE | DOCUMENT PLAYER'S REACTION TO: ANY OUTCOME THAT DEPLETES CREDIT BALANCE TO 0; ANY PAYOUT ≥ $50 | 15 STILL PHOTOGRAPHS AND CORRESPONDING INDICATIONS OF EVENTS, WITH TEXT ANNOTATIONS | SCRAPBOOK |

FIG. 7

METHODS AND SYSTEMS FOR REPLAYING A PLAYER'S EXPERIENCE IN A CASINO ENVIRONMENT

This application is a continuation of U.S. patent application Ser. No. 10/946,496, filed on Sep. 21, 2004 now abandoned in the name of Walker et al. and entitled METHODS AND SYSTEMS FOR REPLAYING A PLAYER'S EXPERIENCE IN A CASINO ENVIRONMENT; which claims the benefit of provisional application Ser. No. 60/504,880, filed Sep. 22, 2003 in the name of Walker et al. and entitled SYSTEM AND METHOD FOR STORING AND DISPLAYING GAME DATA, and which is a continuation-in-part application of U.S. application Ser. No. 10/176,765, filed Jun. 20, 2002 now abandoned in the name of Walker et al. and entitled METHODS AND SYSTEMS FOR DOCUMENTING A PLAYER'S EXPERIENCE IN A CASINO ENVIRONMENT, which Application claims the benefit of provisional patent application Ser. No. 60/299,870, filed Jun. 21, 2001, entitled "POST TRIP EXPERIENCE". The entire content of each of these applications is incorporated by reference herein for all purposes.

CROSS-REFERENCE TO RELATED APPLICATIONS

This application is related to the following co-pending, commonly-owned U.S. Patent Applications:

(i) U.S. Patent Application Ser. No. 60/298,482, entitled METHOD AND APPARATUS FOR PLANNING AND CUSTOMIZING A GAMING EXPERIENCE, filed Jun. 15, 2002 in the name of Walker et al., and which claims the benefit of U.S. Provisional Application No. 60/298,482, which was filed Jun. 15, 2001;

(ii) U.S. patent application Ser. No. 10/121,263, entitled METHOD AND APPARATUS FOR REMOTELY CUSTOMIZING A GAMING DEVICE, and filed Apr. 11, 2002 in the name of Walker et al., which claims the benefit of U.S. Provisional Application No. 60/283,086, filed Apr. 11, 2001; and (iii) U.S. patent application Ser. No. 10/001,089, entitled GAMING DEVICE FOR A FLAT RATE PLAY SESSION AND METHOD OF OPERATING SAME, and filed Nov. 2, 2001 in the name of Walker et al., which claims the benefit of U.S. Provisional Application No. 60/282,792, entitled GAMING CONTRACTS and filed Apr. 11, 2001, and which is a Continuation-In-Part Application of U.S. patent application Ser. No. 09/518,760, entitled GAMING DEVICE FOR A FLAT RATE PLAY SESSION AND A METHOD OF OPERATING SAME and filed Mar. 3, 2000, which in turn a Continuation Application of U.S. patent application Ser. No. 08/880,838, entitled GAMING DEVICE FOR A FLAT RATE PLAY SESSION AND A METHOD OF OPERATING SAME and filed Jun. 23, 1997.

The entire content of each of the above Applications is incorporated by reference herein for all purposes.

BACKGROUND

Gaming devices (e.g., reeled slot machines or video poker machines) generate more than $15 billion per year in revenue for casinos in the United States alone. This figure accounts for more than half of the gaming revenue for a typical U.S. casino; additionally, high levels of popularity and revenue characterize gaming devices in establishments throughout Europe and Australia. Accordingly, casino operators are interested in increasing the enjoyment of playing slot machines.

Further, it would be beneficial to a casino to identify and implement new methods of encouraging a player already present in the casino to extend the duration of the player's visit at the casino or to return to the casino, and/or of encouraging other persons to visit the casino. This would, in many circumstances, maximize existing sources of the casino's revenue. Although casinos spend a great deal of money on advertising, some of the most effective advertising is learning about an exciting experience of a friend or family member at a casino. Additionally, the memory of a prior good experience at a casino is an effective incentive for a player to re-visit a casino. Prior to Applicants' prior invention, disclosed in application Ser. No. 10/176,765, no effective method existed for casinos to actively leverage such advertising opportunities.

A need exists to further enhance Applicants' previously invented methods of leveraging advertising opportunities for a casino, enhancing a player's enjoyment of playing gaming devices in a casino, as well as to identify and/or create new sources of revenue for a casino and to maximize existing sources of revenue for a casino.

BRIEF DESCRIPTION OF THE FIGURES

FIG. 3 is a table illustrating an exemplary data structure of a player database;

FIG. 4A is a table illustrating an exemplary data structure of a device database;

FIG. 4B is a table illustrating another exemplary data structure of a device database;

FIG. 6A is a table illustrating an exemplary data structure of a predetermined event database;

FIG. 6B is a table illustrating another exemplary data structure of a predetermined event database;

FIG. 7 is a table illustrating an exemplary data structure of a documentation package database;

DETAILED DESCRIPTION

Figure 1:
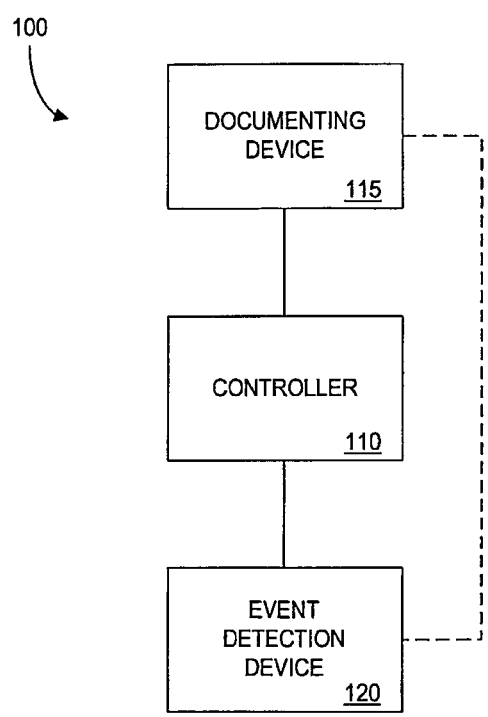
FIG. 1 is a block diagram of an embodiment of a system consistent with the present invention.

Applicants have recognized that, in some situations, documenting experiences of a player visiting a casino and providing the player with the documentation, e.g., in exchange for payment or other consideration, may be an effective method of enhancing the player's visit. The player may be encouraged, by the documentation, to extend the duration of the visit and/or make a return visit. For example, a player may be more likely to remain in a particular casino to play slot machines if the player is aware that the casino is documenting notable outcomes the player has obtained while playing the slot machine and/or his reactions to such particularly notable outcomes. A player may further be motivated to visit, remain in or return to a particular casino if the player will have the opportunity to review such documented outcomes and/or reactions. For example, a player may be more likely to remain in a particular casino or return to the casino if the player can replay a memorable outcome or other event the player previously experienced at the casino via a device of the casino. Further, viewing the documentation at a subsequent time (e.g., once the player returns home from his visit) will return the player's thoughts to the casino and is likely to encourage the player to return to the casino. Moreover, viewing documentation of a positive experience will serve to reinforce the player's positive experience at the casino.

Applicants have also recognized that, in some situations, providing the documentation of a player's experiences at a casino to the player in a manner that allows the player to share the experiences with friends and/or family (e.g. after the player returns home from the casino or while the player is at the casino) may be an effective manner of encouraging the friends and/or family to patronize the casino. For example, as the player that had visited the casino shows a video clip of his experience at the casino to his friends or family the player is effectively advertising the casino to the friends and family as a place where someone they know had a good time. Similarly, as a player who has obtained a high payout via a gaming device of the casino shows a video clip of the payout-winning outcome to a friend (e.g., by having the video clip played on the gaming device via which the payout-winning outcome was obtained), the player is effectively tempting the friend to try his luck and play in an attempt to obtain a payout-winning outcome. Showing documentation of a winning outcome to a friend illustrates to the friend that "dreams can come true", that winning outcomes or jackpots are attainable and realistic to expect. This is important positive reinforcement for the friend, since statistically many players do not obtain winning payouts and may thus be discouraged from playing.

Applicants have also recognized that, in some situations, selling such documentation to a player is an additional source of revenue to the casino. Further, since such documentation, in accordance with some embodiments, may be performed using existing infrastructure of a casino, such additional revenue may be derived without the accruement of excessive costs of implementation by the casino. For example, casinos have an extensive array of video cameras capturing images of persons in various areas of the casino. Also, some slot machines are equipped with image capturing devices that are capable of capturing an image of a player playing the slot machine. However, heretofore casinos have not effectively leveraged such capabilities to obtain additional sources of revenue or to maximize existing sources of revenue in a manner envisioned by Applicants.

In one embodiment of the present invention, an indication of an event experienced by a player is documented by determining the occurrence of the event (e.g., a player obtains an outcome on a slot machine), capturing documentation of the event (e.g., a visual or audio recording), and storing the indication of the event (e.g., a representation of the symbols comprising the outcome) and the documentation of the event in association with one another. The indication and documentation of the event may further be stored in association with an identifier that identifies the player that experienced the event (e.g., a player identifier associated with the person). The indication and documentation may then be offered for sale to the player in a form that allows the player to subsequently view and/or listen to the documentation and/or allow others to view and/or listen to the documentation (e.g., a printed photograph, access to a Web page, access to the documentation via a gaming device or kiosk located in a casino).

In another embodiment, data comprising a set of outcomes obtained on a slot machine is identified or accessed and data comprising a set of images is identified or accessed. An outcome of the set of outcomes and an image of the set of images that corresponds to the outcome are determined. The determined outcome (or an indication of the determined outcome) is then stored in association with the determined image. In one embodiment the outcome of the set of outcomes is first determined and the corresponding image from the set of images is determined based on the determined outcome. In another embodiment an image of the set of images is first determined and the corresponding outcome is determined based on the determined image.

In another embodiment the occurrence of a predetermined condition of game play at a slot machine is determined and, in response, a documenting device is caused to be focused on an area in which the slot machine is located. Documentation is captured and stored in association with a player identifier of the player playing the slot machine at a time of occurrence of the predetermined condition. The documentation may further be stored in association with the occurrence of the predetermined condition. Such an embodiment may be implemented, for example, in a casino that has a plurality of image capturing devices located throughout the casino, each capturing an area of the casino and being capable of focusing on a different area of the casino.

In another embodiment, an occurrence of a predetermined condition of game play at a slot machine is identified and, in response, an image is selected from a plurality of images that each correspond to a respective image capturing device. The selected image is then stored in association with a player identifier of a player playing the slot machine at a time of the occurrence of the predetermined condition. The selected image may further be stored in association with an indication of the occurrence of the predetermined condition. This embodiment may be implemented, for example, in a casino that continuously has at least one image capturing device focused and capturing images of an area of the casino, such that images depicting the entirety (or a substantial portion) of the casino are being continuously captured. This embodiment may also be implemented, for example, in a casino where more than one gaming device is equipped with an image capturing device that is operable to capture images of persons in the area of the gaming device (e.g., the player playing the gaming device or a person standing near the gaming device).

In yet another embodiment, the occurrence of a predetermined condition of game play at a slot machine is identified and, in response, a portion of an image captured by an image capturing device is selected. The image may comprise an image that was captured at substantially the same time as a time at which the predetermined condition of game play occurred. For example, the image may have been captured in a period of time that begins three (3) seconds before the occurrence of the condition and ends five (5) seconds after the occurrence of the condition. Such a period of time may be selected based on what a sufficient time to capture a reaction of a person to the occurrence of the condition. For example, such a period may comprise a period of time from a time just before the person is aware of the condition to a time the reaction of the person is leveling off or the person is returning to a state similar to the state the person was in before he became aware of the occurrence of the condition. This embodiment may be implemented, for example, in a casino that has at least one camera that is capturing an image of a fairly large area of the casino and that may use software to bring into focus or enlarge a particular portion of an image that had been captured.

In accordance with one embodiment, a method comprises determining data associated with a game play that had occurred at a gaming device at a time prior to a current time, the data thereby being associated with a prior game play and outputting the data via a device. The output data is output in a manner that indicates to a viewer of the data that the data is associated with the prior game play and not a current game play.

For example, outputting the data via a device may comprise the output data being altered from an original version in a manner that indicates to a viewer of the data that the data is associated with the prior game play and not a current game play. In one embodiment, the device via which the data is output comprises the gaming device at which the prior game play occurred. In another embodiment, the device via which the data is output comprises a gaming device different from the gaming device at which the prior game play occurred. Outputting the data via a gaming device may comprise, for example, outputting the data via a primary and/or secondary display device of the gaming device. In still another embodiment, the device via which the data is output comprises a device other than a gaming device, such as a kiosk.

In accordance with one embodiment, the method may comprise additional steps, such as determining a payout, if any, that corresponds to the outcome and not outputting the payout, the payout having been output during the prior game play.

In one embodiment, the method may comprise altering the data and/or altering a setting of a device via which the data is output. For example, the data may be output in a form that is altered by adjusting at least one of a shade or contrast of visual data from a shade or contrast in which the visual data was originally output. In another example, the data is output in a form that is altered by including a text indication that the data is being replayed from a prior game play. In yet another example, the data is output in a form that is altered by an inclusion of an indication of a time at which the prior game play occurred.

In one embodiment, the data may be output in response to a request for an output of the data. In another embodiment, the data may be output while a status of a device is a predetermined status. For example, the data may be output via a gaming device while a gaming device is idle, such as during an "attract mode" of a gaming device. For example, the data may be output while the gaming device is not being used or once the gaming device has not been used for a predetermined period of time. In another example, data associated with a prior game play may be output shortly after the game play has concluded.

In one embodiment, the data may not be output unless a precondition for outputting the data is satisfied. Examples of preconditions for outputting the data include, but are not limited to: (i) a receipt of payment for the output of the data; (ii) a receipt of an identifier associated with the data; (iii) a status of gaming activity associated with a player who is requesting the output; (iv) a status of gaming activity associated with the device via which the data is to be output; (v) an agreement by a player to an obligation in exchange for the output of the data; (vi) an identity of the device via which the data is to be output; (vii) a time (e.g., a time of day, week, month and/or year); (viii) a characteristic of a player requesting the output of the data; (ix) an identity of a player requesting the output of the data; and (x) an obtainment of a predetermined outcome or payout during a game play.

In one embodiment a method may comprise retrieving the data from memory, the data having been stored substantially at the time of the prior game play. For example, the data may comprise graphical data representing an outcome generated during the prior game play. In such an example, outputting the data may comprise outputting the graphical data.

In one embodiment, a method may comprise determining an indication of the data to be output, the indication having been stored substantially at the time of the prior game play, wherein the data may comprise an outcome generated during the prior game. For example, outputting the data may comprise causing the outcome to be regenerated and displayed by a gaming device. For example, causing the outcome to be regenerated and displayed may comprise directing a processor of a gaming device to display the outcome.

In one embodiment, a system may comprise a controller operable to communicate with a plurality of gaming devices, each gaming device being operable to output an outcome of a game in response to a paid play. The controller may further be operable to determine data associated with a prior game play at a gaming device and cause the data to be output via a device. The output data may be output in a manner that indicates to a viewer of the data that the data is associated with the prior game play and not a current game play. In one embodiment the controller may further be operable to alter the data such that the output data indicates to a viewer of the data that the data is associated with the prior game play and not a current game play.

In one embodiment, the data comprises a documentation of a person's reaction to an outcome obtained during a prior game play (e.g., a reaction of a player who was participating in the game play). In another embodiment, the data may comprise data indicative of at least one circumstance surrounding an occurrence of an outcome during the prior game play. In yet another embodiment, the data may comprise the outcome or an indication of the outcome obtained during the prior game play.

In one embodiment, the controller may further be operable to determine a request to view the data. For example, the request may include an identifier and the controller may be operable to retrieve the data from a memory based on the identifier. The controller may further be operable to transmit the data to a device (e.g., a gaming device), direct the device to output the data, and/or provide to the device access to the data.

In one embodiment, an apparatus comprises a processor operable to communicate with a memory, the memory storing data associated with a prior game play at a gaming device. The processor may further be operable to determine the data and cause the data to be output via a device. The output data may be output in a manner that indicates to a viewer of the data that the data is associated with the prior game play and not a current game play. In one embodiment the apparatus may further be operable to cause the data to be output via a device, the output data being altered in a manner that indicates to a viewer of the data that the data is associated with the prior game play and not a current game play.

In accordance with one embodiment, a method comprises displaying, via a display of a slot machine, an outcome of a prior game play, the outcome having been generated during the prior game play based on a random number and the outcome being currently displayed in response to a player's request for an output of the outcome.

In accordance with one embodiment, a slot machine comprises a processor for directing operation of the slot machine, the processor being operable to: (i) determine an outcome of a prior game play based on an indication of the outcome stored in a memory accessible to the processor and not on a random number generated by a random number generator; and (ii) display the outcome of the prior game play in a manner that conveys to a viewer that the outcome is an outcome of the prior game play and not an outcome of a current game play.

In accordance with one embodiment, a system comprises (i) a controller operative to communicate with a plurality of slot machines, and (ii) the plurality of slot machines. At least one of the plurality of slot machines may comprise a processor operable to (i) determine an outcome of a prior game play based on an indication of the outcome stored in a memory accessible to the processor and not on a random number generated by a random number generator; and (ii) display the outcome of the prior game play in a manner that conveys to a viewer that the outcome is an outcome of the prior game play and not an outcome of a current game play.

To help illustrate some embodiments of the present invention, a few examples follow. Such examples are presented for illustrative purposes only, are not exhaustive, and are not meant to be limiting in any fashion.

EXAMPLES

Example 1

In a first example of the present invention, assume a player named Timothy Jones enters a casino and sits down in front of a "Magic Moment" slot machine. The machine has three sets of video reels that display animated reel symbols. Timothy inserts his player tracking card, provides twenty (20) credits and initiates game play. On his third handle pull, the slot machine's processor generates a random number that corresponds to a reel outcome of "Bar-Bar-Bar".

At this point, before the reels spin, the machine's processor enables the machine's audio/video recording devices, and they proceed to capture Timothy's reaction as he watches the reels begin to resolve. Concomitantly, as Timothy views the video reels begin their animation sequence and resolve "Bar" symbols from left to right, the game machine stores the video reel animations and associated sound effects. (Both the internal and external audio/video recordings are stored on the central server's database in relation to a player identification number provided by Timothy's player tracking card.)

Timothy watches as the third and final "Bar" symbol resolves on the payline of the rightmost reel. Having glanced at a pay table illustration on the gaming machine's cabinet, Timothy begins to celebrate his big win of 1,000 credits. A casino attendant approaches Timothy and provides payout.

After being paid, Timothy, excitedly pumping his fist in the air, notices a colorful message on the gaming machine's display screen that reads, "Timothy, you've just hit it BIG! A recording of your 'Magic Moment' has been saved for you. You can view it any time you like." Timothy, feeling joyous in his moment of victory, actuates a touch-screen button with text that reads "View Now."

The slot machine plays back Timothy's memorable moment; a secondary display screen above the reels depicts a video recording of his reaction as the reels animate and resolve in the same sequence. The machine emits the same sound effects. It's just like when he hit the jackpot, except this time, the primary and secondary display areas are noticeably shaded green, and text reading "REPLAY OF TIMOTHY'S BIG WIN" flashes brightly in red, superimposed over the display areas.

The replay concludes. Timothy decides he's done playing and presses the "CASH OUT" button on the machine's keypad.

When Timothy removes his player tracking card, the gaming machine prompts him with another message: "To view your 'Magic Moment' again, return to any 'Magic Moment' slot machine, insert your player tracking card, and select the option for 'My Big Wins'. Congratulations, Timothy, and enjoy your winnings!"

Timothy cashes out, retrieves his player tracking card and leaves to inform his buddies of his big payout.

Example 2

In a second example of the present invention, assume a player named Sally Stewart visits the "Golden Grape Casino" on Aug. 1, 2003, during a vacation. She deposits ten (10) dollars into a video poker machine and begins game play. On her first hand, Sally is dealt a royal flush.

The video poker machine records and stores the animations, sound effects, audio and video associated with Sally's jackpot hand. Having won 10,000 credits on her first play, Sally, is ecstatic. She is approached by an attendant and paid.

The machine then prompts Sally with a message that reads: "Congratulations on your JACKPOT WIN! We've recorded your exciting 'Magic Moment' for you. So that you may view it at a later time, press 'YES' to sign up for your player tracking card."

Sally presses the touch-screen "YES" button, accepting the casino's criteria that she is required to accept a player tracking card before viewing her "Magic Moment."

The gaming machine then displays text that reads, "Just fill in some brief personal information so we can provide your card." Via a display area touch-screen input, Sally keys in her name, address, phone number and Social Security number.

The display then prompts, "Your card is ready, Sally!" The video poker machine then stores a database entry for Sally's memorable data.

Touch screen buttons may at this point read: "VIEW REPLAY," "CONTINUE PLAYING" and/or "QUIT."

Sally chooses to quit. The machine then dispenses a plastic player tracking card imprinted with Sally's name and a machine-readable barcode. The display reads, "Here's your card Sally! Come back any time to view your 'Magic Moment'."

A year later, on a return trip to Golden Grape, Sally, accompanied by family, approaches a video poker machine and inserts her player tracking card. The machine displays a menu offering Sally a choice between playing video poker and viewing a replay of her "Magic Moment.". Eager to remember the thrill of hitting her big jackpot, Sally chooses to review her "Magic Moment."

The gaming machine display then reads, "It costs 1 credit to view your 'Magic Moment.' Would you like to view it now?"

Sally agrees and is debited 1 credit. Sally and her family watch a video recording of her reaction on the secondary display as the cards are dealt on the primary display. On each display, once the replay begins, large, bold text reading "Aug. 1, 2003" is superimposed; additionally, audio of a voice saying "Here's a replay of your BIG WIN!" is output repeatedly by the gaming machine's speakers.

The replay concludes and Sally retrieves her player tracking card.

Example 3

In a third example of the present invention, assume a player named Mike McDonald approaches a slot machine while on vacation at "Cowboy Bill's Wild West Casino." He inserts his player tracking card, deposits credits and initiates game play.

On Mike's third spin, the gaming device internally determines an outcome of "7-7-7-7-7."

Before the reels spin, the machine's internal processes begin to record in a similar manner as described in prior examples. However, rather than capture external audio and video data by means of recording devices mounted inside or upon the machine, the machine's processor triggers the operation of two ceiling-mounted casino surveillance cameras in proximity to Mike. In this manner, when Mike jumps, cries aloud and applauds, his reaction, as well as the reactions of adjacent players, are captured from at least one wide angle.

The machine's display prompts Mike: "Outstanding! You won 5,000 credits! We'll save a recording of your 'Magic Moment' for only a $2 storage fee. Then, you can view it whenever and wherever you'd like!"

Mike selects the touch-screen button reading "SAVE," and is correspondingly debited 2 credits. Mike's memorable data is stored as a database entry related to his player identification number as provided by his player tracking card.

Mike leaves the casino and flies home. Upon returning to his workplace the following day, Mike can't conceal the excitement stemming from his big win. Pulling a few coworkers over to his desk, Mike directs the Internet browser on his computer toward the casino's Web site. Mike logs on by entering the player identification number found on his player tracking card into the appropriate field. When Mike clicks on a button labeled "View my Magic Moment," the Web site's server accesses the appropriate data.

Three adjacent windows pop up on Mike's computer screen. One box contains a graphic representation of the slot machine Mike played at the casino; the other two contain different angles of video recorded from the surveillance cameras near Mike during his memorable moment. Large text reading "REPLAY" flashes across each window on Mike's computer. The sounds of the machine and casino floor are outputted through the computer speakers as Mike and his coworkers view his "Magic Moment."

Example 4

In a fourth example of the present invention, pictures of a player are taken, via cameras positioned throughout the casino, as the player obtains particularly exciting outcomes while playing a slot machine. What comprises a particularly exciting outcome may be determined, for example, by casino personnel and stored in a database referred to by a controller (e.g., a controller may determine an outcome obtained on a gaming device and compare the obtained outcome to predetermined outcomes stored in a database to determine whether documentation is necessary). For example, as a random number is generated by a slot machine and the corresponding outcome determined (but before the outcome is displayed to the player) a camera in the vicinity of the slot machine may be directed to focus on the player if the about-to-be-displayed outcome is a winning outcome. A signal from the slot machine, indicative of the about-to-be-displayed outcome, may be transmitted from the slot machine to a computing device controlling the cameras throughout the casino. A camera may thus be directed to focus on the player and capture the reaction of the player (e.g., the player's expression) as the outcome is displayed to the player. Such a process may be repeated each time the player obtains a particularly exciting outcome. The resulting pictures, along with indications of the corresponding outcomes, can be sold to the player, e.g., in the form of a scrapbook. The player can then relive the outcomes he obtained and his reaction to them, either by himself or with friends and family. Reliving the person's experiences at the casino in such a manner may cause the player to revisit the casino and/or cause the friends or family to visit the casino in hopes that they will enjoy similar experiences. Thus, the casino maximizes existing sources of revenue by increasing the number of persons visiting the casino and spending money in the casino. Further, the casino has created an additional source of revenue (from the sale of the scrapbook) by leveraging the existing casino infrastructure (i.e., the cameras located throughout the casino) in a heretofore unknown manner.

Example 5

In a fifth example of the present invention, Applicants envision an embodiment wherein a person visiting a casino registers with the casino upon arrival and pays to have his experiences at the casino documented. In such an embodiment an image of the person may be obtained during the registration process and used to identify the person (e.g., via face recognition software) as the person gambles in the casino and participates in non-gambling activities at the casino (e.g., viewing shows, eating in restaurants, viewing art, etc.). Video footage (also referred to as video clips herein) or still photos of the person may be captured (e.g., using the cameras located throughout the casino) at various times that are deemed potentially memorable for the player. For example, a picture or video clip may be taken if a particularly expressive reaction by the player is identified. Alternatively or additionally, the player himself may indicate that he is experiencing a potentially memorable event and wishes to have it documented (e.g., by actuating a button on a gambling device or computing device available to the player for such a purpose).

In some embodiments of the present invention, documented images may be annotated (e.g., with a description of the event the player was experiencing) or otherwise altered. For example, an audio description such as "Here is John's reaction as he is picked from the audience to participate in the magic show", a text description such as "John as he places a large number of his chips on what is to be a losing hand" or a graphical representation of the winning final hand in a video poker game may be embedded in the picture or video clip, overlaid onto the picture or video clip, or appended to the picture or video clip. Documentation of an event may also be annotated with information external to the event or that takes into account data external to the event itself. For example, a representation of the player's net win/loss for a period of time (e.g., the day, the week, the visit to the casino) may be overlaid onto an image or otherwise annotated to the documentation. For example, if, at the time of occurrence of an event, the player was up $135 for the duration of his current visit to the casino, that information may be included as an annotation to the documentation of the event. In this example such data may be determined by retrieving records of the player's gambling activity at gaming devices and/or table games (e.g., that was tracked via the player's player tracking card).

In some embodiments of the present invention, data captured as documentation of an event may be altered prior to being output to a player. For example, data comprising video of an outcome or an image of an outcome obtained by a player may be captured. In such an embodiment, the data or image may be output to a player via a gaming device at a time after the game play in which the outcome is originally obtained and output to the player, such that the outcome is replayed on a gaming device. Similarly, in one embodiment an indication of an outcome may be stored (e.g., a record in a database may store an indication that a player obtained the outcome bar-bar-bar as a result of a game play). After the game play in which the outcome is obtained, the outcome indicated by the record in the database may be displayed on a gaming device in order to replay the outcome to a player.

In embodiments where an outcome is replayed for a player via a gaming device, it would be beneficial to a casino to avoid any confusion of the replayed outcome from an original outcome (e.g., to prevent a player from believing or claiming that the display of the replayed outcome, if it corresponds to a payout, entitles the player to the payout). Accordingly, the outcome when it is replayed may be output in a form that distinguishes it from an original outcome determined as a result of a game play. For example, a text message of "Replay", another symbol, graphic, message or an indication of the time at which the outcome was originally obtained may be included on the screen as the outcome is replayed. In another example, a setting of the gaming device may be adjusted such that the data depicted by the gaming device appears different from data comprising an original outcome of a current game play. For example, the replayed outcome may be shaded a different color (e.g., green) or output in a different contrast, font, style, color or on a different background than original outcomes are output. Various methods of replaying an outcome are described in detail herein.

Example 6

In a sixth example of the present invention, a picture or video clip of a player's expression may be captured as a notable outcome is displayed to the player (e.g., an outcome corresponding to a particularly large payout or final video poker hand that is a particularly unlucky result based on what the initial hand had been). This picture or video clip, with a representation of what the player had been reacting to (e.g., a representation of the symbols comprising the outcome may be embedded into the picture or video clip), may then immediately be displayed to the player and offered for sale to the player as the player is still flush with the emotion of the reaction. For example, a picture of the player's expression as the player is reacting to an outcome that corresponds to a particularly large payout with a representation of the outcome included in the picture, may be displayed on the screen of the slot machine on which the outcome had just been displayed. The picture may be presented with an offer to sell the picture to the player. The payment may be deducted from the player's balance of credits in the slot machine (e.g., if the player accepts the offer to buy the picture 3 credits may be deducted from the player's balance).

Example 7

In a seventh example of the present invention, the reaction of persons other than the person experiencing an event (i.e., the player) may be documented and sold to the player. For example, a video or audio clip of the persons around a Craps table yelling and screaming as the player (the "shooter") continues to throw numbers other than a seven on an extended winning streak may be captured. The video clip may then be offered for sale to the player, e.g., as part of a collection of pictures and/or video clips relating to the player that have been captured during the player's visit to the casino or as a single video clip.

Numerous embodiments are described in herein, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

With these and other advantages and features of the invention that will become hereinafter apparent, the nature of the invention may be more clearly understood by reference to the following detailed description of the invention, the appended claims and to the several drawings included herein.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense.

Any enumerated listing of items herein does not imply that any or all of the items are mutually exclusive, unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

TERMS

Before turning to the detailed description of the figures, the meanings of some terms as used herein will be clarified.

Throughout the description of the present invention and unless otherwise specified, the following terms may include the meanings provided in this section. These terms and illustrative meanings are provided to clarify the language selected to describe embodiments of the invention both in the specification and in the appended claims.

The terms "a", "an" and "the" mean "one or more", unless expressly specified otherwise.

The term "documenting", as in documenting an event a player is experiencing, comprises capturing at least one of graphical, audio, textual data or other type of data (e.g., statistical, monetary, numerical) representative of the event. For example, documenting may comprise capturing an image of a player's reaction to an outcome and/or an image of an outcome displayed to a player. In another example, documenting may comprise capturing a textual representation of an outcome (e.g., "the player obtained 'cherry-cherry-cherry' as an outcome of a game play"). It should be recognized that documenting need not include capturing each of graphical, audio and textual data but may comprise capturing only one or another subset of the different types of data.

Examples of graphical data include images, a set of images, video, and still photographs. Capturing an image of a player's reaction to the display of an outcome may comprise capturing graphical data representative of an event (the display of the outcome). Examples of audio data include recordings of human voices, musical notes, and other sounds that represent or are indicative of the event. Capturing a recording of the exclamations of persons around a Craps table while the player is throwing the dice may comprise capturing audio data representative of an event (the throwing of the dice by the player). Examples of textual data include alphanumeric characters representative of words and numbers spoken by humans. Capturing an image of a description of menu items ordered by a player at a restaurant associated with the casino may comprise capturing textual data representative of an event (the player's dining experience at the restaurant).

The terms "embodiment", "an embodiment", "embodiments", "the embodiment", "the embodiments", "one or more embodiments", "some embodiments", and "one embodiment" mean "one or more (but not all) embodiments of the present invention(s)" unless expressly specified otherwise.

The term "game" may refer to a wagering activity whereby a player posts consideration, usually monetary in form, in exchange for a chance at winning a payout. The definition is intended to include basic games and bonus games.

The term "game play" may refer to a single attempt by a player to win a prize by playing a game of a gaming device. A game play begins when the player places a wager for the attempt and ends when the final outcome of the attempt is displayed to the player and the gaming device becomes available for the next game play. For example, in a reel slot machine game a game play may begin when the player indicates a wager amount to be placed (e.g., three credits) and ends when the reels stop spinning and the symbols comprising the outcome are displayed along a payline of the gaming device. In games including a bonus round where the player has qualified for the bonus round, a final outcome of an attempt may occur (and thus the game play may end) when the outcome of the bonus round is displayed to the player. In a video poker gaming device, a game play may begin when a player places a wager on the next hand (e.g., by actuating the "Bet 3" button) and may end when the cards comprising the final hand are displayed to the player. In a video poker game that allows a player to re-play an initial hand (e.g., by providing extra payment and changing a decision as to whether to hold or discard a particular card of the initial hand), the game play may end once the second final hand (based on the player's changed decision) is displayed to the player.

The term "gaming device" and "slot machine" are used interchangeably herein and refer to any electrical, mechanical, electro-mechanical and/or other device that may accept a wager, may follow a process to generate an outcome, and may pay winnings based on the outcome. The outcome may be randomly generated, as with a slot machine; may be generated through a combination of randomness and player skill, as with video poker; or may be generated entirely through player skill. A gaming device may include any gaming machine and/or system, including reeled slot machines (mechanical or electronic), video poker machines, video bingo machines, video roulette machines, video keno machines, video blackjack machines, pachinko machines, redemption games, arcade games, video games, video lottery terminals, online gaming systems, sports betting machines, game consoles, personal computers logged into online gaming sites, etc. In one or more embodiments, a gaming device may comprise a computing device operable to execute software that simulates play of a reeled slot machine game, video poker game, video blackjack game, video keno game, video roulette game, or lottery game. Gaming devices may or may not be owned and/or maintained by a casino and/or may or may not exist within a casino location.

The terms "including", "comprising" and variations thereof mean "including but not limited to", unless expressly specified otherwise.

The term "outcome" as used herein, may refer to a result of a game play of a game such as a table game or a game played via a gaming device. The result of a game play may comprise one or more symbols or depictions of symbols obtained by a player (e.g., cards dealt to a player in a card game, dice numbers rolled by a player, reel symbols of a slot machine along a payline, depictions of cards dealt to a player in a video poker game, etc.). An outcome may comprise symbols contained or displayed in a predefined area (e.g., on a display screen of a gaming device, along a payline of a reeled slot machine). It should be noted that an outcome as used herein includes a partial result of a game play. For example, 4 cards to a flush in a table poker or video poker game may comprise an outcome even though the game does not typically end until the player is dealt five cards. It should also be noted that an outcome in table poker or video poker may comprise an initial hand, a final hand, or a combination thereof. In embodiments wherein the outcome is an outcome of a reeled slot machine, the outcome may comprise symbols along the payline of the slot machine as well as symbols not along the payline of the slot machine. For example, a display of "cherry-bar-bar" along the payline, with a bar symbol just above or below the cherry symbol may comprise an outcome for purposes of the present invention.

The term "original outcome" may refer to an outcome that is output as a result of a current game play (as contrasted with being output as a result of retrieving stored data associated with an outcome of a prior game play). For example, an original outcome may refer to an outcome that is determined based on a random number generated for a current game play. It should be noted that a random number used to determine an outcome for a current game play may be determined by a gaming device, a controller operable to communicate with a plurality of gaming device, or another device.

The term "peripheral device" may refer to any device associated with one or more gaming devices, the peripheral device being operable to perform any of the functions described herein. For example, in one embodiment a prior art gaming device may be retrofitted with a peripheral device that comprises a processor, memory, event detection device and/or documenting device for documenting events in accordance with embodiments of the present invention. A peripheral device may or may not be attached to a gaming device. A peripheral device may or may not be operable to direct the associated gaming device to perform certain functions. A peripheral device, or portions thereof, may be housed inside the casing of the associated gaming device. In one embodiment, a peripheral device may comprise a documenting device and/or an event detecting device (e.g., the peripheral device may be operable to detect one or more events at a gaming device). For example, a peripheral device may be operable to detect one or more signals output by a processor of a gaming device. Further still, a peripheral device may be operable to communicate with a processor of an associated gaming device.

The term "player" is used herein to refer to the person whose experiences at a casino are documented. The documentation may not necessarily be of the player (e.g., a reaction of a person standing next to a player when the player wins a jackpot may be documented as documentation of the player's experience). The player may not necessarily be playing a table game or at a gaming device when the documentation is captured or when the experience is determined (e.g., an experience that is documented may comprise the purchase of a meal by the player at a restaurant associated with the casino or a player playing at an online casino).

The term "reaction" refers to any response exhibited by a player experiencing an event or a person viewing or otherwise being aware of an event being experienced by a player. The term reaction may refer to a visually or audibly perceivable reaction. A visually perceivable reaction of a player or other person may be a change in the facial muscles, expression, or body position of the player or other person (e.g., a smile, a raising of the eyebrows, a roll of the eyes, a frown, an emission of tears, a slapping of the forehead, clapping of the hands, a hunching of the shoulders, walking away, a flinch, jumping up and down, punching of an object, smacking or pursing of the lips). An audibly perceivable reaction of a player or other person may be any sound emitted or otherwise caused by the player or other person (e.g., a sigh, a groan, a whistle, one or more spoken words, the sound of clapping of the hands, the sound of smacking of the lips, the sound caused by the punching of an object). Other types of reactions may also be documented. For example, physical body reactions such as an increase in hear-rate, blood pressure, breathing rate, skin resistance, or other indications of excitement may be captured.

The terms "re-outputting an outcome" "re-outputted outcome", "re-output an outcome", "re-playing an outcome", "replayed outcome", "replay outcome", "replay" and the like may refer to a method of outputting an outcome of a prior, and not a current, game play even though the outcome may be currently output via a device. In other words, an outcome that was output for a prior game play as a result of that game play may be subsequently re-outputted (and thus replayed) via a device (e.g., a gaming device or kiosk). For example, a replay outcome may be an outcome that is output as a result of retrieving data associated with a prior game play (as contrasted with an outcome that is output as a result of a game play, which may be referred to as an original outcome herein).

The term "scrapbook" may refer to a compilation or collection of data documenting a player's experiences at a casino. The scrapbook may contain pictures, outcomes from gaming devices, sound clips, video clips, portions of restaurant menus, etc. The scrapbook may be a tangible item, such as a photo album, or may be digital, e.g., in the form of pictures posted on a Web page, or may be a combination thereof.

The terms "simulated outcome", "simulating an outcome", "simulation of an outcome" and the like may refer to a method of outputting an outcome of a prior game play via a gaming device in the same or similar manner that an outcome of a current game play would be output. Thus, a gaming device may function to give the appearance or effect of outputting an outcome generated for a game play (i.e., may simulate an outcome), when in reality the gaming device is outputting an outcome of a prior game play and not a current game play. For example, assume an outcome of "cherry-cherry-cherry" was obtained during a prior game play. A three-reeled slot machine may simulate the outcome "cherry-cherry-cherry" by displaying a cherry symbol on each reel and along a payline. It should be noted that simulated outcomes are a subset of replayed outcomes, defined above. Replayed outcomes include simulated outcomes as well as other methods of outputting an outcome of a prior game play (e.g., outputting a still or video image of the outcome of the prior game play).

The above-described and other embodiments of the present invention may be better understood with reference to the figures, as described below. In the following description, reference is made to the accompanying figures that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense.

System

Referring now to FIG. 1, an apparatus 100 according to an embodiment of the present invention includes a controller 110 that is operable to communicate with one or more documenting devices 115 via a network such as the Internet (wired and/or wirelessly), via another network protocol, or via other means for communication as would be understood by those of ordinary skill in the art. Although only one documenting device 115 is depicted in FIG. 1A, any number of documenting devices may be in communication with the controller 110. Further, in one or more embodiments, one or more of the documenting devices may comprise a peripheral device, as defined herein.

A documenting device, as used herein, is any device that is operable to document an event. Documenting an event may comprise capturing, as representative of the event, (i) graphical data (e.g., a still image, a series of still images, or a video), (ii) audio data (e.g. a recording of a sound), (iii) textual data (e.g., alphanumeric characters representative of words and numbers), or (iv) a combination thereof.

The controller 110 may also be operable to communicate with an event detection device 120 via a network such as the Internet (wired and/or wirelessly), via another network protocol, or via other means for communication as would be understood by those of ordinary skill in the art. Although only one event detection device 120 is depicted in FIG. 1A, any number of event detection devices may be in communication with the controller 110. An event detection device, as used herein, is any device that is operable to detect the occurrence of an event (e.g., a gaming device or component thereof).

The documenting device 115 and/or event detection device may comprise computers, such as those based on the Intel® Pentium® processor, that are adapted to communicate with the controller 110.

Communication with the controller 110 may be direct or indirect. For example, communication may be via the Internet through a Web site maintained by controller 110 on a remote server or via an on-line data network including commercial on-line service providers, bulletin board systems and the like. In some embodiments, the documenting device 115 and/or the event detection device 120 may communicate with controller 110 over radio frequency ("RF"), infrared ("IR"), cable TV, satellite links and the like, including combinations thereof.

In some embodiments the documenting device 115 may be operable to communicate directly with event detection device 120 via a network such as the Internet (wired and/or wirelessly), via another network protocol, or via other means for communication as would be understood by those of ordinary skill in the art. Such communication may be in addition to or instead of communication with the controller 110. In some embodiments, the controller 110 may not be present, the functions performed by it and the data stored by it being performed by another device (e.g., at least one of the documenting device and the event detection device).

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 110 may function as a "Web server" that generates Web pages (documents on the Web that typically include an HTML file and associated graphics and script files) that may be accessed via the Web and allows communication with the controller 110 in a manner known in the art. Those of skill in the art will understand that there are a variety of well-known ways for creating and operating Web pages, and accordingly a detailed description of such known processes is omitted here for clarity.

Any and all of the controller 110, the documenting device 115, and event detection device 120 may comprise, e.g., a conventional personal computer, a portable type of computer, such as a laptop computer, a palm-top computer, a hand-held computer, a Personal Digital Assistant (PDA), a gaming device, or combinations thereof.

In some embodiments (i) the controller 110 and the event detection device 120; (ii) the controller 110 and the documenting device 115; (iii) the event detection device 120 and the documenting device 115; or (iv) the controller 110, the documenting device 115, and the event detection device 120 may comprise the same device or components of the same device. In some embodiments some or all of the functions described herein as performed by the controller 110 may be performed by event detection device 120 and/or documenting device 115, or some or all of the functions described herein as being performed by event detection device 120 and/or documenting device 115 may be performed by controller 110. In some embodiments some or all of the functions described as being performed by documenting device 115 may be performed by event detection device 120. In some embodiments some or all of the functions described as being performed by event detection device 120 may be performed by documenting device 115.

The documenting device 115 may comprise a device capable of capturing documentation of an event. A documenting device 115 may comprise, for example, a camera capable of capturing images such as video footage and/or still photographs, a microphone capable of capturing audio signals, a global positioning system (GPS) capable of documenting a person's location or route, a point-of-sale terminal capable of capturing transaction data, a cable set-top box capable of capturing data associated with what was viewed, a blood pressure monitor capable of measuring the blood pressure of a player, a thermometer capable of measuring the temperature of a person, a heart rate monitor capable of measuring the heart rate of a person, or any combination thereof. For example, a sensor recently developed by a team at the University of Sussex in Brighton allows monitoring of a person's heartbeat from a meter away. The sensor works by measuring a parameter called "displacement current". Unlike a standard conduction current of moving electrons, displacement current is a measure of the changing electric field in the air, generated by the shifting voltages on the skin surface. A sensor that measures such a displacement current is one example of a device that may be used in a casino environment to determine a player's heartbeat from a distance.

As described above, in some embodiments the documenting device 115 and the event detection device 120 may comprise the same device. For example, a camera may be capable of both detecting an occurrence of an event (e.g., detecting a particular outcome being displayed on a slot machine or a particularly expressive facial expression) and capturing documentation of the event (e.g., capturing an image of a player reacting to the displayed outcome). For purposes of conciseness, however, the documenting device 115 and the event detection device 120 will be described as two separate devices herein.

In some embodiments the documenting device 115 and the event detection device 120 may both be components of the same device (e.g., a slot machine). For example, a processor of a slot machine may comprise an event detection device capable of detecting an event such as the occurrence of a particular outcome and a microphone attached to the slot machine or built into the slot machine may comprise a documenting device.

In some embodiments the controller 110 may be operable to communicate with a first computing device that in turn controls the documenting device 115 and a second computing device that in turn controls the event detection device 120. The communication with the first computing device and the second computing device may be in addition to or instead of communicating directly with the documenting device 115 and the event detection device 120. The first computing device and/or second computing device may comprise, e.g., a conventional personal computer, a portable type of computer, such as a laptop computer, a palm-top computer, a hand-held computer, a Personal Digital Assistant (PDA), a gaming device, or combinations thereof. Further, in some embodiments the first computing device and the second computing device may be the same device. For example, one or more casino servers may each be in communication with (i) a plurality of documenting devices and event detection devices, and (ii) the controller.

It should be noted that in one or more embodiments the controller 110 may be operable to communicate with one or more gaming devices in addition to, or in lieu of, being operable to communicate with the documenting devices 115 and/or the event detection devices 120. It should further be noted that since a documenting device and/or an event detection device may comprise a gaming device, in one or more embodiments the controller 110 being operable to communicate with documenting devices 115 and/or event detection devices 120 may comprise the controller being operable to communicate with one or more gaming devices.

For example, in one embodiment a gaming device comprises or is associated with one or more documenting devices and/or one or more event detection devices. The gaming device may thus be operable to detect the occurrence of an event and/or capture documentation of the event. The gaming device may further be operable to communicate the captured documentation to the controller or another device. For example, the gaming device may communicate an indication of an outcome obtained on the gaming device and/or an image of an outcome obtained on the gaming device.

Devices

Figure 2A:
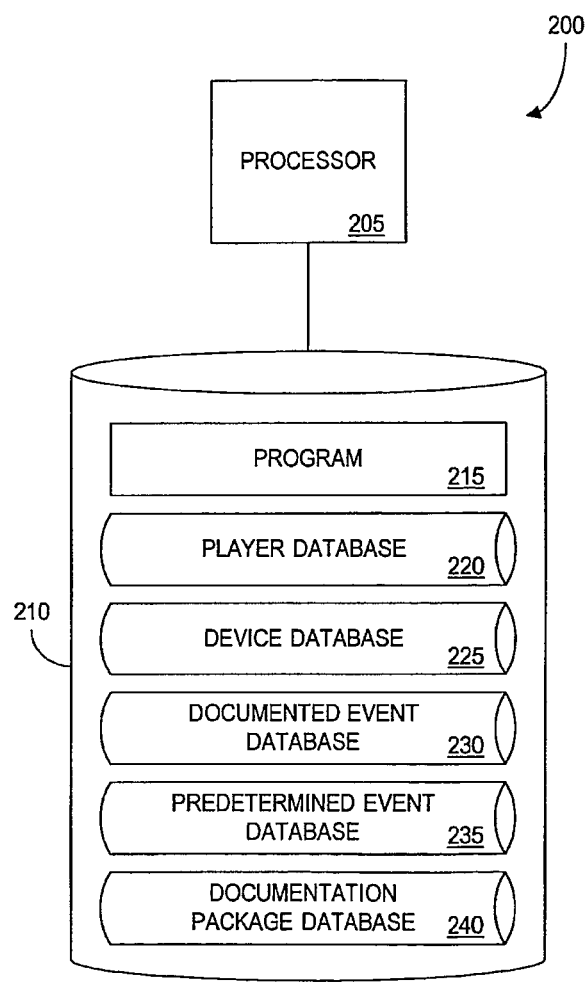
FIG. 2A is a block diagram of one embodiment of a controller.

Referring now to FIG. 2A, an embodiment 200 of a controller is illustrated. The controller 200 may function, for example, as the controller 110 described in FIG. 1. The controller may be implemented as a system controller, a dedicated hardware circuit, an appropriately programmed general purpose computer, or any other equivalent electronic, mechanical or electro-mechanical device.

The controller 200 comprises a processor 205, such as one or more Intel® Pentium® processors. As is well known in the art, the processor 205 may be in communication with a communication port (not shown in FIG. 2) or other means for facilitating communication between the processor 205 and other devices.

The processor 205 is also in communication with a data storage device 210. The data storage device 210 comprises an appropriate combination of magnetic, optical and/or semiconductor memory, and may include, for example, Random Access Memory (RAM), Read-Only Memory (ROM), a compact disc and/or a hard disk. The processor 205 and the storage device 210 may each be, for example: (i) located entirely within a single computer or other computing device; or (ii) connected to each other by a remote communication medium, such as a serial port cable, telephone line or radio frequency transceiver or other wired or wireless media. In one embodiment, the controller may comprise one or more computers that are connected to a remote server computer for maintaining databases.

The data storage device 210 stores a program 215 for controlling the processor 205. The processor 205 performs instructions of the program 215, and thereby operates in accordance with the embodiments of the present invention, and particularly in accordance with the methods described in detail herein. The program 215 may be stored in a compressed, uncompiled and/or encrypted format. The program 215 furthermore includes program elements that may be necessary, such as an operating system, a database management system and "device drivers" for allowing the processor 205 to interface with computer peripheral devices. Appropriate program elements are well known to those of ordinary skill in the art, and need not be described in detail herein.

According to an embodiment of the present invention, the instructions of the program 215 may be read into a main memory from another computer-readable medium, such from a ROM to RAM. Execution of sequences of the instructions in program 215 causes processor 205 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The storage device 210 also stores (i) a player database 220, (ii) a device database 225, (iii) a documented event database 230, (iv) a predetermined event database 235, and (v) a documentation package database 240. The databases are described in detail below and depicted with exemplary entries in the accompanying figures. As will be understood by those skilled in the art, the schematic illustrations and accompanying descriptions of the databases presented herein are exemplary arrangements for stored representations of information. Many other arrangements may be employed besides those suggested by the tables shown. Similarly, the illustrated entries of the databases represent exemplary information only; those skilled in the art will understand that the number and content of the entries can be different from those illustrated herein. Further, some or all of the information stored in controller 200 may, in some embodiments, be stored in one or more other devices such as a gaming device, an event detection device 120 and documenting device 115. The storage of such information in one or more other devices may be in addition to or instead of storage of such information in controller 200.

In some embodiments, the controller 110 may further comprise, or be in communication with, an output device, for outputting documented events and the associated indications of the event that was documented to a person. Examples of an output device include a printer, a kiosk, a screen, a personal computer, a laptop computer, a personal digital assistant, a speaker, a gaming device, and any combination thereof.

Figure 2B:
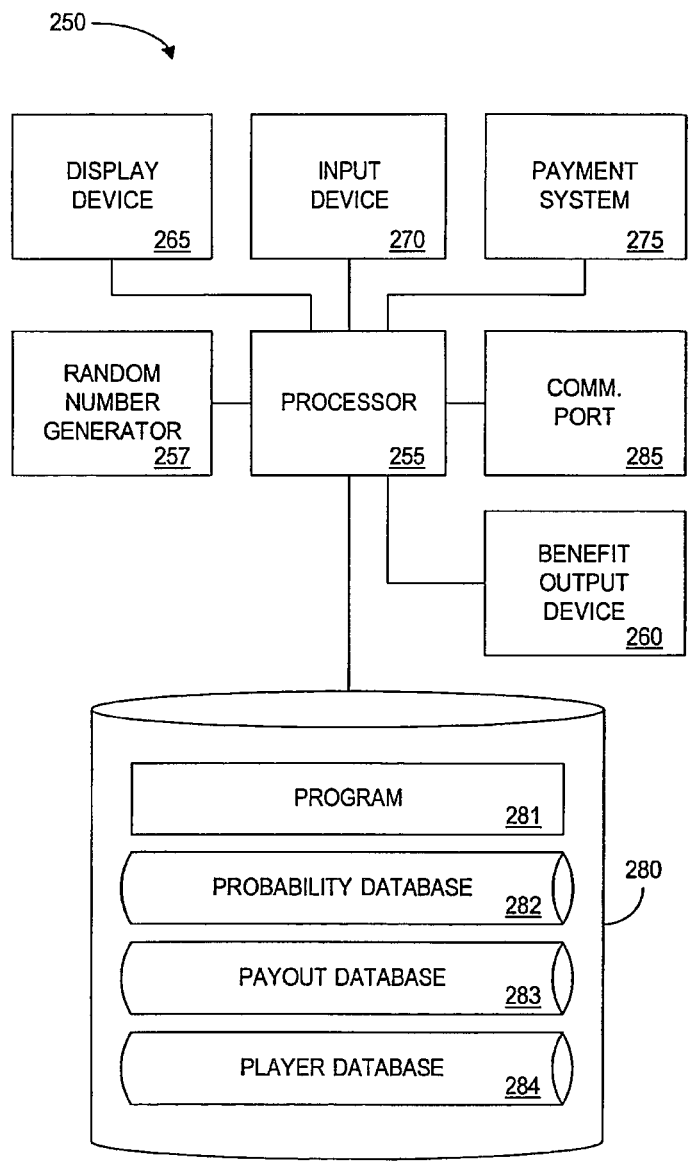
FIG. 2B is a block diagram of one embodiment of a gaming device.

Referring now to FIG. 2B, a block diagram of an exemplary embodiment 250 of a gaming device is illustrated. The embodiment 250 of an exemplary gaming device is referred to as gaming device 250 herein. The gaming device 250 may be implemented as a system controller, a dedicated hardware circuit, an appropriately programmed general-purpose computer, or any other equivalent electronic, mechanical or electro-mechanical device. The gaming device 250 may comprise, for example, a slot machine, a video poker machine, a video blackjack machine, a video keno machine, a video lottery machine, a pachinko machine or a table-top game. In various embodiments, a gaming device may comprise, for example, a personal computer (e.g. which communicates with an online casino Web site), a telephone (e.g. to communicate with an automated sports book that provides gaming services), or a portable handheld gaming device (e.g. a PDA). The gaming device 250 may comprise any or all of the gaming devices of the aforementioned systems. In some embodiments, a user device such as a PDA or cell phone may be used in place of, or in addition to, some or all of the gaming device components. Further, a gaming device may comprise a personal computer or other device operable to communicate with an online casino and facilitate game play at the online casino. Further, as described herein, in one or more embodiments a gaming device may comprise a documenting device and/or an event detection device.

The gaming device 250 comprises a processor 255, such as one or more Intel® Pentium® processors. The processor 255 is operable to communicate with a random number generator 257, which may be a component of the gaming device. In another embodiment, a random number generator may be a component of another device (e.g., a component of controller 110). A random number generator, in accordance with at least one embodiment of the present invention, may generate data representing random or pseudo-random values (referred to as "random numbers" herein). The random number generator may generate a random number, for example, every predetermined unit of time (e.g. every thousandth of a second) or in response to an initiation of a game on the gaming device. In the former embodiment, the generated random numbers may be used as they are generated (e.g. the random number generated at substantially the time of game initiation is used for that game) and/or stored for future use. A random number generated by the random number generator may be used by the processor to determine, for example, at least one of an outcome and payout. A random number generator, as used herein, may be embodied as a processor separate from but working in cooperation with the processor. Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 255 may also be operable to communicate with a benefit output device 260, which may be a component of gaming device. The benefit output device 260 may comprise one or more devices for outputting a benefit to a player of the gaming device.

For example, in one embodiment the gaming device may provide coins and/or tokens as a benefit. In such an embodiment the benefit output device 260 may comprise a hopper and hopper controller, for dispensing coins and/or tokens into a coin tray of the gaming device.

In another example, the gaming device may provide a receipt or other document on which there is printed an indication of a benefit (e.g. a cashless gaming receipt that has printed thereon a monetary value, which is redeemable for cash in the amount of the monetary value). In such an embodiment the benefit output device 260 may comprise a printing and document dispensing mechanism.

In yet another example, the gaming device may provide electronic credits as a benefit (which, e.g., may be subsequently converted to coins and/or tokens and dispensed from a hopper into a coin tray). In such an embodiment the benefit output device 260 may comprise a credit meter balance and/or a processor that manages the amount of electronic credits that is indicated on a display of a credit meter balance.

In yet another example, the gaming device may credit a monetary amount to a financial account associated with a player as a benefit provided to a player. The financial account may be, for example, a credit card account, a debit account, a charge account, a checking account, or a casino account. In such an embodiment the benefit output device 260 may comprise a device for communicating with a server on which the financial account is maintained.

Note that, in one or more embodiments, the gaming device may include more than one benefit output device. For example, the gaming device may include both a hopper and hopper controller combination and a credit meter balance. Such a gaming device may be operable to provide more than one type of benefit to a player of the gaming device.

A single benefit output device may be operable to output more than one type of benefit. For example, a benefit output device may be operable to increase the balance of credits in a credit meter and communicate with a remote device in order to increase the balance of a financial account associated with a player.

The processor 255 is also operable to communicate with a display device 265, which may be a component of gaming device. The display device 265 may comprise, for example, one or more display screens or areas for outputting information related to game play on the gaming device, such as a cathode ray tube (CRT) monitor, liquid crystal display (LCD) screen, or light emitting diode (LED) screen. In one or more embodiments, a gaming device may comprise more than one display device. For example, a gaming device may comprise an LCD display for displaying electronic reels and a display area that displays rotating mechanical reels.

The processor 255 may also be in communication with one or more other output devices besides the display device, for outputting information (e.g. to a player or another device). Such other one or more output devices may also be components of a gaming device. Such other one or more output devices may comprise, for example, an audio speaker (e.g. for outputting an outcome or information related thereto, in addition to or in lieu of such information being output via a display device), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g. rings when a player wins), an LED display of a player's credit balance on a gaming device, an LCD display of a personal digital assistant (PDA) for displaying keno numbers.

The display device may comprise, for example, one or more display areas. For example, one of the display areas (e.g., a "primary" display screen) may display outcomes of current game plays games played on the gaming device. Another of the display areas (e.g., a "secondary" display screen) may display outcomes of prior game plays, video recordings of a player's reaction, and so on. Yet another of the display areas may display the benefits obtainable by playing a game of the gaming device (e.g., in the form of a payout table). In one or more embodiments, the gaming device may include more than one display device, one or more other output devices, or a combination thereof (e.g., two display devices and two audio speakers).

The processor 255 may also be in communication with an input device 270, which is a device that is capable of receiving an input (e.g., from a player or another device) and which may be a component of gaming device. An input device may communicate with or be part of another device (e.g., a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g. for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 255 may also be in communication with a payment system 275, which may be a component of the gaming device. The payment system 275 is a device capable of accepting payment from a player (e.g., a bet or initiation of a balance or a payment for re-outputting an outcome of a prior game play) and/or providing payment to a player (e.g., a payout for an outcome of a current game play). Payment is not limited to money, but may also include other types of consideration, including products, services, and alternate currencies. Exemplary methods of accepting payment by the payment system 275 include (i) receiving hard currency (i.e. coins or bills), and accordingly the payment system may comprise a coin or bill acceptor; (ii) receiving an alternate currency (e.g. a paper cashless gaming voucher, a coupon, a non-negotiable token), and accordingly the payment system may comprise a bar code reader or other sensing means; (iii) receiving a payment identifier (e.g. a credit card number, a debit card number, a player tracking card number) and debiting the account identified by the payment identifier; and (iv) determining that a player has performed a value-added activity (e.g. participating in surveys, monitoring remote images for security purposes, referring friends to the casino).

The processor 255 is in communication with a memory 280 and a communications port 285 (e.g., for communicating with one or more other devices). The memory 280 may comprise an appropriate combination of magnetic, optical and/or semiconductor memory, and may include, for example, Random Access Memory (RAM), Read-Only Memory (ROM), a compact disc and/or a hard disk. The memory 280 may comprise or include any type of computer-readable medium. The processor 255 and the memory 280 may each be, for example: (i) located entirely within a single computer or other device; or (ii) connected to each other by a remote communication medium, such as a serial port cable, telephone line or radio frequency transceiver. In one embodiment, the gaming device 250 may comprise one or more devices that are connected to a remote server computer for maintaining databases.

The memory 280 stores a program 281 for controlling the processor 255. The processor 255 performs instructions of the program 281, and thereby operates in accordance with the present invention, and particularly in accordance with the methods described in detail herein. The program 281 may be stored in a compressed, uncompiled and/or encrypted format. The program 281 furthermore includes program elements that may be necessary, such as an operating system, a database management system and "device drivers" for allowing the processor to interface with computer peripheral devices. Appropriate program elements are known to those skilled in the art, and need not be described in detail herein.

The gaming device 250 may be operable to receive instructions from a computer readable medium. The term "computer-readable medium" as used herein refers to any medium that participates in providing instructions to the processor of the gaming device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the gaming device may obtain instructions in the form of a carrier wave.

According to an embodiment of the present invention, the instructions of the program may be read into a main memory from another computer-readable medium, such from a ROM. Execution of sequences of the instructions in program causes processor perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems, execution of sequences of the instructions in a program of a peripheral device in communication with the gaming device may also cause the processor to perform some of the process steps described herein.

The memory 280 may store one or more databases including, for example, a probability database 282, a payout database 283, and a player database 284. An example of a player database is described herein. It should be noted that the memory 280 may further store any and all of the data and/or databases described with respect to controller 200 (FIG. 2A). The described entries of the databases represent exemplary information only; those skilled in the art will understand that the number and content of the entries can be different from those illustrated herein. Further, despite any description of the databases as tables, an object-based model could be used to store and manipulate the data types of the present invention and likewise, object methods or behaviors can be used to implement the processes of the present invention.

Where appropriate, a prior art probability database may be utilized in the performance of the inventive processes described herein. A probability database may be stored in the data storage device in tabular form, or any other appropriate database form, as is well known in the art. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator; and (ii) an outcome that indicates the one or more indicia comprising the outcome that corresponds to the random number of a particular record. A gaming device may utilize a probability database to determine, for example, what outcome corresponds to a random number generated by a random number generator and to display the determined outcome. The outcomes may comprise the three symbols to be displayed along the payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

Further, where appropriate, a prior art payout database may be utilized in the performance of the inventive processes described herein. A payout database may be stored in the data storage device in tabular form, or any other appropriate database form, as is well known in the art. The data stored therein includes a number of example records or entries, each defining an outcome that may be obtained on a gaming device that corresponds to a payout. Those skilled in the art will understand that the payout database may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained on a three reel slot machine.

A gaming device may utilize the payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player.

Other arrangements of payout databases are possible. For example, the book "Winning At Slot Machines" by Jim Regan (Carol Publishing Group Edition, 1997) illustrates many examples of payout and probability tables and how they may be derived.

Note that, although some particular databases may be described as being stored in a gaming device, in other embodiments of the present invention some or all of these databases may be partially or wholly stored in another device, such as one or more of the peripheral devices, the peripheral device server and/or the server computer. Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the computer.

Databases

Referring now to FIG. 3, a tabular representation of an embodiment 300 of the player database 220 (FIG. 2) is depicted. The tabular representation of the player database includes a number of example records or entries, including the entry 350, each of which defines a player. Those skilled in the art will understand that the player database may include any number of entries. The tabular representation of player database 300 also defines fields for each of the entries or records. The fields specify: (i) a player identifier 305 that uniquely identifies the player; (ii) a player name 310; (iii) contact information 315 of the player; (iv) payment information 320 of the player; (v) a player image file identifier 325; (vi) a documentation package identifier 330; (vii) an associated person identifier 335; and (viii) a documented data field 340. It should be noted that not all fields are required in all embodiments. Further, additional fields may be included in some embodiments.

The player identifier stored in the player identifier field 305, as well as other identifiers described herein, may be generated or assigned by the controller, or may be established by the player and provided to the controller by way of a gaming device, a computer functioning as a registration device or other appropriate device. For example, the player identifier may comprise a numeric code that is assigned to the corresponding player by the controller. Alternatively, the player identifier may comprise a player name and/or password that may be generated by a gaming device or computer functioning as a registration device and subsequently provided to the player.

The data stored in the name field 310 represents the name of the player, if known. The data stored in the contact information field 315 may comprise any of (i) an electronic mail (e-mail) address, (ii) a postal address, (iii) telephone number, and (iv) a numeric IP address of the customer. The data stored in the payment information field 320 may comprise, for example, credit card, debit card, or other financial account information which may be used to render payment on behalf of the player. For example, if a player accepts an offer to purchase documentation of one or more events the player experienced (e.g., a scrapbook of outcomes obtained by the player while playing slot machines at the casino) the purchase price of the documentation may be paid using the data stored in the payment information field 320.

The player image file name field 325 stores a file, file name and/or file path to a file comprising an image of the player defined by a record. Such an image may be accessed, for example, to identify a player or verify the identity of a player in an image captured by a documenting device upon the occurrence of an event or to identify.

For example, in one embodiment of the present invention an outcome occurring at a slot machine is detected, it is determined that the outcome matches a predetermined outcome, and an image of the player playing the slot machine at which the outcome is occurring is captured. An indication of the outcome (e.g., a representation of the symbols comprising the outcome) is stored in association with the image and in association with the player identifier of the player playing the slot machine. Storing the indication and the image in association with the player identifier may be beneficial in some situations. For example, a casino may desire to capture and store a plurality of images of a player and the corresponding indications of the event being depicted in the image, compile the images and indications into a scrapbook, and offer the scrapbook for purchase by the player. In such an embodiment it may be beneficial to the casino to identify the player in the images in order to contact the player once the scrapbook is created. For example, the contact information in the record of the player corresponding to the player identifier may be utilized to contact the player with the offer for the scrapbook. In another example, the contact information may be utilized to offer to store for the player's reference an image or other data documenting the occurrence of an event (e.g., such that the player may subsequently replay the event).

In one embodiment, an image of an outcome obtained by a player is captured. In such an embodiment, the image file containing the image of the outcome may be stored in the player database or in another database (e.g., in association with the player identifier). For example, the image file may be stored in a field of the player database. In another example, the image file may be stored in another table or database and linked to the player database via a key field (e.g., player identifier) or linking field. For example, an image file database may store captured images. The image file database may, in one embodiment, store a unique identifier for each stored image. The image file database may, in one embodiment, store a player identifier identifying the player with whom the image is associated (e.g., if the image is of an outcome obtained by a player, the player identifier may identify the player who obtained the outcome as a result of a game play). In such an embodiment, the player identifier may serve as a primary key in the player database and as a foreign key in the image file database.

It should be noted that, in embodiments in which an image or other data documenting an event is associated with a player, one or more of various methods may be used to determine the player associated with the documented event. For example, in some circumstances a player may have inserted a player tracking card into the slot machine at which an image was captured and the casino may determine the player identifier from the player tracking card. In other circumstances, however, the player may not have inserted a player tracking card. In such circumstances the player's identity may be determined by comparing the player in the captured image to a database of player images stored by the casino. Also, sometimes the player actually playing a slot machine is not the player corresponding to the identifier of a player tracking card inserted into the slot machine at the time the player is playing. To provide for such circumstances a casino or other authority (e.g., the Internal Revenue Service) may find it beneficial to verify the identity of the player using the image files stored in the player database.

Further, in some embodiments of the present invention images of persons in the casino may be captured when there is no readily available method of identifying the person in the image (e.g., an image of a person standing next to a table game). In such circumstances the identity of the person in the image may potentially be determined by comparing the person in the captured image to the image files stored by the casino. The U.S. Pat. No. 6,142,876 to Cumbers teaches a system and method of comparing acquired image data of a player playing a slot machine to stored image data to determine the identity of a player. This patent is incorporated by reference herein.

In one embodiment, a player may be queried for a player identifier or other identifier once an event associated with the player is documented. For example, if a player's reaction to an outcome is documented and/or an outcome obtained by the player is documented, an offer to store the documentation for the player may be output to the player. Such an offer may include, for example, a request for an identifier (e.g., player identifier, player name, hotel room number of the casino hotel in which the player is staying, a personal identification number that the player may utilize to gain access to the documentation, etc.). In another embodiment, an identifier may be assigned to the documentation of the event (e.g., to the image file or record of a database that stores an indication of the outcome that comprises the event). Such an assigned identifier may be output to the player (e.g., via a display of a gaming device, via a printer of the gaming device), along with a message informing the player that the identifier may be used to gain access to the documentation.

Returning now to FIG. 3, Documentation Package field 330 stores an identifier that identifies a documentation package, if any, for which a player may have registered. In some embodiments of the present invention a player may register to have his visit to the casino documented. Such embodiments are described in detail below, with reference to FIG. 7. It should be noted that, in one or more embodiments, a player may specifically register that the player does not wish to have any photos of himself captured.

The Associated Person Identifier 335 stores one or more identifiers that each identify a respective person associated with the player defined by the record. In some embodiments of the present invention documentation relating to a person other than the player may be captured. For example, a person may be designated as an associated person because the person appears in an image associated with the player. In another example, an image of a person may be captured because the person is an associated person in relation to the player. In some embodiments, a person may be deemed an associated person for purposes of the present invention by virtue of the person's location relevant to the player or the person's relationship to the player. For example, an image of a person standing near a player when the player wins a particularly large payout or obtains a particularly rare hand in video poker may be captured to document the reaction of the person. In another example an image of a spouse of a player that has just won the jackpot may be captured at the time the player is winning the jackpot but before the spouse is aware of the win and/or as the spouse becomes aware of the win. A person may be designated as an associated person with or without input by the player.

The documented data field 340 may store data or an indication of data associated with a prior game play or other documented event. For example, the documented data field 340 may store a link to another database (e.g., a database of files, each file comprising a file of data documenting an event experienced by a player). The link may comprise, for example, a unique identifier of the data documenting the event. In another example, the documented data field 340 may store a file or filepath to a file of data documenting an event. For example, the documented data field 340 may store an mpeg or jpeg file comprising one or more images of an outcome obtained by a player and/or a player's reaction to the outcome. The data in such a file may be in altered or unaltered form. In yet another example, the documented data field 340 may store a description or other identifier of an outcome obtained in a prior game play or other documented event. For example, the documented data field may store a description that "at 4:52 pm on Jul. 18, 2004, an outcome of "bar-bar-bar" was obtained on gaming device "GD-03-00456". The description may be human and/or machine readable format.

In some embodiments, a player database may store data (or a pointer to data) documenting more than one event. Assume an embodiment in which a player requests output of data documenting an event experienced by the player, wherein the request includes a player identifier. The device via which the player is requesting the data may access a player database (directly or via another device). After the player database has been accessed, it may be determined that more than one entry of data is stored in association with the player identifier (e.g., more than one mpeg file is associated with the player identifier). In such a circumstance, the device via which the player is requesting the output of the data may prompt the player to select which data the player would like to have output. For example, the more than one entry of data associated with the player can be sorted and presented according to numerous characteristics, such as time of play, payout amount, location of gaming device, etc. In a more particular example, a gaming device via which a player is requesting output of data associated with a prior game play or other documented event may prompt a player with a menu on a display area illustrating the player's entries of data, prompting the player to select one for output.

Referring now to FIG. 4A, a tabular representation of an embodiment 400 of the device database 225 (FIG. 2) is depicted. The tabular representation of the device database includes a number of example records or entries, including the entries 425, 430, 435, and 440 each of which defines a device. Those skilled in the art will understand that the device database may include any number of entries. The tabular representation of device database 400 also defines fields for each of the entries or records. The fields specify: (i) a device identifier 405 that uniquely identifies the device; (ii) a device type 410; (iii) a device location 415; and (iv) a device status 420.

The device identifier uniquely identifies a device the controller is in communication with. A device defined by the device database 400 may be any type of device that is operable to function in at least one embodiment of the present invention. For example, a device may be an event detection device, a documenting device, or a gaming device. As described herein, in one embodiment a gaming device may comprise an event detection device and/or a documenting device. The information stored in the device type field 410 indicates at least one function the device identified by a given record is operable to perform. For example, record 430 indicates that device "D23456" is a "documenting device", indicating that device "D23456" is operable to document an event. The device type field 410 may also indicate more specific functions of the device being defined by specifying the device type with more specificity. For example, record 435 indicates that device "D45678" is a "camera". A device type of "camera" may indicate that the device is operable to capture images.

The device type field 410 may store an indication of more than one type of device for a given record. Storing more than one device type for a given device identifier may be an indication that the corresponding device is operable to perform more than one function. Record 440, for example, indicates that device "D56789" is operable to function as both a speaker and a microphone. Thus, in some embodiments, device "D56789" (which may, for example, comprise a gaming device) may be an event detection device, a documenting device, and an outputting device. For example, when detecting a cheer from a player via the microphone, device "D56789" may function as an event detection device. When recording the player's cheer detected by the microphone, device "D56789" may function as a documenting device. Further, when outputting an offer to the player to purchase the recording of the player's cheer (e.g., wherein the recording includes an indication of what caused the player to cheer, such as a large payout won by the player), the device "D56789" may function as an outputting device.

The information in the device location field 415 is indicative of where the corresponding device is located. Such an indication of the location of a device may be used by the controller to determine the location of an event detection device (e.g., such as a slot machine). The information in the device location field 415 may also be used by the controller to select a documenting device to document the event detected by the event detection device. The controller may then communicate with the selected documenting device, directing it to document the detected event. For example, record 425 indicates that device "D12345" is an "event detection device" located in "casino 1, area B, $3^{rd}$ quadrant". Thus, if the controller receives a signal from device "D12345" indicating that an event has been detected, the controller may search the device database 400 for a documenting device that is located in the same location as the event detection device. Record 430 indicates that device "D23456" is a "documenting device" located in "casino 1, area B, $3^{rd}$ quadrant", which is where event detection device "D12345" is located. Thus, the controller may select device "D23456" and direct it to document the event detected by device "D12345". It should be noted that for illustrative purposes only, the locations of devices in device database 400 are indicated as quadrants of areas of a casino (two different casinos may be two casinos owned or operated by two separate entities or two different gambling rooms or areas in a building owned or operated by the same entity). However, a person of ordinary skill in the art would understand many other means of indicating a location of a device for purposes of the present invention.

The information stored in device status field 420 indicates the current condition of the corresponding device for purposes of determining whether it is available for direction by the controller. Four possible status types are illustrated in device database 400 but any number of status types may be utilized. The status of "available" may indicate to the controller that the corresponding device is available for direction by the controller. For example, the "documenting device" defined by record 430 has a current status of "available", which may indicate that the documenting device is available to the controller for being directed to document an event. A status of "off-line" may indicate that the corresponding device is not currently available to the controller for a variety of specific reasons. For example, the device may be shut down for maintenance or repairs.

A status of "locked" may indicate that the device is functioning but is not available for direction by the controller. For example, a documenting device that is a security camera may currently be focused on suspicious activity in a casino and casino personnel may want to prevent the camera from being refocused or redirected to another area by the controller. In such a situation the casino personnel may have the ability to "lock in" the camera such that it is not available for redirection by the controller. Such a feature may be of particular importance and benefit in embodiments where the documenting devices are the security cameras already prevalent in casinos. Using security cameras as documenting devices for purposes of the present invention may be beneficial and lucrative to the casino by creating a new source of revenue and a new function for the security cameras. However, it would also be beneficial to a casino in such embodiments to retain sufficient control over the security cameras such that the security camera's primary function may be observation of suspicious activity identified by casino personnel rather than documenting events to increase casino revenue, as the casino desires.

A status of "in use" may indicate that the device is currently operating to perform a specific function and thus not available for direction by the controller. For example, a device that is a documenting device such as a microphone or camera may currently be operating based on a previous direction by the controller to document an event and may therefore not be yet available to document another event.

It should be noted that directing a device (e.g., by the controller) may comprise directing a device to perform a function. Performing a function may or may not comprise physical movement of the device. For example, the controller may direct a camera to move such that it is angled towards a specified gaming device. Directing a device may also comprise directing a device to focus on a specific area, object, or person without physical movement of the device. For example, the controller may direct a camera to focus in on the face of a person playing a gaming device, to turn on, or to start recording.

It should also be noted that the device database 225 may be particularly beneficial in an embodiment where the controller directs various devices to perform various functions as necessary (e.g., as occurrences of events are detected). In other embodiments the controller may not direct devices on such an ad hoc basis. In some embodiments a dedicated documenting device that automatically documents all events as they occur may be assigned to a gaming device, area of a casino, and/or player. For example, each slot machine in a casino may be equipped with a camera and/or microphone that record a player's reaction to each outcome (or, e.g., each outcome that matches a predetermined outcome, as discussed below). In such embodiments there may be a subsequent selection of documented events for sale or presentation to the player. Such a selection may be performed, for example, using software on a computing device such as the controller, by casino personnel, by the player, or any combination thereof. Selection of a subset of the documented events is discussed in more detail below.

In one embodiment, a gaming device may be operable to detect an event, document the event, and/or output an offer to a player regarding the event. For example, the gaming device may output an offer to store a captured documentation of the event. It should be noted that a gaming device being operable to perform a function may comprise the gaming device being operable to perform the function at the direction of another device (e.g., a controller of the gaming device) and/or based on a program of the gaming device.

Referring now to FIG. 4B, a tabular representation of an embodiment 450 of the device database 225 (FIG. 2) is depicted. The tabular representation of the device database includes a number of example records or entries, including the entries 475 through 490, each of which defines a camera. Those skilled in the art will understand that the device database may include any number of entries. The tabular representation of device database 450 also defines fields for each of the entries or records. The fields specify: (i) a camera identifier 455 that uniquely identifies the camera; (ii) a camera coverage description 460; (iii) a camera status 465; and (iv) an associated gaming device 470. Table 450 may be utilized in an embodiment where the documenting of events comprises capturing images (e.g., of a person's reaction to the event) based on the event.

The information stored in the camera identifier field 455 uniquely identifies each camera defined by each respective record. The information stored in the camera coverage description field 460 stores information describing the area in which images may be captured by the corresponding camera. The controller may utilize the information stored in the camera coverage description field in selecting which camera to direct to document the occurrence of a particular event. For example, if the controller determines that an event is occurring in a particular location in the casino (e.g., based on the location of the event detection device from which an indication of the occurrence of the event was received) the controller may select a camera to document the event by selecting a camera whose coverage description encompasses the location of the event detection device. In some embodiments a camera may function as both an event detection device and a documenting device. For example, a processor associated with a camera may utilize image analysis to determine whether an event that should be documented has occurred. The camera may then record an image associated with the occurrence of the event.

It should be noted that, for illustrative purposes only, the area covered by a camera is described in terms of quadrants of a circular area in table 450. However, a person of ordinary skill in the art would understand that there are many other means for describing an area in which a camera may capture an image. In some embodiments a single camera may be operable to capture an image of an entire room. In such an example the description of the area covered by the camera may comprise the name or number of the room in which the camera is located. The information stored in the camera status field 465 indicates an availability of the camera for direction (e.g., by the controller). A description of potential status types and the possible meanings of each may be found in the description of FIG. 4A above.

The information stored in the associated gaming device field 470 stores gaming device identifiers that are associated with each respective camera defined by the records of table 450. Such information may be useful, for example, in embodiments wherein documenting the occurrence of an event comprises capturing an image of a person near a slot machine at a time of occurrence of an outcome at the slot machine. In such embodiments, for example, the controller may receive a signal indicating that a predetermined outcome has occurred at a slot machine. In response to receiving such a signal the controller may select a camera that is associated with the slot machine at which the outcome occurred by searching the associated gaming device field 470 of table 450 for a gaming device identifier that corresponds to the slot machine at which the outcome occurred.

It should be noted that the gaming device identifiers may indicate a characteristic of a gaming device, such as the type of game played on the gaming device or an indication of at least one dimension of the gaming device. For illustrative purposes only, the gaming device identifiers illustrated in table 450 each beginning with the letter "G" followed by a dash, which is followed by a two digit number. The two-digit number may be used to designate a characteristic of a gaming device. For example, a video poker gaming device may correspond to the number "12" while a video keno device may correspond to the number "70". Alternatively, a gaming device the top of which is five (5) feet from the ground may correspond to the number "10" and a gaming device the top of which is three (3) feet from the ground may correspond to the number "12". Characteristics such as height may be useful in directing a camera to reposition its angle such that the face of the person playing the gaming device is likely to be captured.

Figure 5:
FIG. 5 is a table illustrating an exemplary data structure of a documented event database.

Referring now to FIG. 5, a tabular representation of an embodiment 500 of the documented event database 230 (FIG. 2) is depicted. The tabular representation of the documented event database includes a number of example records or entries, each of which defines an event that has been documented. Those skilled in the art will understand that the documented event database may include any number of entries. The tabular representation of documented event database 500 also defines fields for each of the entries or records. The fields specify: (i) a documented event identifier 505 that uniquely identifies an event that has been documented; (ii) a time 510 at which the event occurred; (iii) event information 515 which stores information indicative of what the event was; (iv) a corresponding file identifier 520; and (v) a player identifier 525. In some embodiments, one or more device identifiers identifying one or more devices that had detected and/or documented the event may also be stored in the documented event database 230.

The documented event identifier uniquely identifies an event that is documented by the system of the present invention. An event identifier may be generated and assigned, for example, by the controller when the controller detects that the event has occurred or once the event is documented.

The information stored in the time field 510 indicates the time at which the event occurred. Such information may be used, for example, to subsequently find the documentation of the event. In embodiments wherein documenting an event comprises capturing graphical data or audio data related to the event, the time of the event may be used to search through a set of graphical data or audio data and select the subset of graphical data or audio data that is to be stored in association with the event identifier based on matching the time of the event to a time associated with the subset of graphical or audio data. For example, a video camera in a casino may continuously record graphical data throughout a predetermined period of time (e.g., a twenty-four (24) hour period of time). Each frame of the recorded video may be associated with a time. For example, the time may be embedded or stamped onto the recorded video. The controller may thus determine a time at which an event occurred, determine a location at which an event occurred and search data captured at that location for documentation of an event that is associated with the same time as the time at which the event occurred.

In one embodiment, the information stored in the time field 510 for a particular record may be used to alter the data documenting the event of the record, before the data is output. In another embodiment, the information stored in the time field 510 for a particular record may be included on a display of a gaming device when the outcome of a prior game play corresponding to the record is replayed on the display (e.g., when the gaming device regenerates and displays the outcome indicated in the record).

For example, assuming an event comprises the occurrence of an outcome on a slot machine the controller may initially store an indication of the outcome in association with the player identifier that identifies the player that obtained the outcome. For example, the controller may store an indication that an outcome of cherry-cherry-cherry was obtained by the player at slot machine #123 at 11:23:02 am on Dec. 29, 2001. Later (e.g., at midnight on that day) the controller may search through video taken by a camera associated with slot machine #123 (e.g. a dedicated camera that is continuously focused on slot machine #123) to select the video of the player's reaction to obtaining the outcome of cherry-cherry-cherry. The controller may do this by searching through the times associated with each frame of the video until it finds the time 11:23:02 am on Dec. 29, 2001. Alternatively, casino personnel rather than the controller may manually view a video tape to find the video of the player's reaction to the outcome (e.g., also basing their search of the video on the time at which the outcome occurred).

The information stored in the event information field 515 may comprise information that is an indication or description of the event that was documented. For example, if the documented event comprises an outcome that occurred on a gaming device, the event information field 515 may store a representation of the symbols comprising the outcome. If the documented event comprises the player participating in a show associated with the casino (e.g., the player was picked from the audience to participate in a magic show) the event information field may store a description of the event and the name of the show. The event information field 515 may also store information that may be helpful in finding the documentation of the event. For example, if the event comprises an event that occurred at or near a particular gaming device, the event information field may store an identifier that uniquely identifies the gaming device. Such an identifier may be used, for example, to find documentation of the event. For example, in some embodiments the gaming device may comprise or be attached to a documenting device (e.g., a camera and/or microphone). Thus the gaming device identifier may be used to determine the documenting device that documented the event and to retrieve the documentation of the event from the documenting device. The event information field 515 may also store information that comprises, or may be useful in preparing, an annotation to be included in an output of the event documentation to the player. For example, if the output of a documentation of an event comprises a printed still photograph of a player's reaction to an outcome obtained on a gaming device, the information contained in the event information field 515 may be used to print a caption that describes the event (e.g., at the bottom of the photograph). In an embodiment in which the outcome is replayed on a gaming device, the information in the event information field 515 may be overlaid or otherwise included on a display that is outputting the outcome.

The corresponding file field 520 stores a file name or file path that identifies a file containing the data documenting the event. For example, the file may contain graphical, audio, and/or textual data captured as representative of the event. In the above example, the controller may store a copy of several frames of the video (e.g., beginning with 10 frames before the frame associated with 11:23:02 am and ending 20 frames after the frame associated with 11:23:02 am) as a file and store the file name in the corresponding file field 520.

The player identifier 525 identifies a player, if any, that is associated with the documented event. A player identifier stored in the player identifier field 525 may correspond to at least one player identifier stored in the player identifier field 305 of table 300 (FIG. 3). A player identifier 525 may be determined and stored in table 500 at a time an event is documented or at another time. For example, a player identifier of a player tracking card inserted into a gaming device at a time an outcome that comprises an event that is to be documented occurs at the gaming device. The player identifier of the player tracking card may thus be stored in association with the document event identifier of the record defining the documented event. In another embodiment, an image of a player experiencing an event may be captured and compared to stored images of players associated with player identifiers. If a match of the captured image to a stored image is found, the player identifier corresponding to the matching stored image may be stored in association with the documented event experienced by the player. In some embodiments if a player experiencing a documented event cannot be identified (e.g., via a player tracking card or previously stored images of players associated with player identifiers), a new player identifier may be assigned to the player experiencing the documented event and stored in association with the associated event.

Referring now to FIG. 6A, a tabular representation of an embodiment 600 of the predetermined event database 235 (FIG. 2) is depicted. The tabular representation of the predetermined event database includes a number of example records or entries, including records R625 through R635, each of which defines an event that has been predetermined as an event the occurrence of which is to be documented. Those skilled in the art will understand that the predetermined event database may include any number of entries. The tabular representation of predetermined event database 600 also defines fields for each of the entries or records. The fields specify: (i) an event identifier 605 that uniquely identifies an event that has been predetermined as an event the occurrence of which is to be documented; (ii) an event description 610; (iii) documentation type 615; and (iv) documentation rule(s) 620.

In one or more embodiments, a player may define a predetermined event. For example, a player may indicate that an occurrence of an outcome or other event is to be documented, thereby defining the occurrence of the outcome or other event as a predetermined event. A player may so define a predetermined event before the event occurs (e.g., as the player begins playing gaming device, as the player begins a gaming session, by filling out a form when registering for a player tracking card, by informing casino personnel, etc.). In another embodiment, a player may so define a predetermined event as the event is beginning to occur, substantially simultaneously with the occurrence of the event, and/or just after the occurrence of the event. For example, a player may press a "document this" or "save" button (or, e.g., area of a touch-screen) of a gaming device as an outcome is being displayed to a player or right after an outcome is displayed to a player.

The determination that an event should be included in the predetermined event database may be based on a variety of factors. For example, casino personnel may define an event as a predetermined event. An event may also be entered into the predetermined event database once a sufficient number of players indicate that they would like their experience of the event to be documented. For example, in accordance with some embodiments of the present invention, a player may be capable of indicating to the system of the present invention that they would like an event they are experiencing or will experience to be documented. In one embodiment a player may pre-register with the system and indicate at the registration process what types of events are to be documented. In such an embodiment if a sufficient number of players indicate during their pre-registration processes that they wish to have a particular event documented, that event may be entered into the predetermined event database on the assumption that documentation of the event is of interest to most players. In other embodiments the system may be operable to receive from a player a request to document an event as the event is occurring, is about to occur, or before the event occurs. For example, a gaming device may be equipped with a "document" button or area of a touch screen which, when actuated by a player, will cause an outcome occurring on the slot machine to be documented. Other methods of a player requesting documentation of an event are described below.

Another basis on which an event may be entered into the predetermined event database is a magnitude or degree of reactions to the occurrence of the event, by players or other persons (e.g., persons watching the player when the player experiences the event). The reaction the magnitude or degree of which causes an event to be included in the predetermined event database may include, for example, a visually perceived reaction that is documented with graphical data and an audible reaction that is documented via audio data. The magnitude or degree of a reaction may be determined, for example, by casino personnel or a device such as the controller. In one embodiment casino personnel note player reactions to a certain event or type of event and enter the event into the predetermined event database if they judge that a sufficient number of players (e.g., 60%) have a reaction that is worth documenting. For example, if most players whoop, groan, slap their forehead, roll their eyes, or have another type of perceivable reaction to an event, casino personnel may cause the event to be included in the predetermined event database. In another embodiment a device such as the controller may measure the magnitude or degree of persons' reactions to an event in order to determine whether the event should be included in the predetermined event database. For example, the decibel level of audible reaction of persons in response to an event may be measured (e.g., via a microphone included in a slot machine, if the reaction being measured is a reaction to the occurrence of an outcome on the slot machine or a heart rate of a person). If a sufficient number of persons (e.g., 45%) react to an event on a sufficient decibel level or average decibel level the event may be included in the predetermined events database.

Similarly, for visual reactions, a device such as the controller may perform image analysis to determine whether a visually perceptible reaction of persons to an event is sufficient to include the event in the predetermined events database. For example, the magnitude of the change of a player's expression (e.g., by analyzing the change in the facial muscles of the player using facial analysis software) or movement of the player's body may be measured. Software such as FaceIt™ Face Recognition software by Visionics Corporation or Face Key™ Technology by FaceKey™ Corporation may be used in such an embodiment. Persons of ordinary skill in the art would know other methods and software for determining a magnitude of change in a person's face or body position.

It should be noted that the events defined by predetermined event database 600 may apply to all players of a casino, a subset of players of a casino, or an individual player of a casino. For example, in some embodiments the determination of the occurrence of an event defined in the predetermined event database 600 will result in the documentation of the event regardless of the identity or characteristics of the player experiencing the event. In other embodiments a respective table of predetermined events such as the predetermined event database 600 may be created for individual players (e.g., based on demographic information, gambling history of the player, requests of the player or requests of persons associated with the player) or for a class of players (e.g., female players over the age of 50, first time visitors to the casino, inexperienced players, players with home addresses which are at least 500 miles from the location of the casino).

The event identifier 605 uniquely identifies an event that has been predetermined as an event the occurrence of which is to be documented. An event identifier may identify a class of events (e.g., a class of outcomes, such as outcomes that correspond to a payout amount greater than a specified amount) or a particular event (e.g., a particular outcome, such as a royal flush final poker hand).

The event description field 610 may store information describing the event to be documented. The description may be in human and/or machine-readable form. The documentation type field 615 stores an indication of what type of documentation data is to be captured for each defined event. It should be noted that some events correspond to the capturing of more than one type of documentation data.

The documentation rule(s) field 620 stores one or more rules for capturing documentation of each defined predetermined event. For example, a rule may comprise a range of time, defining the timing of the documentation (i.e., when the documentation of the event should begin and when the documentation should end). An example of such a rule is included in record R625. A rule may also define the subject matter that is to be captured. For example, if audio data is to be captured the rule may define the person whose audible reaction is to be captured. Similarly, if graphical data is to be captured, the rule may define the person whose visually perceptible reaction is to be captured and whether it is the change in the facial expression or change in body movement that is to be captured. Again, record R625 includes an example of such a rule.

A rule may also define a condition that has to be satisfied before the event is to be documented. For example, it may not be beneficial to document an event being experienced by a player if the player has experienced the event many times before (e.g., because the player is a regular visitor to the casino). This example of a rule that defines a condition is another method for differentiating amongst players in determining whether to document the occurrence of an event. Another method is described above, wherein a plurality of predetermined event databases may be utilized, each database being associated with a set of player characteristics that have to be satisfied by the information associated with the player experiencing an event before the player's experience of the event will be documented. An example of a rule that comprises such a condition is included in record R630 and in record R635.

Record R630 includes the rule that data is to be captured if a player loses all his chips at a roulette table only if the player is not a "regular" player. A regular player may be, for example, a player who (i) visits the casino with at least a predetermined frequency (e.g., at least once every six months); (ii) has accumulated at least a predetermined number of comp points; or (iii) the casino otherwise defines as a player who would not likely be interested in having his experiences at the casino documented. For example, a player that plays roulette at the casino on at least a monthly basis would probably not find it noteworthy to lose a large number of his chips on a single spin and would thus not be interested in purchasing documentation of the event.

Record R635 defines the rule that a player's dining experience at a restaurant associated with the casino, "Restaurant Z", is to be documented only if (i) the player has eaten at the restaurant less than five (5) times within the past ninety (90) days, and (ii) the player does not live within fifty (50) miles of the location of the restaurant. This rule may be premised on the assumption that a player who has eaten at the restaurant recently a predetermined number of times and lives within a predetermined distance of the restaurant is not likely to find his dining experience at the restaurant noteworthy and would probably not be likely to purchase documentation of the event. In one embodiment, a restaurant example may only be documented if more than a predetermined amount (or at least a predetermined amount) is spent during the restaurant experience.

As apparent from the example entries of table 600, various types of events may be defined as predetermined events. For example, a particular outcome (e.g., "7-7-plum" on a three-reel slot machine) may be defined as a predetermined event. In another example, any outcome corresponding to a payout having a specified characteristic (e.g., the payout being at least equal to a specified amount, such as 1,000 credits) may be defined as a predetermined event. In another example, a wager having a specified characteristic (e.g., the wager being of an amount at least equal to a specified amount, such as fifty (50) credits) may be defined as a predetermined event. In yet another example, a player's indication that an outcome or other event is to be documented should it occur may be defined as a predetermined event. In yet another example, a sensitivity limit of a sensor such as a motion detector or sound detector having been reached or exceeded may be defined as a predetermined event. In yet another example, an event may be defined as a predetermined event based on information relevant to a particular player. For example, a player winning a payout greater than any payout won by the player within a predefined time frame (e.g., since the player's outcomes have been recorded, during a particular play session, during a particular visit to the casino, etc.) may be defined as a predetermined event. In another example, a player winning a payout that is larger than an average payout paid to the player over a particular period of time may be defined as a predetermined event.

Referring now to FIG. 6B, a tabular representation of an embodiment 650 of the predetermined event database 235 (FIG. 2) is depicted. The embodiment 650 may be used in embodiments where the events being documented are occurrences of outcomes on gaming devices. The tabular representation of the predetermined event database includes a number of example records or entries, including records R675 through R685, each of which defines an event that comprises an outcome on a gaming device that has been predetermined as an outcome the occurrence of which is to be documented. Those skilled in the art will understand that the predetermined event database may include any number of entries. The tabular representation of predetermined event database 650 also defines fields for each of the entries or records. The fields specify: (i) an outcome identifier 655 that uniquely identifies an outcome that has been predetermined as an outcome the occurrence of which is to be documented; (ii) an outcome 660 that defines the outcome to be documented; (iii) documentation type 665; and (iv) documentation rule(s) 670. Outcomes may be entered into the predetermined event table 650 based on the same or similar methods as described with reference to predetermined event table 600 (FIG. 6A).

The outcome identifier 655 uniquely identifies an outcome or class of outcomes that are to be documented. The outcome field 660 stores a description of the outcome to be documented. The description may comprise the particular symbols comprising the outcome or at least one characteristic of an outcome. For example, record R675 includes an outcome description that encompasses all outcomes which correspond to a payout amount of at least $50.00. In another example, all outcomes obtained during a bonus round may be documented.

The documentation type field 665 may store information indicating what type of data is to be captured for the documentation of the outcome (e.g., graphical, audio, or textual). The description of documentation type field 615 with reference to table 600 (FIG. 6A) also applies to the documentation type field 665. The documentation rule(s) field 670 stores one or more rules for documenting a defined outcome. The description of documentation rule(s) field 620 of table 600 (FIG. 6A) applies to the documentation rule(s) field 670. It should be noted that some rules may be based on a precursor of an outcome. For example, in poker or video poker, whether the occurrence of a final hand is documented may be based on what cards were included in a initial hand. Records R680 and R685 include examples of such rules. For example, it may be memorable for a player playing poker or video poker to document the occurrence of a royal flush in a final hand under any circumstances, but it may be particularly memorable to document such an occurrence of a royal flush if the initial hand did not include any cards towards the royal flush. Similarly, if an initial hand in poker or video poker contains four (4) cards to a flush but the final hand does not comprise a flush, such an outcome may be considered particularly unlucky or unfortunate result and thus particularly memorable to a player (e.g., may be a result the player wishes to remember and would pay for documentation of so he can share it with his friends and family).

In one embodiment of the present invention, all or many outcomes obtained by a player may be recorded and the player's reaction to the outcomes documented. However, initially not every documentation may be offered to the player for purchase or storage. Rather, the system may record and document the occurrence of outcomes and then determine that one of the recorded and documented outcomes is a predetermined outcome. Determining that a documented outcome is a predetermined outcome may comprise determining that the combination of symbols of the documented outcome match a predetermined combination of symbols. Determining that a documented outcome is a predetermined outcome may also comprise determining that the documented outcome satisfies a predetermined condition. Such a condition may be based on the determined documented outcome and/or on other documented outcomes. Once the system determines that one of the documented outcomes is a predetermined outcome, in one embodiment the system may further select some or all of the remaining documented outcomes obtained by the player and offer the documentations of the outcomes (both the determined outcome and the selected remaining outcomes) for purchase to the player. The documentations of the selected outcomes may be arranged in an order based on the predetermined outcome. For example, the documentations of the selected outcomes may be arranged based on the time at which each was obtained or in another manner that tells a coherent story. Some examples of this embodiment follow.

In one example of the above-described embodiment, a documented outcome obtained by a player may be determined to be a predetermined outcome based on other outcomes obtained (by the same player or other players) subsequent to it. For example, a player may be willing to buy documentation of the outcome that corresponds to the highest payout amount obtained by the player during a specified period of time (e.g., the highest payout amount of the day, the week, for a given game, during the player's trip). However, which documented outcome corresponds to the highest payout for a specified period of time cannot be determined until the period of time has ended. Thus, in such an example, the system may document each of the outcomes that respectively correspond to a payout for the specified period of time and, once the period of time has ended, select the documented outcome that corresponds to the highest payout amount. Similarly, a player may be interested in purchasing documentation of an outcome if the outcome was an outcome that corresponded to the highest payout amount obtained by a group of players during a specified period of time (e.g., if the player obtained an outcome that corresponded to the highest payout obtained by any player during a particular day, at a particular gaming device, by any player of a designated group of players and/or while playing a particular game). Accordingly, the system would record and document a plurality of relevant outcomes obtained by a plurality of relevant players for a relevant period of time before determining whether the player had obtained a predetermined outcome.

In another example, a particular outcome by itself may or may not be memorable for a player but may be output in a memorable fashion such that the player is likely to purchase documentation of it if it is in the context of other outcomes. For example, a player may obtain a flush while playing poker at a table game or video poker at a gaming device. Such an outcome may be memorable for a player but may be even more memorable if the player had attempted to obtain a flush on a plurality of previous hands and had suffered a plurality of bad breaks prior to finally obtaining the flush. Accordingly, once the player obtains the flush the system may retrieve other initial hands obtained by the player that could have resulted in a flush but didn't (each of which had previously been documented). The system may then order the documented events (e.g., the initial hands, corresponding final hands, and the player's reaction to each) and order them based on the time each was obtained, from earliest to latest, with the last being the outcome that comprised the successfully obtained flush. The system may then output the set of documented outcomes to the player in an order and format that conveys the story of the player's series of attempts to obtain the flush and his final success. Similarly, a player's win of a jackpot may be memorable, but may be even more memorable if the player proceeds to double or lose the amount of the jackpot through subsequent betting. In such an example, the system may determine that the outcome that results in the player's loss of the last of the jackpot amount is the predetermined outcome. The system may then select each documented outcome from the time of the jackpot win (including the outcome that corresponded to the jackpot win) to the predetermined amount. The system may then output the set of documented outcomes in an order that conveys the story of the player's initial monetary victory and final monetary loss.

As described herein, in one embodiment documentation of a single outcome and/or circumstance surrounding the obtainment of the outcome (e.g., the player's reaction to the outcome) may be offered for purchase and/or storage to the player. It should be noted that, in one embodiment, no payment or consideration may be required in exchange for documenting, storing or outputting data associated with a prior game play. For example, a casino may offer such services as a convenience to its patrons (e.g., in an effort to gain a competitive advantage over other casinos). Thus, in one embodiments, a player may have experiences documented and gain access to such documentation for free. For example, a player may be provided access to data associated with a prior game play any time the player provides his player identifier and requests such access.

In one or more embodiments, a determination may be performed as to whether documentation of a documented event should be stored. In other words, in one or more embodiments, a determination that an event qualifies as a predetermined event and is to be documented is a distinct determination from a determination of whether the documentation of the event is to be stored. For example, in one embodiment, a casino may store on a server or other computing device data documenting various events experienced by players. The stored data may be available for access to players and/or gaming devices. For example, a player may be provided with a code or other identifier, or may utilize the player identifier on his player tracking card, to retrieve stored data documenting an event and view the data (e.g., on a gaming device of the casino). In such an embodiment, a player may be required to provide payment or other consideration in exchange for having the data stored and/or in exchange for viewing the data. Further, in such an embodiment an offer may be output to the player to store the data once the data is captured.

For example, once data documenting the occurrence of a memorable outcome is captured, an offer may be output to the player who obtained the memorable outcome. The offer may comprise an offer to store the data for the player's future access. Further, the offer may include an outputting of the data, such that the player may view the data when making the decision as to whether to accept the offer to have the data stored. In another embodiment, data documenting an event may automatically be stored for a predetermined period of time. For example, a player may be informed that the data was captured and is available (e.g., and the player informed as to how the data may be accessed). In such an embodiment, the data may be stored for a predetermined period of time (e.g., one week). If the player accesses the data within the period of time, in one embodiment the data continues to be stored (e.g., for another predetermined period of time). If the player does not access the data within the predetermined period of time, in one embodiment the data may no longer continue to be stored.

In one embodiment, data documenting an event may be temporarily stored until it is determined whether the data is to be more permanently stored. In one embodiment, temporarily stored data may be permanently stored (or stored for a longer duration) if one or more conditions are satisfied. For example, if a player indicates that the data is to be stored and/or pays a fee for storing the data, the data may be stored. In another example, the data may be stored only if the player associated with the data is identified. Other conditions for storing the data may be defined by an entity implementing aspects of the present invention.

Referring now to FIG. 7, a tabular representation of an embodiment 700 of the documentation package database 240 (FIG. 2) is depicted. Such a database may be used in an embodiment where a player may register for documentation of his visit to the casino and thus select how, when, or which events experienced by him are to be documented. The tabular representation of the documentation package database includes a number of example records or entries, each of which defines a documentation package available for purchase by players. Those skilled in the art will understand that the documentation package database may include any number of entries. The tabular representation of documentation package database 700 also defines fields for each of the entries or records. The fields specify: (i) a documentation package identifier 705 that uniquely identifies a documentation package; (ii) a package price 710; (iii) documentation rule(s) 715; (iv) an included in output field 720 that stores an indication of what is included in the output of a documentation package; and (v) a package output type 725 that stores an indication of the type of output of the documentation included with a documentation package.

The documentation package identifier 705 is an identifier that uniquely identifies a documentation package that is available for purchase. If a player purchases a documentation package, the documentation package identifier may be stored in association with the player identifier (e.g., in the player database 300 of FIG. 3). In one embodiment, the player may be provided with the documentation package identifier to input into each gaming device the player plays. In such embodiments the documentation package identifier may also uniquely identify the player (e.g., the documentation package identifier may comprise a combination of the documentation package identifier and a player identifier that uniquely identifies the player).

The package price 710 is the price a player pays if the player wishes to register for a defined documentation package. In some embodiments, the price of a documentation package may be customized based on information associated with a particular player (e.g., players that are visiting the casino for the first time may be offered a discounted price; players that have accumulated a predetermined amount of comp points may be offered a discounted price).

The documentation rules 715 are rules defining what events are to be documented for each defined package. The included in output field 720 defines the amount of data included in the package, as it will be provided to the player. The amount of data may be specified in a variety of formats, based on the form of the documentation as it will be output to the player. For example, if the documentation is to be output to the player in the form of a scrapbook or photo-album, the amount of data may be specified as a number of images, a number of pages, and/or a number of words or characters. In another example, if the documentation is to be output to the player in the form of a floppy disk, CD-ROM, or electronic file the amount of data may be specified as a number of bytes. In yet another example, if the documentation is to be output to the player in the form of a video, the amount of data may be specified as a duration of video.

The package output type 725 stores an indication of how the documented events of each documented package are to be output to the player purchasing the package. It should be noted that documented events may be output to a player in a variety of forms. Some forms are electronic (e.g., access to a Web page containing the documented events experienced by the player) while others are tangible items (e.g., a scrapbook, photo-album, or CD-ROM containing the documented events experienced by the player). It should be noted that more than one output type may be specified by a package or requested by a player. It should further be noted that in accordance with some embodiments, any of the parameters of a package may be customized by a player (e.g., a player may request that a specific event not typically included in a package be documented) or a customized package may be created by a player.

It should be noted that a player may purchase a documentation package before, during, or after his visit to the casino. For example, a player may access a Web site associated with the casino and select and purchase a documentation package via the Web site. The player may do this, e.g., using a personal computer or any other device capable of accessing such a Web site, from his home or another location before visiting the casino. The player may also purchase a documentation package during his visit to the casino (e.g., via a kiosk, gaming device, or other device). For example, an offer for at least one available documentation package may be presented to a player while the player is playing a gaming device. Such an offer may be presented, for example, along with an offer for purchase of a specific documentation of an event experienced by the player. When a player purchases a documentation package the player may further indicate the dates during which the documentation package is to be effective (e.g., the dates during which the player plans on visiting the casino). Such date information may be stored, for example, in association with the documentation package identifier in the player database 300 (FIG. 3).

It should be noted that, in some embodiments described herein, a single gaming device and/or a peripheral device associated therewith may function to detect an occurrence of an event, document the event, and/or output an offer regarding the documentation of the event to a player. In such embodiments, a gaming device may not necessarily act at the direction of a controller or server in carrying out any or some of these functions. Further, in some embodiments the gaming device may store some of the information described herein as being stored in the above-described databases (e.g., a gaming device may store an indication of predetermined events, rules for documenting events, and/or rules for storing documentation of events). Similarly, the gaming device need not have access or utilize all of the information described as being stored in the above-described databases. Further still, some of the functions described as being carried out by a controller may be carried out by a gaming device instead of, in conjunction with or in addition be being carried out by the controller.

In embodiments wherein a gaming device captures data regarding an event, the gaming device may transmit the data to the controller or another device, for purposes of storage and future access to the data by a player associated with the event.

Processes

Figure 8:
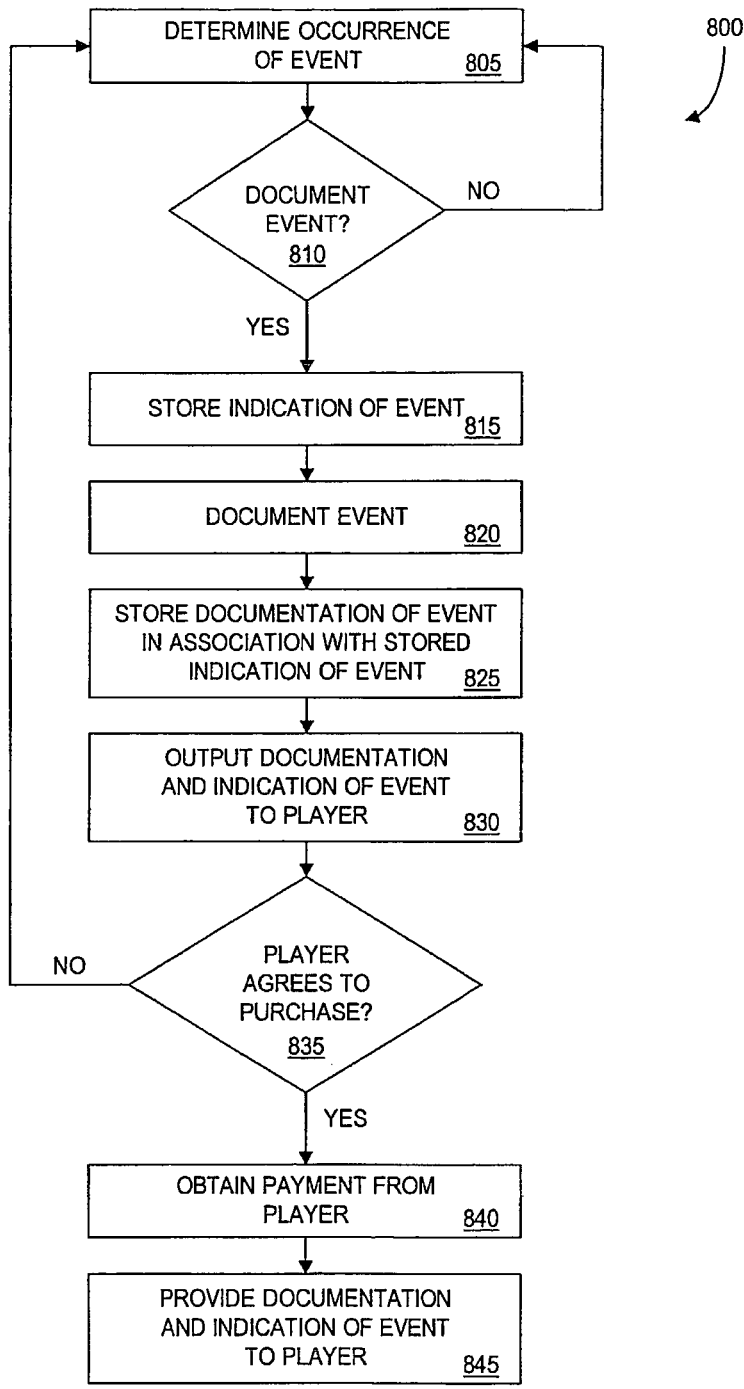
FIG. 8 is a flow diagram illustrating an exemplary process according to an embodiment of the present invention.

Referring now to FIG. 8, a process 800, in accordance with some embodiments of the present invention, is described. The process 800 may be performed, for example, by the controller 110 and/or a gaming device. The steps of the process 800 may be performed by different devices or combinations of devices. No particular order of the performance of the steps of process 800 is necessary.

The process 800 begins at step 805, where the occurrence of an event is determined. The occurrence of an event may be determined by various methods. In some embodiments, the controller may monitor all gaming devices for the occurrences of events that match predetermined events or predetermined criteria. In some embodiments a variety of event detection devices throughout a casino may monitor activities at the casino for occurrences of events that match predetermined events or predetermined criteria. For example, in embodiments where a camera functions as an event detection device, the camera may monitor images of players, outcomes of table games, and/or outcomes obtained on gaming devices. By analyzing the image a processor associated with the camera may determine whether an event has occurred. For example, if a facial expression or body position of a player suddenly alters, the processor associated with a camera may determine that an event has occurred. In another example, if an outcome that corresponds to a payout is obtained at a table game or gaming device, the processor associated with the camera may determine that an event has occurred.

In some embodiments a gaming device may function as an event detection device and monitor the outcomes obtained on the gaming device and/or the reaction of the player to outcomes obtained on the gaming device to determine whether an event has occurred. For example, a gaming device may store a table of predetermined outcomes, the occurrence of which is defined as an event. The gaming device may thus determine that an event has occurred if one of the predetermined outcomes has been obtained on the gaming device. In another embodiment the gaming device may not perform the determination of whether an outcome has occurred but may rather transmit signals indicative of outcomes obtained on the gaming device or data indicative of the player's reactions to outcomes obtained on the gaming device. The gaming device may transmit such signals and/or data to a controller such as controller 110 or to a casino server (which may, in some embodiments, transmit such signals and/or data to the controller 110 in some embodiments). In such embodiments the controller and/or casino server may perform the determination of whether an event has occurred.

In some embodiments, a player may be equipped with a device capable of communicating with the system of the present invention and capable of communicating to the system that an event has or is about to occur. For example, a player may be equipped with a cellular telephone or personal digital assistant (PDA). The player's cellular telephone or PDA may be operable to communicate (e.g., wirelessly) with the controller, a casino server, or a documenting device such as a slot machine or security camera. The player may thereby alert a documenting device, casino server, or the controller that an event has occurred and the player requests that it be documented.

Determining the occurrence of an event may comprise determining that an event (i) is about to occur, (ii) is in the process of occurring, or (iii) has just occurred. For example, in embodiments wherein documenting an event comprises documenting a player's reaction to an outcome obtained on a gaming device, it may be beneficial to determine that an outcome is about to be displayed to the player before the outcome is actually displayed to the player. This may allow sufficient time to direct a documenting device to capture the player's reaction from just before the outcome is displayed to the player to the end of the player's reaction or a leveling off of the player's reaction. For example, it may be beneficial to begin capturing a player's reaction to an outcome one (1) to two (2) seconds before the outcome is displayed to the player and ending three (3) to five (5) seconds after the outcome is displayed to the player. Such a period of time will, in many circumstances, allow for the capturing of the full extent or range of the player's reaction.

In such embodiments determining the occurrence of the outcome may comprise determining that an outcome is going to be displayed to a player by determining that a random number corresponding to a particular outcome has been determined by the gaming device. This would allow time for directing a documenting device (e.g., a microphone and/or camera) to focus on the player or another relevant person or to become activated. Such focusing or activation may be occurring while the reels of a slot machine are spinning or while the initial hand in a video poker hand is being dealt. In some embodiments, if more time is needed to direct a documenting device, the gaming device may be directed to extend the period of time at the end of which the outcome is displayed to the player. For example, a slot machine may be directed to spin the reels for an extra two (2) seconds before displaying the outcome to a player if necessary to direct a documenting device to fully capture the reaction of the player or another person. In some embodiments the documenting device is a component of the gaming device or attached to the gaming device. In such embodiments, if it is determined by the gaming device that the documenting device is temporarily unavailable or taking longer than usual to become ready to document the reaction, the gaming device may be programmed to recognize the need for more time. Consequently, the gaming device may automatically extend the period of time at the end of which the outcome is displayed to the player.

The following is a non-exhaustive list of events the occurrence of which may be determined, in accordance with embodiments of the present invention:

(i) The player achieves a predetermined outcome defined by the player. For example, a player may indicate that only certain outcomes are to be documented, or may wish to document all outcomes, all outcomes during a particular session, all outcomes at a particular machine, at a particular location, obtained near a particular person, etc.

(ii) The player achieves an outcome that pays out a certain minimum number of dollars or credits (i.e., the outcome corresponds to a payout amount of a certain magnitude).

(iii) The player achieves a certain number of winning outcomes in a row or in close proximity (temporal or geographical) to one another.

(iv) The player comes close to achieving a winning outcome. For example, one reel of a slot machine is only slightly off what would otherwise correspond to the jackpot.

(v) The player has the opportunity to achieve a winning outcome. For example, the player may have qualified for the bonus round of a slot machine game, or the player may have four cards to a royal flush in video poker. The player in such a circumstance has a good opportunity for a large payout.

(vi) The player is in the midst of an exceptionally fin part of a game. For example, a game may have exceptionally fun graphics or an interesting story even if there is not the possibility for a large payout.

(vii) Others in the vicinity of the player achieve winning outcomes. For example, the player may be next to a person who has won a slot machine jackpot. The player may be at a Crap's table where most people are on a winning streak. The excitement of the crowd might be something worth documenting.

(viii) The dealer at a blackjack table busts (exceeds 21 points). The dealer busting is often an exciting event for blackjack players.

(ix) The player's bankroll reaches a certain point. The player's bankroll may be what cash he has with him, or what credits he has in the machine. The bankroll may be reaching a new high, a new low, an even mark, etc.

(x) The player loses on a particular outcome.

(xi) The player loses on a certain number of outcomes in a row or on a certain number of outcomes in close proximity (temporally or geographically) to one another.

(xii) The player makes his first handle pull of the day. Also noteworthy may be the first handle pull of a session, the first handle pull at a particular machine, the first handle pull using the credits from a new twenty dollar bill, etc. Similarly, the last handle pull of the day, the last handle pull of a trip, etc., may be worthy of documentation.

(xiii) The player eats at a restaurant. Documentation of this event may include documenting the menu, the particular meal the player ordered, the service the player received, the company the player was with, and so on.

(xiv) The player meets, or sits next to an interesting or famous person. For instance, the player may sit beside a person at a blackjack table who places $1000 bets. Documenting such an event may include, for example, capturing a photograph of the player beside the $1000 bettor.

(xv) The player goes to a show. Documenting such an event may include, for example, documenting the show itself, documenting the player entering the show, the cost of the show, obtaining an autograph of one of the show's performers, etc.

(xvi) The player checks into a hotel, or enters his hotel room. Documenting such an event may include, for example, capturing pictures of the hotel room, the view from the hotel room, the interior of the hotel leading to the room, etc.

(xvii) The player gets complimentary (comp) point or comp items. Documenting such an event may comprise, for example, documenting the number of points the player received, why the player received the points, and/or the items for which the player exchanged the points.

(xviii) The player makes a purchase (e.g., at a merchandising establishment associated with the casino).

(xix) The player watches a TV show or movie.

(xx) The player sits down at a particular gaming device. Documenting such an event may comprise documenting information about the gaming device, such as it's date of manufacture, serial number, date of installation, manufacturer, game type, payout history, etc. Such information may be important to a player for reasons of superstition or other reasons.

(xxi) The player travels outside of the casino. Documenting such an event may include, for example, documenting the player's his taxi ride from the airport, his plane ride to Las Vegas, his bus ride to Atlantic City, etc.

(xxii) Other events that happen during an event of importance to the player. For example, at the moment a player wins a jackpot, the player may wish to record what the weather is like, how many other people in Las Vegas are winning jackpots at the same moment, what political events are going on in the world, what celebrities are having their birthdays, what is the size of the progressive jackpot, etc.

(xxiii) The player receives a marketing offer. For example, the player might receive an offer of $30 if he agrees to meet with a life insurance representative. The player might document the offer itself, as well as whether or not he accepted the offer. If the player does accept an offer, then one benefit of the documentation would be to remind the player of his obligation to carry out the terms of the offer (in this case, to meet with the life insurance representative).

(xxiv) The player or a person in proximity to the player says something witty, profound, surprising, or otherwise worth capturing. Similarly, the player or another person may make an interesting facial expression worth capturing.

(xxv) The player, the player's family, and/or the player's friends travel to a water park or a theme park associated with the casino.

(xxvi) The player, the player's family, and/or the player's friends go on a site seeing tour.

Once the occurrence of an event is determined in step 805, the process 800 continues to step 810. In step 810, a decision of whether to document the determined event is made.

A decision as to whether to document the determined event may be based on a variety of factors. In some embodiments, as described with reference to FIGS. 6A and 6B, one or more rules may be associated with a predetermined event. In such embodiments, a decision as to whether to document the occurrence of the event may comprise determining whether any rule(s) associated with the event have been satisfied. In other embodiments, casino personnel may be notified of the occurrence of the event and make the decision as to whether to document the event. In other embodiments, the player experiencing the event may be presented with an offer to document the event and either agree or decline to have the event documented. The factors used to decide whether to document an event may vary based on, for example, the casino implementing the system of the present invention, the judgment of casino personnel, the identity of the player experiencing the event, a characteristic of the player (e.g., is the player facing a direction that may be documented in a sufficient manner), a time (e.g., time of day, week, month, year, etc.), and a characteristic of the event.

In some embodiments, deciding whether to document an event may comprise determining whether a documenting device is available to document the event. For example, all documenting devices capable of documenting the event (e.g., cameras in the vicinity of the occurrence of the event) may be either off-line or busy performing other functions. The determination of whether a documenting device is available may be done by searching the device database 400 (FIG. 4).

In some embodiments, security concerns may be a factor in the decision of whether or not to document a determined event. In some embodiments, documenting an event may comprise capturing an image of the event using security cameras located throughout the casino. In such embodiments capturing an image of the event may further comprise directing a security camera to focus on the area of the event. If the security camera is not already focused on the area of the event, directing a camera to focus on the event may comprise directing a camera to no longer focus on the area the camera had been focusing on prior to the direction. Such shift in focus may not be desirable under certain circumstances. For example, security personnel may be viewing suspicious activity in a certain area of a casino via the camera in question. Having the camera re-focused on a different area would interrupt such viewing of suspicious activity. Accordingly, in some embodiments the decision of whether to document an event may comprise providing casino personnel an opportunity to override the refocusing of a particular camera or to indicate that a particular camera is currently in use for security purposes. For example, a message may be displayed for a period of time (e.g., 3 seconds) to casino personnel (e.g., casino personnel monitoring security cameras) before a particular camera is refocused. The message may inform the casino personnel that the camera is about to be refocused unless the casino personnel indicate otherwise. The message may be displayed to the casino personnel in a prominent manner. For example, the message may appear on the monitor displaying the image of the camera in question and/or may blink or appear in prominent or bright font. Further, a signal such as a light or sound may accompany the message to further draw the attention of casino personnel. Casino personnel may override the refocusing by, for example, actuating a button on a control console, actuating a key on a keyboard, touching an area of a touchscreen, or speaking a command into a microphone.

In another embodiment, privacy concerns may be a factor in the decision of whether or not to document a certain event. For example, a wide-angle camera may capture both a gaming device player, who may have previously indicated approval to be recorded, and a bystander, who may not have indicated such approval. Thus, an event may not be recorded (and/or output) if a patron who has not given approval to be recorded may be seen within an image or video captured by a camera.

In another embodiment, a camera will not be refocused unless permission to do so is received from casino personnel.

In another embodiment casino personnel may preemptively indicate that a camera is currently being used for security purposes and is not to be refocused. For example, casino personnel may actuate a button or speak a command when they first begin to utilize a camera for security purposes (e.g., when they first start to observe suspicious activity). This may result in the camera being "locked" or no longer being available for use in documenting events. For example, the status of a camera may be set to "locked" in the device database 400 (FIG. 4). Such a status may be in effect until casino personnel indicate otherwise and/or until a predetermined period of time has passed.

If a decision is made not to document the event in step 810, process 800 returns to step 805, wherein a determination of the occurrence of another event is made. If a decision is made to document the event in step 810, the process 800 continues to step 815.

In step 815 an indication of the event is stored. As described above, an indication of the event may comprise, for example, a description of the event. The description of the event may comprise a textual, graphical, and/or audio description. For example, if the event comprises an outcome obtained on a gaming device, the description may comprise (i) a textual description such as "cherry-cherry-cherry"; (ii) a graphical description such as a depiction of the symbols comprising the outcome; and/or (iii) an audio description such as a voice recording that speaks the names of the symbols comprising the outcomes. An indication of the event should not be confused with documentation of the event. An indication of the event encompasses a description of the event itself while documentation of the event encompasses a representation of something that occurred as a result (e.g., the display of the symbols corresponding to the outcome on an output device of a gaming device) or in response to the occurrence of the event (e.g., the reaction of a person to the occurrence of the event).

The indication of the event may be stored, for example, in a player database such as table 300 (FIG. 3) or in another record of occurred events (e.g., a database of occurred events). An indication of an event may also be stored locally at a device (e.g., a data storage device associated with a gaming device), or on a player tracking card of a player who experienced the event. Storing an indication of an event may comprise storing a file that contains the description of the event. Storing an indication of an event may also comprise storing an identifier that allows location of the indication of the event (e.g., a time at which the event occurred and a device identifier that identifies a device stores an indication of the occurrence of the event). Storing an indication of an event may also comprise determining not to store an indication of another event when doing so would interfere with storing the indication of the subject event.

In some embodiments, process 800 may also include a step of determining whether to store a captured documentation of an event. For example, if documentation of an outcome was captured, the player associated with the outcome may be queried as to whether the player would like to have the outcome stored and available for subsequent access. In such an embodiment, the documentation may only be stored if the player responds in the affirmative to such a query. In one embodiment, a player may be required to provide payment before documentation of an event is stored for the player's subsequent access.

In some embodiments, wherein an event comprises an outcome obtained on the gaming device, the gaming device may store indications of outcomes locally in memory. The gaming device may later transmit the indications of the obtained outcomes to a casino server and/or controller. Alternatively, the gaming device may transmit an indication of each outcome as it occurs to a casino server and/or controller. The server and/or controller may then associate received indications of outcomes with the player in a database such as player database 300 (FIG. 3).

In one embodiment, a gaming device may transmit to a controller or another device only documentation that a player has agreed to have stored and/or has paid to have stored.

Indications of outcomes may be stored in simple, compressed form. For example, "cbb" might stand for "cherry-bar-bar." Indications of outcomes may be stored by using an outcome identifier, such as "OC123456." The identifier may be associated with an actual reel symbol configuration (or card configuration, in a video poker gaming device) in a database, which the server, controller or the player may consult if necessary.

In another embodiment, images of outcomes are captured by cameras located throughout a casino. The camera feeds may be interpreted by a human or computer program with image recognition capabilities. The human or program may transmit an indication of the outcomes to a casino server or controller. In another embodiment, casino personnel may view a player playing gaming devices or table games. The casino personnel may record indications of the player's outcomes and communicate the indications to a casino server or controller, and/or provide them directly to the player.

In another embodiment, the gaming device does not store indications of outcomes long term. The gaming device instead prints an indication of each outcome as it occurs, or soon after it occurs, on a paper tape or other medium. The paper tape, for example, may be gradually output from the gaming device as the player makes more and more handle pulls. The player may, for example, tear off the paper tape any time he wants so as to review or save the outcomes.

In still another embodiment, the player may insert a floppy disk or other storage media into the gaming device. The gaming device may then save indications of the outcomes to the disk. In yet another embodiment, indications of outcomes are transmitted to a player device as they are generated. For example, a gaming device may maintain an infrared link to a player's PDA as the player gambles. Each outcome is then transmitted to the PDA where it can be stored.

In step 820 the event is documented. Documenting an event has been described above. Step 820 may further comprise a determination of what type of data is to be captured as part of the documentation. Such a determination may be done, for example, by accessing a predetermined event database 600 (FIG. 6A) or 650 (FIG. 6B) and determining the documentation type associated with an event.

In some embodiments, the player may choose the method or type of documentation. The player may communicate his choice in a number of ways. The player may select options from a menu (e.g., a menu presented on a gaming device or other computing device available to a player) by pressing areas of a touch screen, pressing numerals on a keypad beneath a player-tracking card reader of a gaming device, speaking choices into a microphone, etc. For example, several options for image size may be presented to the player on the screen of a slot machine. In some embodiments, a player may simply key in a full text description of what he wants. For example, the player may use a keyboard displayed on a touch screen to enter, "I would like 50 pictures taken of me at five minute intervals during the next couple of hours." The player's request may be interpreted by a human operator associated with the casino or with the central controller. Alternatively, the request may be interpreted by a computer program. The player may also voice a complete request into a microphone connected to a gaming device or documenting device. The voiced request may then be interpreted by a human or computer program.

If a player has made arrangements in advance for a method of documentation, documenting devices may simply be alerted when the player appears in their proximity and provides identification. For example, when a player inserts his player tracking card into a slot machine, the slot machine may alert the controller, which in turn tells the slot machine to begin saving the player's outcomes.

In some embodiments a player may also select options from a menu using a cell phone or a PDA. For example, he may choose a method of documentation by calling a number associated with the central controller and keying in numerals corresponding to choices of documentation methods.

A non-exhaustive list of documentation choices that may be available to the player follows. The list is not meant to be limiting in any sense but is included for illustrative purposes only.

(i) The documentation medium. The medium may include photographs, video recordings, audio recordings, text, outcome data, sketches, paintings, etc. Each may be in physically tangible or electronic form. For example, a photograph may be developed and printed, or may be digitized and posted on a Web site. A video may be put onto a videocassette tape or DVD, or may be posted on the Web as a video file.

(ii) The quantity of documentation. Quantitative information may include how many different events to document, how many different ways to document the same event, and how many copies of a given item of documentation to make. To illustrate, three different players might each ask for 10 photographs. The first player might ask to have a photograph taken whenever he wins more than $40 at a slot machine. The second player might ask that the ten photographs be taken of him in rapid succession when he wins a jackpot. The third player might ask for ten copies of a single photograph taken of him after winning a jackpot. Quantity may include the number of photographs, the number of frames in a video clip, the length of a video clip, the length of an audio clip, the number of characters in a text document, or the number of outcomes. Quantity information may also include the amount of storage space used by documentation. For example, the number of bits used to store a photograph, video, or audio clip. Storage space may even be physical, as in the amount of space used to store a photo album.

(iii) The packaging of the documentation. Packaging includes the frames on pictures, the covering of any albums, the binding of the albums, the quality of the plastics in the album, the covering of video or audiotapes or laser discs, and any introductory or contextual information. Introductory information, for example, could be included as the first track on a digital video disc (DVD). Introductory information might describe the casino the player was at, show highlights from the player's trip, show a montage of gambling images, etc. Packaging might also entail the inclusion of documentation on a product, such as a T-shirt, a mug, or a deck of cards. For example, the player might request a deck of cards, where each card contains a different picture of the player.

(iv) The processing of the documentation. Processing might involve any changes to the documentation to make it more entertaining, more cosmetically pleasing, less embarrassing, less repetitive, more sentimental, more suspenseful, etc. Thus, pictures may be altered to brighten shadowy areas, to smooth errant locks of hair, to eliminate specs or smudges, etc. Pictures may even be altered to add people or objects that had not been there originally. For example, an image of Lady Luck may appear over the player's shoulder in a picture. Pictures may also be altered to subtract people or objects. The frames of a video may be altered as pictures are altered. In addition, the processing of video may include the addition or subtraction of frames, and the speeding up or slowing down of the frame rate. For example, certain portions of the video may be shown in slow motion to increase suspense. Audio recordings may be sped up or slowed down. Audio recordings may also be passed through filters to eliminate extraneous noises, such as the background sounds of coins dropping. Outcome data may simply be changed, added or eliminated. For example, if a player does not wish to remember a string of losing outcomes, he may have them eliminated from the documentation of his trip. In another example, the processing of video may include the addition of closed captioning or other text.

As described herein, documentation of an event may be altered without input from the player, for various purposes.

(v) Payment for the documentation. The player may pay at a gaming device using cash, or credits stored on the device. In one embodiment, the player pays using a portion of a payout he is due. For example, if the player has just won $200, he may have his picture taken in front of the slot machine, and only take $198 of the pay out.

The player may also pay with a credit card by, for example, inserting a credit card or by entering a credit card number into the device.

In some embodiments the player may pay by a commitment of some kind. For example, the player might commit to playing for two hours at a gaming device. Since a casino might expect to make $50 from two hours of play, a commitment to two hours of play might serve as adequate payment for documentation. A player might also commit a portion of future payouts. For example, "I'll pay you two dollars from my next $50-or-greater payout." A player might also commit to eat at a casino restaurant, to stay at a casino hotel, to make purchases at the casino, and so on. A player might commit to do business with a third party merchant. For example, the player might commit to switch phone services to AT&T™. AT&T™ might then pay the casino or the controller on behalf of the player, AT&T™ having now acquired a valuable new customer. The player might also perform work as payment. For example, the player might participate in surveys or focus groups on-line, or might act as a security guard by monitoring feeds from remote security cameras. The player might also finance the payment for documentation. For example, the player might pay $10 per month for the next 11 months to purchase $100 worth of documentation. As payment the player may refer friends to the casino or the controller. The referrals may serve as adequate payment since the casino now has the opportunity to market to the player's friends. A player may also disclose his own intentions to the casino or controller. For example, the player tells the casino how long he intends to stay in Las Vegas. The casino or controller may then market to the player based on his disclosed intentions, perhaps offering the player a special hotel rate for the remainder of his stay. The disclosed intentions of the player serve as valuable payment for the documentation, since, by marketing to the player, the casino or controller may obtain additional revenue from the player.

It should be noted that the player input regarding documentation of an event, as described above, may occur during process 800 as an event is about to be documented or may occur at another time. For example, in some embodiments a player may input his documentation choices before he visits the casino (e.g., via a Web site) or at any time during his visit to the casino but before the occurrence of the subject event. In some embodiments a player may input some information at a time prior to the occurrence of an event and then be asked for additional information or preferences regarding documentation once the event occurs.

As described above, documenting an occurrence of an event may comprise capturing an image representative of the event. As also described above, there are several ways of capturing images to document the occurrence of an event. For example, casino security cameras may film the player. The filming may be done as part of the cameras' primary function, detecting cheating. U.S. Pat. No. 5,801,766 to Alden describes a method of using a security camera to monitor gambling at a roulette gambling table in order to detect movement of hands (and potential cheating) immediately after the end of each game. The entirety of this application is incorporated by reference herein. The filming may also be done with the primary purpose of documentation, e.g., for a player's scrapbook.

In some embodiments, images of a player may also be taken using cameras built into gaming devices, or using hand held cameras carried by casino employees. In one embodiment, a player achieves a triggering outcome, such as a jackpot. The player's gaming device then alerts casino employees to approach the player with cameras or other recording devices and to record the player. The gaming device may also communicate with other casino devices that would enhance the documentation process. For example, the player's gaming device might communicate with overhead lights, which would then focus on the player, acting much like a spotlight. Such generous lighting might ensure better results in the photographing of the player. A mobile, overhead microphone might also move towards the player to better capture some of the player's words or vocalizations of emotions.

In some embodiments, the player is photographed using his own camera. The player's camera may be in communication with one or more gaming devices or documenting devices. These devices would indicate to the player's camera when to take a photograph. For example, when the player has achieved a winning outcome, the player's slot machine may alert the player's camera to take a photograph.

The sounds of the player's experience may be recorded using microphones. The microphones may be built into gaming devices, may be placed next to casino security cameras, or may be otherwise situated. A player might carry his own microphone too. In one embodiment, a player employs a mobile phone to record sounds. For example, the player dials a number associated with the controller when he desires to record sounds. The player enters an identifier, allowing the controller to associate the sounds with the player's scrapbook. The player may then speak into the phone, or hold the phone up to the air, and the controller may record the sounds.

A player may also wish to document text of various sorts. For example, the player eats at a restaurant and wishes to record what the menu was. The player could simply photograph the menu. The player might also remember the name of the restaurant and transmit the name to the controller. The player might, for example, key in the name of the restaurant at a gaming device. The controller might then look up the restaurant's menu on-line and make a copy for the player's scrapbook. In another embodiment, the player provides an identifier to a restaurant employee. The restaurant employee may then contact the central controller, informing the central controller of the contents of the menu, and with whom to associate the text of the menu. The restaurant employee may also communicate to the central controller what the player ate, how much the player paid, take pictures or other documentation of the player, and so on.

Many other events may be documented. For example, many players on a trip to Las Vegas enjoy playing golf between gambling sessions. Players often record their golf performances using scorecards. A player who has filled out a scorecard may submit the card to the manager of a golf course, who may then scan the card and transmit the image of the card to the central controller. The card may then become part of the documentation for the player's trip. In another embodiment, the player keeps his score electronically, as on a PDA. The player may then download performance data from his PDA to the central controller to be included as part of the player's scrapbook.

There are other games where scores are kept. For example, bowling scores may be recorded and become part of a player's scrapbook. Rifle range scores may also be kept.

A shopping experience of a player may also be documented in some embodiments. For example, when a player makes purchases at a POS terminal, the POS terminal may transmit to the controller both the player's identity and the purchases the player made. For example, the POS terminal transmits the names of the items purchased and the amounts for which the items were purchased. The POS terminal may also transmit descriptions of the purchased item. For example, "this diamond necklace was crafted by Sam Jones, the master jeweler . . . ."

In some embodiments, when a casino server or controller documents an event, the casino server or controller may give the player an opportunity to affect certain poses, to add comments, to comb hair, etc. For example, the casino server or controller may transmit a message to the player, asking the player to look upwards and to the right so as to face directly into a security camera to have his picture taken. In doing so, the casino server might refer to a database, which tells a player at any given gaming device where to look in order to face the closest camera. The controller might also ask a player to make a statement for posterity, such as "I'd like to thank my brother Joe who insisted I should give this machine a try . . . ."

It should be noted that the controller or other entity (e.g., gaming device) might document an event either before or after asking a player whether he would like to receive documentation of an event and/or whether the player would like to have the documentation stored and available for future access. For example, a player might win a jackpot and then be asked whether he would like to receive an image of himself as he won. In one embodiment, by the time the controller presents the offer to the player, the controller already has stored an image of the player as the player won the jackpot. In such an embodiment, the controller is not asking the player whether he wants a new image captured, but whether he would like a copy of an existing image, (e.g., stored as a frame on a video cassette tape and captured by a casino security camera). However, in other embodiments the controller may capture images of the player after the player accepts an offer. In such an embodiment, however, some time may have passed since the winning outcome occurred, and the player may not be quite as emotional as he was initially.

In some embodiments a gaming device may continuously save new images from a camera to a computer memory, and, at the same time, remove images taken more than a set time in the past. This looping mechanism allows the gaming device to always have recent events saved, while not overloading its memory with images from the distant past. The gaming device or controller is thereby able to offer the documentation of a recent event for the player's scrapbook. In some embodiments, when a recent event has been noteworthy, the overwriting mechanism stops so that the player has time to agree to save the images before they are erased. For example, when the player wins a jackpot, the gaming device may momentarily discontinue the erasing of stored images. The controller may then ask the player whether the player would like to purchase images of himself during the winning moment. If the player wants to purchase the images and thus wants the images saved, then the images may be transmitted to the controller for storage in association with the player identifier of the player. In any event, once the player has made his decision, the images can be erased from the slot machine's computer memory, and the looping can proceed once more.

In step 825 the documentation of the event is stored in association with the stored indication of the event. Storing documentation in association with a stored indication of an event may comprise, for example, storing the documentation and the indication in the same record of a database (e.g., a documented events database or a player database) or storing the documentation and indication in association with a common identifier (e.g., the player identifier of the player who experienced the event, the event identifier, a new identifier that is generated to uniquely identify the association of the documentation and indication of the event, etc.). A common identifier may or may not comprise an identical identifier. For example, an identifier associated with the documentation of the event may be different from the identifier associated with the indication of the event but may be a common identifier by virtue of a portion of the identifier being the same.

In some embodiments wherein documentation of an event comprises video of the event, frames of the film may be stored on videotapes or on other electronic or magnetic media. The frames may be stored at the casino server or may be transmitted to the controller and stored in a database. In one embodiment, every frame is associated with information partially describing the content of the frame. For example, a frame may be associated with the time at which it was made, and the camera from which it was generated. Furthermore, a gaming device or area of a casino depicted in a frame may also be identified. In the meantime, a gaming device may record the times at which a particular player played at the gaming device. Therefore, by matching the time and the gaming device associated with a frame, with the time at which a person was at a particular gaming device, the controller may deduce which frames depict which players. The controller may later provide these frames to the player as part of the player's scrapbook.

The process of matching a time associated with a picture frame with a reference time may be done with a computer program. For example, a documenting device may print (on an inconspicuous part of a frame) a series of numerals representing a time on a medium on which frames documenting an event are contained. The medium containing the frame of interest may then be inserted into another device whose output is analyzed by a computer program. In one embodiment the program seeks to recognize the numerical characters on each frame describing the time at which the frame was taken. A time might read, "8:38:23.89 PM", may indicate that the frame was taken at 8:38 and 23 seconds and 89 hundredths of a second, in the evening. To make the job of the program easier, numerals might be printed in a format easily recognizable by a computer, e.g. a block format. Furthermore, the time might always be printed in a specific location on a frame, perhaps in the lower right hand corner. The time might also be printed in a specific and unique color anticipated by the computer program. The medium may then be played at an accelerated rate, with the computer program interpreting the time in each frame. When the time matches that of a reference time (i.e. the time at which an event occurred), the program may pause the search or analysis of the medium. Perhaps the frame is digitized from the tape and later converted into a photograph. In another embodiment, the frame may be physically cut from the tape and developed into a photograph.

In one or more embodiments, the time at which an image or other data was captured may be used to alter the image such that an indication of the time is included in the image when the image is output to the player.

In another embodiment, each frame does not have a time printed directly on the frame. Instead, the casino server or documenting device notes the time at which the documenting device began documenting, and the speed (in frames per second) at which it has been documenting. It is then possible to deduce the time at which each frame on the medium of the documenting device was captured. To later obtain the proper frame, a computer program would count off frames from the beginning of the medium until it came upon the desired frame number.

In another embodiment, the feeds from security cameras are digitized and sent directly to the casino server or controller. The casino server or controller may then associate in a database both a time and a camera identifier with each frame.

Then, to find a desired frame, the casino server would need only perform a database lookup indexed by time and camera. In some embodiments, the digitized frames might also be sent directly to the player, allowing the player to select the preferred frames (e.g., for his scrapbook, for availability for subsequent retrieval, etc.).

In step 830 the documentation and indication of the event is output to the player that experienced the event. This step 830 may include outputting an offer to sell the documentation and the indication of the event to the player. Outputting the documentation and indication of the event to the player may comprise, for example, displaying a captured image of the player's reaction to an outcome of a gaming device wherein the image includes an indication of the outcome (e.g., the symbols comprising the outcome are displayed along the bottom of the image). In some embodiments step 830 may be omitted. For example, a player may have previously agreed to purchase documentation of certain events. In such an example the documentation and indication of the event may simply be stored for later provision to the player (e.g., as part of a scrapbook of documented events). In another example, a decision as to whether an image is to be provided or presented to the player as available for storage or purchase may not be made until it is determined whether certain conditions are met. For example, as described above, subsequent outcomes of a player may be determined and documented and a determination of whether any of the documented events comprises a predetermined event made (e.g., which outcome corresponded to the player's highest payout amount of the day).

In embodiments wherein a player has not previously agreed to pay for documentation of one or more events, the presentation to the player of the documentation and indication of the event may include an offer to allow the player to purchase the documentation and indication (as presented or in another form). For example, the offer may allow the player to purchase the image being displayed on the gaming device as a single image or as part of a compilation of data (e.g., a scrapbook). The offer may include a price. The price may, in some embodiments, be deductible from the player's current credit balance or billable to the player's hotel bill if the player is a guest of a hotel associated with the casino.

In step 835 it is determined whether the player agrees to purchase the documentation and indication of the event. If the player does not agree to purchase the documentation and indication of the event, process 800 returns to step 805, where the occurrence of another event is determined. If the player does agree to purchase the documentation and indication of the event, process 800 continues to step 840.

In step 840 payment for the documentation and indication of the event is obtained from the player. Of course, in some embodiments the player had pre-paid for the documentation (e.g., embodiments wherein the player purchased a documentation package).

As discussed, the player may use cash or credits, a portion of a payout, a portion of a future payout, or a commitment to an obligation (e.g., to do business with a merchant). The player may also do work of some kind, may refer friends to the casino or to the controller, or may disclose his own intended actions so that the casino or controller may better market to the player.

In some embodiments, the player does not pay immediately after agreeing to pay for documentation. In one embodiment, the casino or controller documents a number of events and then presents the documentation to the player. The player chooses the documentation he wants to keep and pays only for that. For example, the controller may post a number of digital pictures of the player to a Web site. The player may examine the pictures and choose his fifty favorites. The player may then pay for the fifty photos, and the controller may then send the favorites to the player.

In one embodiment, documentation of an event is stored without a player being required to pay for the storage. However, in such an embodiment the player may be required to provide payment or some consideration before being allowed to retrieve the documentation (e.g., the player may have to pay a fee before an outcome is replayed for the player).

In step 845, the documentation and indication of the event is provided to the player. This may comprise providing the player with a tangible medium containing the documentation (e.g., a scrapbook, picture, CD-ROM, floppy disk, or video cassette). The documentation and indication of the event may be performed immediately after the player experiences the event (e.g., while the player is still at the gaming device at which an outcome comprising the event occurred) or at a later time. For example, a picture may be printed and output to a player from a gaming device or an output device attached to the gaming device. Alternatively, a picture may be provided to a player by casino personnel at a later time during the player's visit to the casino or may be mailed or e-mailed to the player at a later time. In embodiments where the documentation is to be part of a compilation of data such as a scrapbook the documentation may not be provided to the player until the capturing of the data for the compilation is complete (e.g., until the scrapbook is complete). It should also be noted that in some embodiment providing the documentation and indication of the event to the player may comprise providing a code to the player which may allow the player to access the documentation and indication. The code may comprise a code that, when entered into a Web site, will give the player access to a personalized Web page containing documentation of events the player experienced or that will result in the data being output via a gaming device.

It should be noted that in some embodiments the player may be allowed to modify the documentation. Before the player receives documentation in its final form, the player may modify, narrow down, annotate, or otherwise alter the documentation. The alteration process might make the documentation more suspenseful, more interesting, less embarrassing, or might even put the player in a better light. For example, the player might have a choice of 250 photographs, and may select only 30, so as not to bore a relative with too many photographs.

The following is a non-exhaustive list of how the player might be allowed to modify documentation. The list is provided for illustrative purposes only and is not meant to be limiting in any sense.

(i) Edit or shorten the documentation. For example, the player might select five minutes of highlights from a two-hour long video of his trip. The player might select the top twenty out of one thousand photographs taken. The player might select one particularly volatile sequence of outcomes, and discard records of other outcomes achieved by the player.

(ii) Annotate the documentation. In annotating, the player may add written or verbal comments to explain a situation. The player may add a comment alongside a picture of an outcome indicating that he was down to his last five dollars when the outcome occurred. The player might simply mention the time, the date, or the location at which a photograph was taken. The annotations need not come from a player. For example, the player may add to a video a pertinent quote by a famous celebrity.

(iii) A player might zoom in or out on a particular area of a photograph. Perhaps the player wishes to zoom in on his own face. Alternatively, the player might wish to zoom in on the reels of a slot machine. If the documentation is audio, the player might wish to filter out irrelevant sounds, or to enhance the relevant sounds. If the documentation is text, the player might highlight certain areas. Perhaps the description or name of the item he ordered for dinner is put into bold-faced type on a depiction of the menu.

(iv) Change the speed of the documentation. For example, the video of the player may be put into slow motion when the player has won a large payout.

(v) Alter (e.g., enhance) a depiction of what actually occurred. The player may change the documentation so that it shows something different than what actually happened. The player may thereby look back on the vacation as being more pleasant than it actually was. For example, an outcome may be added to a record of the player's outcomes, even though the outcome was not achieved. An outcome that was achieved may be modified to appear as another outcome. If the documentation shows the player playing golf, the player may lower the final score when modifying the documentation. A player might make it look as if he ate more expensive meals than he actually did, or that he stayed in a more expensive hotel room than he actually did. A player might request that a cloudy day be made to look sunnier.

In some embodiments, the player may pay to make alterations to documentation. For example, the player might have to pay an extra three dollars to have the controller turn a portion of a video into slow motion video.

The player may input modification instructions at the Web site of the central controller. If the player is to select 100 pictures for his scrapbook out of 1000 taken, then the player may view the 1000 pictures on the Web site of the central controller. The player may then select pictures by, for example, clicking on desired pictures. Once the player has clicked on 100 pictures, he may confirm his choices so that the central controller might then send him hard copies.

To annotate documentation, the player may, for example, click on a picture. The Web site may then display a text box in which a player might type annotations. If the player prefers voice annotations, then the player may send to the central controller sound files containing his annotations. To annotate a video clip, the player may, for example, view the video clip on the Web site of the central controller. The viewer may click to indicate a time point at which to begin an annotation. The player may then provide a written or an oral annotation. The central controller may then add the annotation to the video. An example of an annotation that a player may wish to input comprises an indication of the net win/loss of the player for the visit to the casino, at the time of the event that was documented. For example, if the player was down by $252 at the time an image of the player's reaction to a poker hand was captured, the player may wish to indicate this as an annotation to the image.

The player may make numerous attempts at modifying documentation. Each time, the player may view the results of modifications, and determine whether or not to keep the changes. Thus, the player may end up spending a significant amount of time working to perfect documentation. This is advantageous for the central controller, in part, because the player is now exposed for long time periods to the central controller.

In some embodiments, modifications are not made on the Web site maintained by the controller. The player might instead download software from the Web site of the controller. (The software could be obtained from other sources too.) The software might then be used for modifications. For example, the software might be used to make edits to photographs. Once modified, documentation might be returned to the controller, allowing the controller to present to the player a tangible version of the player's desired documentation.

In some embodiments, the player modifies documentation almost in real time. For example, right after the player has been photographed, he might press an "annotate photograph" button on his gaming device. He may then key in a text annotation. The controller will associate the text annotation with the photograph, and perhaps print the text on the back of the photograph.

Once the documentation has been recorded and modified, the central controller sends the documentation to the player in its final form. For example, photographs are printed and put into albums. Video may be put onto a videocassette or a DVD. The player may be given software that stores the player's outcomes and can render a graphic of a slot machine generating those outcomes. The player may then run the software to relive the experience of sitting in front of his slot machine and seeing outcomes generated.

If the player has requested that documentation go to others, such as the player's friends, then the controller may provide the documentation to these others.

In some embodiments, to provide documentation to the player, the processor of the controller may operate a program to look up the player in the trip documentation database. The controller may then look up what is to be delivered to the player. If, for example, the player is to be given 100 photographs, then the controller may look up in the same database what photographs are of the player. The controller may then direct an associated film developer to retrieve the indicated photographs from a storage device, and to develop the photographs. If the photographs are to be delivered to a player in an album, then the controller may direct the developer to put the photographs in an album before sending them to the player.

Once the player has received his documentation, he may view it and/or show it to others. If the documentation is tangible such as a printed photo album, the player simply looks through the album. However, in many embodiments, documentation remains electronic. Advantageously, electronic documentation may be viewed conveniently from many locations. To view electronic documentation, the player might log onto the Web site of the central controller and enter an identifier, and possibly a password. The player might then click on menu items or on icons to view or to hear the recorded experiences. For example, a player might click on a link entitled "Lose20.gif" to see a picture of himself after he had lost his first $20 bill. The player may review documentation from any player terminal, including any personal computer, PDA, cell phone, slot machine, vending machine, networked television, etc. For example, when a player is in his hotel room, he may display his outcomes on his hotel's TV screen to review or to show his family.

In some embodiments, the documentation of a player is fed directly to a player's friends or relatives. For example, as the player's outcomes are generated, the outcomes may be posted to a Web site accessible by a player's family. The postings may be in real time, or may be delayed.

Outcomes may be viewed in a number of forms. Outcomes may be viewed either in text form or in graphical form. The text form of an outcome would spell out the outcome in words, such as "cherry-cherry-cherry" or "c-c-c". The words might instead spell out whether and how much the player won or lost. For example, outcomes might read, "win $3" or "lose $1". Outcomes might also spell out a person's net or gross winnings. For example, "total win: −$35" or "total win: $21".

Alternatively, outcomes may be presented in graphical form. For example, in reviewing stored outcomes, a player sees a picture of three cherries. The pictures might be cartoon representations of cherries, or may show actual photographs of cherries. The cherry representations may be similar or different to the cherry representations actually shown on the reels of the gaming device on which the outcome was originally generated.

Stored outcomes may also be presented in either a static or a dynamic fashion. In a static presentation, a player might simply see the final outcome, such as "bell-orange-bar". However, in a dynamic presentation, a player might see a graphical rendition of reels spinning on a gaming device, and stopping at the outcome achieved by the player. Once again, the depiction of the spinning reels may appear similar or different to the actual appearance of the gaming device that originally generated the outcome.

The graphical and the dynamic representation of outcomes could be done with a software package running on the player terminal. Each gaming device manufacturer might produce proprietary software packages for accurately depicting the look of their respective gaming devices on the monitor of a personal computer. The player or the central controller might then pay the device manufacturers for the use of the software.

A player may also view bonus rounds in which he participated. A bonus round is typically a new game overlaid on top of the primary game of aligning reel symbols. In a bonus round, a player can watch various animated characters interact with each other or with a fantasy environment in order to win unusually large prizes for the player. Therefore, a bonus round can be quite entertaining, and worthy of review by a player and his friends and relatives. Once again, software running on the player terminal may be necessary for accurately depicting bonus rounds.

In some embodiments, stored outcomes and software for presenting the outcomes are communicated to the player terminal separately. For example, a player might first download software for mimicking a particular gaming device. Then, when the player receives outcome data from the central controller, the software can read the outcome data in order to recreate the outcomes. Similarly, the player may receive other documentation separately from the software used to present the documentation. For example, the player might download software from the controller for displaying images. The controller might then send image data to the player terminal. The software already stored on the player terminal may then use the image data to actually display the image.

As described herein, in one or more embodiments a gaming device may be operable to output an outcome of a prior game play that had previously been output to a player during the prior game play. Such a practice may be referred to as re-outputting an outcome. According to one or more embodiments, the viewer of the re-outputted outcome cannot alter the outcome or receive a payout therefore. The practice of re-outputting an outcome of a prior game play may be conceptualized, according to one aspect of the present invention, as a means of re-playing the outcome for the player such that the player may relive the moment when the player first obtained the outcome.

For example, a gaming device may be operable to display an image (e.g., still or moving image) depicting an outcome of a prior game play (a game play having occurred earlier in time from the current output of the outcome) that had occurred in a prior game play and that had been output to a player of the prior game play. The prior game play may have occurred on the same gaming device that is currently re-outputting the outcome or on a different gaming device.

In another embodiment, a gaming device may determine an indication of the outcome obtained during the previous game play (e.g., the gaming device may retrieve from a memory an indication that the outcome of "bar-bar-bar" had been the result of the prior game play) and output the outcome in a manner similar to how an outcome of a current game play (an original outcome) would be output, thus simulating an occurrence of the outcome. However, in re-outputting the outcome of the prior game play the gaming device need not perform each of the functions typically performed in outputting an outcome for a current game play. For example, in outputting an outcome of a prior game play the gaming device need not determine a random number or output the payout corresponding to the outcome being replayed.

In an embodiment in which an outcome of a prior game play is re-outputted on a gaming device, it may be beneficial to output the outcome in a manner that makes it distinguishable from an outcome of a current game play. For example, the outcome may be output in a manner that indicates to a viewer that the outcome is an outcome of a prior game play (that is being re-outputted) and not an outcome of a current game play.

In one example, the replayed outcome may be made distinguishable by, for example, not outputting any payout that may correspond to the outcome being output. In another example, one or more settings of the gaming device may be altered during the outputting of the replayed outcome. For example, a color setting, shading setting and/or contrast setting of a display of the gaming device may be altered. Similarly, an indicator of the gaming device may be activated (e.g., a flashing light or a sound) when the gaming device is outputting an outcome of a prior game play. In another example, text or a graphic may be displayed on a display contemporaneously with the outcome being re-outputted. In yet another example, the data comprising the outcome may be altered such that the output of the outcome appears different from an outcome of a current game play (e.g., text or symbols may be presented in a different font, different color, on a different background, etc.).

Outputting an outcome of a prior game play in a manner that makes it distinguishable from an outcome of a current game play may be desirable to prevent or deter a person from having the outcome re-outputted and attempting to claim the payout, if any, that corresponds to the re-outputted outcome (since, presumably, the player had already claimed the payout when the outcome was originally output to the player in the prior game play). Similarly, outputting the replayed outcome in a manner that makes it distinguishable from an outcome of a current game play may be desirable in order to avoid or reduce the likelihood of a viewer mistaking the re-outputted outcome for an outcome of a current game play.

The ability to replay aspects of an outcome or other documented event reinforces the positive psychological effects of casino patronage experienced by players, and encourages repeat gaming business from such players.

Figure 9:
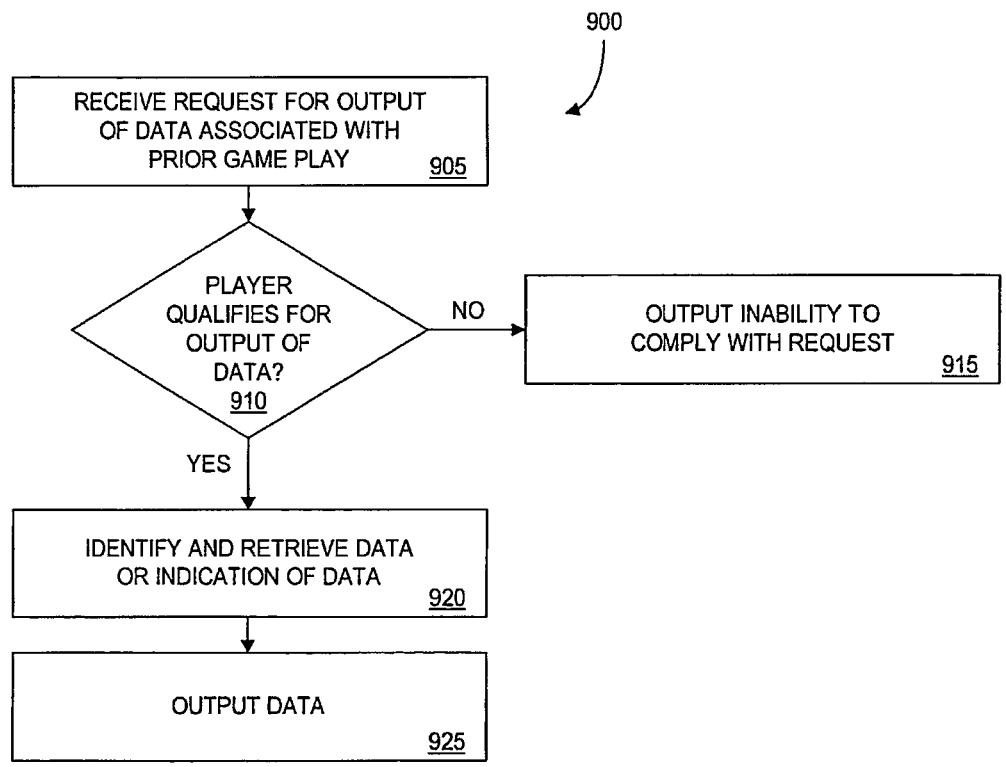
FIG. 9 is a flow diagram illustrating an exemplary process according to an embodiment of the present invention.

Referring now to FIG. 9, illustrated therein is an exemplary process 900 according to one or more embodiments of the present invention. Process 900 may be performed, for example, by a gaming device, peripheral device, controller, kiosk or other device operable to output data associated with a prior game play. Process 900 describes an embodiment of how data associated with an outcome obtained during a prior game play may be requested and output.

A request for output of data associated with an outcome of a prior game play is received in step 905. Such a request may be a request from, for example, a player (e.g., the player who obtained the outcome in the previous game play), another person (e.g., a person associated with the player or a casino employee), a device (e.g., a gaming device, a player device or a peripheral device), and so on. For purposes of simplicity, it is assumed that the player who obtained the outcome in the prior game play is the entity requesting the output of the data.

In some embodiments, the request may comprise a request for output of data documenting an event associated with the player other than an outcome. For example, the request may comprise a request for output of a recording (video and/or audio) of the player's experience at a casino restaurant. However, for purposes of simplicity, process 900 is described in terms of a request for data associated with an outcome of a prior game play.

The data associated with an outcome of a prior game play may comprise, as described herein, data in one or more forms (e.g., audio, video, text, etc.). Further, the data associated with an outcome of a prior game play may comprise various data. For example, the data may comprise an outcome or indication of an outcome obtained during the prior game play, a person's reaction to the outcome obtained during the prior game play, an indication of a payout obtained during the prior game play, or an indication of another circumstance relevant to the prior game play (e.g., the number of players who also obtained the same outcome within a predetermined period of time).

The request may include various information. For example, an identifier of a player, the outcome, the prior game play and/or other data associated with the outcome may be included in the request. In another example, an indication of a format in which the outcome is to be replayed may be included in the request. Alternately, the entity requesting the replay of the outcome may be prompted to provide certain information such as an identifier and/or format after the entity provides the request.

The request may be provided via various means. For example, a player may provide such a request via a gaming device (e.g., a gaming device operable to function in a "replay mode", as described herein), a player device (e.g., a cellular telephone, personal computer, pager, etc.), a peripheral device of a gaming device or a kiosk.

In step 910, it is determined whether the player requesting the data associated with the outcome of the prior game play (e.g., replay of an outcome of a prior game play) qualifies to receive an output of the requested data. In one or more embodiments a condition may need to be satisfied before the data associated with the outcome of the prior game play can be output to a player. Examples of such conditions include, but are not limited to, the following:

(i) The player may be required to provide a player tracking card or other player identifier or code when requesting output of data associated with a prior game play (e.g., replay of an outcome) or output of other data documenting an event. For example, the player tracking card or other identifier may point to a database file on the casino server that contains at least one entry for data documenting an event associated with the player.

(ii) The player may be required to pay a fee (e.g., monetary or non-monetary).

(iii) The player may be required to provide a valid password or personal identification number (PIN).

(iv) The player may be required to surrender a coupon, voucher or other consideration entitling the player to at least one free replay of the outcome or access to other data documenting an event.

(v) The player must agree to perform an obligation in the future (e.g., to sign up for or purchase a player tracking card issued by the casino) or perform an obligation (e.g., fill out a survey).

(vi) The gaming device must be idle for at least n minutes.

(vii) The gaming device must be engaged in a gaming session for at least n minutes with any player.

(viii) The gaming device must be engaged in a gaming session for at least n minutes with the same player who requests the data associated with the outcome of the prior game play.

(ix) The player must agree to play the gaming device for n minutes after the data associated with the outcome of the prior game play is output.

(x) The player must agree to wager n credits after the data associated with the outcome of the prior game play is output.

(xi) The player must agree to play the gaming device for n sessions after the data associated with the outcome of the prior game play is output.

(xii) The player must wager n credits before the data associated with the outcome of the prior game play is output.

(xiii) The data associated with the outcome of the prior game play must play the gaming device for n sessions before the data associated with the outcome of the prior game play is output.

(xiv) The data associated with the outcome of the prior game play must be requested on the same gaming device (or type of gaming device) on which the outcome was originally obtained during the prior game play.

(xv) The data associated with the outcome of the prior game play must be requested on a different gaming device (or type of gaming device) than the one on which the outcome was originally obtained during the prior game play.

(xvi) The data associated with the outcome of the prior game play must be requested on a certain gaming device (or one of a certain series of gaming devices with similar characteristics) designated by the casino or an alternate party (i.e. sponsor).

(xvii) The data associated with the outcome of a prior game play must be requested between certain hours of the day.

(xviii) The data associated with the outcome of the prior game play must be requested after a specific amount of time has passed from a predetermined event (e.g., since the data was captured).

(xix) The data associated with the outcome of the prior game play must be requested before a specific amount of time passes from a predetermined event (e.g., since the data was captured).

(xx) A player must first agree to play or test a promotional game.

(xxi) A player must be of a certain status (e.g., a "high roller" who has generated a certain amount of theoretical win, a current hotel guest).

(xxii) Any other practicable rules seen as beneficial by gaming device operators (e.g., casino management).

If it is determined that a player or other entity requesting the output of the data does not qualify for output of the data, a message indicating an inability to comply with the request is output (step 915). In one or more embodiments, the message may indicate the reason for the inability to comply and/or an indication of how the player or other entity may comply and thus receive the requested output. For example, the message may inform the player or other entity of the monetary fee or other consideration required for output of the requested data.

If, on the other hand, it is determined that the player or other entity requesting the output of the data does qualify for the output of the data, the process continues to step 920. In step 920, the requested data (or an indication thereof) is identified and retrieved. For example, a record of a database of such data may be accessed based on an identifier provided in step 905. In one embodiment, the data may comprise the outcome obtained during the prior game play or an indication thereof. Further, a player may be provided with an identifier of the data at the time the data is captured. Thus, the player may request an output of the data by providing that identifier. In another embodiment, the data may be associated with the player identifier of the player involved in the prior game play. Thus, the player may request output of the data by providing his player identifier. It should be noted that, in embodiments where more than one entry is associated with a player identifier (e.g., data associated with more than one outcome is stored in association with the player identifier), the player may be prompted to indicate with more particularity which entry the player is currently interested in.

In one embodiment, the entity performing the process 900 stores in local memory data associated with prior outcomes and thus accesses the data in the local memory. For example, the process 900 may be performed by a controller or casino server that stores such data. For example, a player may request output of the data via a gaming device or kiosk. The gaming device or kiosk may communicate with the controller or casino server to comply with the request. In another embodiment, the process 900 may be performed by a device that does not store the data locally (e.g., a gaming device or kiosk). Accordingly, in step 920 the device may communicate with another device (e.g., a controller or casino server) to retrieve the data or indication of the data.

In step 925 the requested data is output. Data associated with an outcome of a prior game play may be output in a variety of manners, as described herein. For example, a gaming device or kiosk may re-output an outcome by displaying a video of the outcome on a display screen of the gaming device. In another example, a gaming device may function to output the outcome of the prior game play in a manner similar to how an outcome of a current game play would be output. For example, assuming the gaming device comprises a reel slot machine (mechanical or electronic), such an outputting of an outcome of a prior game play may comprise spinning or simulating spinning of reels and stopping or simulating stopping of the reels such that the symbols of the outcome appear along a payline of the gaming device. As noted herein, in such an embodiment the gaming device may be programmed to refrain from outputting any payout that may correspond to the outcome of the prior game play that is being re-outputted via the gaming device. For example, a hopper mechanism of the gaming device may be disabled during the re-outputting of the outcome. In one or more embodiments, various other devices and/or functions (e.g., input and/or output devices such as handles, buttons, etc.) of a gaming device may be disabled during the re-outputting of an outcome.

As also described herein, data associated with an outcome of a prior game play that comprises the outcome may be output in a manner that indicates to a viewer of the outcome that the outcome is an outcome of a prior game play and not an outcome of a current game play. For example, assume the outcome of a prior game play was recorded and stored in an mpeg file format. In one embodiment, the meta-data of the mpeg file may be altered such that when the mpeg file is retrieved and output to a player, it is clear that the outcome is not an outcome of a current game play (e.g., the graphics may be altered and/or text may be added).

In one embodiment in which data associated with an outcome of a prior game play is altered before it is re-output to a player, the alteration of the data is performed substantially at a time when the data is first captured and stored. In another embodiment, the alteration of the data is performed at a time after the data is captured and stored but before a request for output of the data is received. In yet another embodiment, the alteration of the data is performed just before the data is output (e.g., in response to a request for output of the data). Alteration of the data may be performed by a device based on one or more rules (e.g., a device may be programmed to add certain text to the data or alter the graphics of the data in a particular manner). In embodiments in which the data is altered before the data is output to the player, process 900 may further include altering the data.

Outputting the data may comprise, for example, opening a file (e.g., mpeg or jpeg) containing the data and outputting the data of the file to the player or other party requesting the data. For example, the file containing the data may be provided to (or retrieved by) the gaming device or kiosk via which the player or other entity requesting the data. In another embodiment, outputting the data may comprise determining an indication of the data and outputting the data of the indication. For example, in one embodiment, rather than storing a video or other rendition of an outcome, an indication of the outcome may be stored. Thus, assuming the data is being output via a gaming device, outputting the outcome may comprise determining the outcome based on the indication and causing the outcome to be displayed via the gaming device by essentially simulating the output of a current game play. In one embodiment, a simulation of an outcome may include output of animated video or graphics depicting (i) the spinning of symbols on a virtual reel, (ii) the resolution of spinning symbols on a slot machine payline, (iii) animations displayed throughout the resolution of a handle pull, (iv) the shuffling and/or dealing of cards, (v) the sorting and/or drawing of additional cards, (vi) animations or activity associated with a bonus game, (vii) sound effects and/or (viii) the state of any graphic, image, animation, symbol or icon as it appeared to the player on any display area during game play that triggered the capturing of the data associated with the outcome of the prior game play.

For example, assuming the outcome is being output via a three reel slot machine, outputting the outcome may comprise determining that "bar-bar-bar" was obtained as the outcome during the prior game play and causing the reels of the slot machine to display the symbol "bar" along a payline on the first reel, the symbol "bar" along the payline on the second reel, and the symbol "bar" along the payline of the third reel. If the process 900 is being performed by a device other than the gaming device via which the outcome of the prior game play is to be output, outputting the data may comprise directing the gaming device to output the outcome.

In one or more embodiments of the present invention, a gaming device may be operable to function in at least two distinct modes: (i) a "game play mode" in which a gaming device performs subroutines or algorithms that cause the gaming device to operate in a substantially conventional manner of determining and outputting outcomes for a current game play, and (ii) a "replay mode" in which a gaming device performs subroutines or algorithms that cause the gaming device to replay or re-output an outcome of a prior game play. It should be noted that, in one embodiment, a gaming device operating in "game play mode" may also function to detect a predetermined outcome or other event and/or capture data associated with such outcome of a current game play or other event.

For example, a replay mode may comprise a gaming machine mode of operation that is characterized by altered processes with respect to audio and visual output, relative to processes of conventional game play. For example, video, graphics or animations shown on the display areas during replay mode may be altered in several ways so as to distinguish between replay mode display content from display content viewed by players during game play mode. Examples of such replay mode alterations may include the presence of additional shading, graphics, text, icons, symbols, or masks, as well as additional voice commands, sound effects or other audio events. In one embodiment, operating in a replay mode may include outputting, through one or more output devices, data previously captured during game play mode. For example, output of an outcome obtained during a prior game play when a gaming device was operating in game play mode may be shaded green when output via a gaming device in replay mode (e.g., the data itself and/or a setting of the gaming device may be altered such that the outcome appears shaded green when output in replay mode). In one embodiment, a replay mode may be characterized by a disabling of one or more functions of a gaming device. For example, a hopper and/or hopper controller may be disabled during replay mode. In another example, a handle, deal button or other start mechanism of a gaming device may be disabled during replay mode.

In one or more embodiments, a gaming device may determine whether one or more subroutines comprising a game play mode are to be executed or whether one or more subroutines comprising a replay mode are to be executed. Such a determination may be made based on one or more inputs.

For example, an input from a player may determine the mode of operation. For example, it may be determined which mode a player has selected. In some embodiments, a player may elect to toggle between a game play mode and a replay mode by means of a "mode menu," which may be (i) presented as actionable touch screen buttons on a gaming machine display area, (ii) presented as a series of buttons on a gaming machine keypad, and/or (iii) accessed through voice command capability. In one embodiment, a gaming device may prompt a player to select a mode of operation (e.g., a "game play mode" or "replay mode"). For example, a player may approach a machine, insert a player tracking card, and choose to access data associated with a prior outcome or other documented event without first engaging the machine in game play. In one embodiment, data associated with a prior game play or another documented event may be output upon the request of a player to view the data at any stage during game play or a game session.

In another embodiment, a gaming device may determine a mode of operation based on one or more rules. For example, a gaming device may be programmed to operate in replay mode at time the gaming device is idle, has been idle for a predetermined length of time, during predetermined times of day, and/or upon detecting the presence of a person nearby. Technology described in Applicant's issued U.S. Pat. No. 6,324,520, entitled "METHOD AND APPARATUS FOR COLLECTING AND APPLYING VENDING MACHINE DEMAND INFORMATION," which describes methods of detecting a person near a device, is incorporated by reference herein for all purposes.

It should be noted that although it has been described herein that an outcome of a prior game play may be re-outputted at the request of a player, the re-outputting of an outcome of a prior game play is not limited to such a circumstance. For example, in one embodiment one or more outcomes, each corresponding to a respective prior game play, may be re-outputted during an "attract mode" of a gaming device. For example, a gaming device may output one or more such outcomes of prior game plays in order to entice players to play the gaming device. For example, if a player sees an outcome corresponding to a relatively high payout that has previously been obtained by another player, the player may be tempted into attempting to obtain the outcome for himself.

Similarly, although it has been described herein that documentation of an event (e.g., a person's reaction to the outcome) may be output in response to a request from a person (e.g., the player who obtained the outcome or a person associated with the player), such documentation may be output under other conditions as well. For example, a gaming device in an "attract mode" may output video of a player's reaction to obtaining an outcome corresponding to a large payout in an attempt to entice players to play the gaming device.

A gaming device may enter an "attract mode" and thus output documentation of an event if one or more conditions are satisfied. For example, the gaming device may enter an "attract mode" if one or more of the following conditions are satisfied:

(i) the gaming device is currently idle (i.e., no player is playing the gaming device);
(ii) the gaming device has been idle for a predetermined period of time;
(iii) the gaming device detects the presence of a person nearby;
(iv) the current time is within a predetermined time range (e.g., it is currently between 2 am and 5 am);
(v) an activity level of the casino or other defined area is below a threshold activity level; and
(vi) an initiation signal is received from casino personnel.

ADDITIONAL EMBODIMENTS OF THE INVENTION

In accordance with one embodiment, a player may be paid to show documentation to friends. The central controller may be willing to pay because documentation may serve as a good marketing tool to get other people to purchase their own documentation or to go on their own gambling outings.

In accordance with one embodiment, documentation data may be combined in various ways. For example, a player receives a picture with the image of a slot machine overlaid upon an image of the player's face. The slot machine image might show a winning outcome, while the player's expression might show tremendous excitement. As another example, a player might overlay the date of a slot machine's manufacture on top of an image of a losing reel combination. The message might be that the given date is unlucky. The combination of documentation data may be made automatically. For example, text describing a player's net win thus far may be printed on any picture taken for the player.

In accordance with one embodiment, documentation data may include the rules to a particular game. As rules for a particular game may be long, the player may wish to review them at home, and then try the game the next time he visits a casino.

It should be noted that one or more players may conspire to take advantage of the present invention and cheat as follows: a first player asks for documentation of an event using a security camera. A second player is generally covered by the same camera, but is temporarily left unwatched as the camera focuses on the first player. The second player then cheats in some way. For example, the second player reaches into the bucket of a neighbor and grabs some coins. Therefore, in some embodiments, when a first camera is focused on a player, other cameras are aimed in such a direction as to cover the areas left open by the first camera. In other embodiments, players are monitored in terms of their requests for documentation. Requests that come at unusual times, e.g. when the player has won nothing special, may be flagged. Then, other cameras or casino employees may pay special attention to the area surrounding the player.

In accordance with one embodiment, once the player has purchased or obtained documentation, the controller may always sell additional copies of the documentation. For example, three months after a trip, the player might request a second copy of certain photographs taken on the trip. The player might request the same documentation in altered form. For example, he may want a new photo album with a different covering. He might want the same pictures, only a different size. Or the player may now want the same pictures, but put on coasters.

In accordance with one embodiment, a player may pay for a security camera to be aimed at him, even if the player does not ultimately request documentation. By paying for the camera to focus on him, the player ensures that should a good moment arise, the player will be sure to have documentation.

In accordance with one embodiment, there may be fixed documenting terminals throughout a casino, or even outside of a casino. For example, a player at a casino's swimming pool may wish to be photographed. The player may swipe his player-tracking card through a card reader attached to the documenting terminal. The player may then stand in front of the terminal, where he is then photographed. Having read the player's tracking card, the documenting terminal may inform the central controller as to with whom to associate the photograph.

In accordance with one embodiment, a player might also rent a digital camera and bring it with him to a pool or to other areas. The player may then connect the digital camera to a slot machine or other device where the digital pictures can be uploaded to the player's account with the central controller. Alternatively, a casino employee may ensure that pictures are uploaded to the player's account after the player has returned the camera to the casino.

In accordance with one embodiment, when the player is away from a fixed documenting device, such as a casino security camera or a slot machine, the player may be documented by mobile devices. For example, the player's cell phone may record sounds and conversations in which the player is involved. These may be transmitted back to the central controller for inclusion in the player's scrapbook. The player may carry a camera, perhaps on loan from a casino. The player may set the camera to capture a picture of him or of his surroundings. In some embodiments, a circling airplane, blimp, or satellite may capture pictures of the player, and transmit the pictures to the central controller.

In accordance with one embodiment, documentation may include the location of the player or other entity of interest. For example, the player may carry around a global positioning system (GPS) receiver to record his geographical coordinates at regular time intervals. If the player then takes a stroll through the city of Las Vegas, he has an automatic record of where he went. The GPS data might later be overlaid on top of a map of Las Vegas so the player can visually see the route he took.

In accordance with one embodiment, sketches and paintings serving as documentation may be done by casino personnel, or by the player.

In accordance with one embodiment, events in a theme park may be captured and documented with cameras attached to fences, poles, buildings, or other fixtures. Cameras may be mounted on roller coasters, merry-go-rounds, or other rides to document a player's kids while on a ride. Theme park employees may also participate in documentation, e.g. with hand-held cameras. Other data at theme parks may also be captured. For example, microphones may record the screams of a player's kids as they ride the roller coaster.

In accordance with one embodiment, on site seeing tours, tour guides may aide in the documentation of the player, family, and friends. Documenting devices proximate to the sites of interest, and documenting devices attached to the tour bus, may also assist in the documentation of the player.

In accordance with some embodiments of the present invention, a system such as Imagecode™ by SmartPicture™ may be used to identify persons in images for purposes of the present invention. SmartPicture™ is a photo identification system wherein persons in photographs are identified based on a colored lapel sticker they are wearing. For purposes of the present invention, players that register for documentation of events may be provided with such lapel stickers to wear (and persons associated with the players may also be given stickers). Accordingly, when an image of a player or other person is taken, the image may be analyzed in accordance with the SmartPicture™ system to identify the player or other person in the image. Similarly, an event detection or other device may analyze an image to determine whether the image includes a person wearing such a lapel sticker and whether the person identified by such lapel sticker has registered for documentation and whether an event to be documented is currently occurring.

What is claimed is:

1. A method of operating a gaming system, the method comprising:
   receiving a request for replay of a designated event from a player, the designated event being associated with a game play that had previously occurred at a gaming device;
   in addition to the request for replay and in addition to a completion of the previously occurring game play, determining whether one or more pre-conditions are satisfied, wherein the one or more pre-conditions are satisfied distinct from any request from the player to store any data associated with the designated event; and
   after receiving the request for replay from the player and after determining that the one or more pre-conditions are satisfied, automatically:
   (a) retrieving previously stored data including documentation of the designated event, the documentation being associated with the previously occurring game play; and
   (b) transmitting a signal to cause a display device to display a replay of the designated event.

2. The method as recited in claim 1, wherein the gaming device on which the game play associated with the designated event previously occurred includes the display device on which the designated event is replayed.

3. The method as recited in claim 2, wherein the replay of the designated event includes a viewer discernable indication that the replay corresponds to the previously occurring game play as opposed to a current game play.

4. The method as recited in claim 1, wherein the display device on which the designated event is replayed is not a display device of the gaming device on which the game play associated with the designated event previously occurred.

5. The method as recited in claim 1, wherein at least one of the one or more pre-conditions is satisfied:
   upon receipt of payment for the replay of the designated event;

upon receipt of an identification of a player associated with the designated event;

based on a status of gaming activity associated with the player who is requesting the replay of the designated event;

based on a status of gaming activity associated with a device via which the replay of the designated event is to be provided;

upon agreement by the player who is requesting the replay of the designated event to an obligation in exchange for the replay of the designated event;

based on an identity of a device via which the replay is to be provided;

upon receipt of the request for replay of the designated event at a predetermined time;

based on a characteristic of the player who is requesting the replay of the designated event;

upon receipt of an identification of the player who is requesting the replay of the designated event; or based on obtainment of a predetermined outcome or payout during a game play.

6. The method as recited in claim 5, wherein the designated event is selected from the group consisting of:
the player achieving a designated outcome on a gaming device;
the player achieving a payout greater than a threshold payout;
the player achieving at least a designated quantity of winning outcomes;
the player almost achieving a winning outcome;
the house losing;
the player's bankroll exceeding a threshold bankroll;
the player losing with a predetermined hand;
the player achieving at least a designated quantity of losing outcomes;
the player initiating a first game play at a designated gaming device; and
the player activating a particular gaming device.

7. The method as recited in claim 1, wherein the documentation of the designated event is captured with one or more devices selected from the group consisting of: a camera and a microphone.

8. The method as recited in claim 1, which includes determining whether the player participated in the previously occurring game play, and: (a) retrieving the previously stored data comprising documentation of the designated event, and (b) transmitting the signal to cause the display device to replay the designated event after: (a) receiving the request for replay from the player, (b) determining that the one or more pre-conditions are satisfied, and (c) determining that the player participated in the previously occurring game play.

9. A system comprising:
a user interface; and
a controller configured to operate with the user interface to:
(a) receive a request for replay of a designated event from a player, the designated event being associated with a game play that had previously occurred at a gaming device;
(b) in addition to the request for replay and in addition to a completion of the previously occurring game play, determine whether one or more pre-conditions are satisfied, wherein the one or more pre-conditions are satisfied distinct from any request from the player to store any data associated with the designated event;
(c) after receiving the request for replay and after determining that the one or more pre-conditions are satisfied, automatically:
(i) retrieve previously stored data including documentation of the designated event, the documentation being associated with the previously occurring game play; and
(ii) transmit a signal to cause a display device to display a replay of the designated event.

10. The system as recited in claim 9, wherein the gaming device on which the game play associated with the designated event previously occurred includes the display device on which the designated event is replayed.

11. The system as recited in claim 10, wherein the replay of the designated event includes a viewer discernable indication that the replay corresponds to the previously occurring game play as opposed to a current game play.

12. The system as recited in claim 9, wherein the display device on which the designated event is replayed is not a display device of the gaming device on which the game play associated with the designated event previously occurred.

13. The system as recited in claim 9, wherein at least one of the one or more pre-conditions is satisfied:
upon receipt of payment for the replay of the designated event;
upon receipt of an identification of a player associated with the designated event;
based on a status of gaming activity associated with the player who is requesting the replay of the designated event;
based on a status of gaming activity associated with a device via which the replay of the designated event is to be provided;
upon agreement by the player who is requesting the replay of the designated event to an obligation in exchange for the replay of the designated event;
based on an identity of a device via which the replay is to be provided;
upon receipt of the request for replay of the designated event at a predetermined time;
based on a characteristic of the player who is requesting the replay of the designated event;
upon receipt of an identification of the player who is requesting the replay of the designated event; or
based on obtainment of a predetermined outcome or payout during a game play.

14. The system as recited in claim 13, wherein the designated event is selected from the group consisting of:
the player achieving a designated outcome on a gaming device;
the player achieving a payout greater than a threshold payout;
the player achieving at least a designated quantity of winning outcomes;
the player almost achieving a winning outcome;
the house losing;
the player's bankroll exceeding a threshold bankroll;
the player losing with a predetermined hand;
the player achieving at least a designated quantity of losing outcomes;
the player initiating a first game play at a designated gaming device; and
the player activating a particular gaming device.

15. The system as recited in claim 9, wherein the documentation of the designated event is captured with one or more devices selected from the group consisting of: a camera and a microphone.

16. The system as recited in claim 9, wherein the controller is configured to operate with the user interface to determine whether the player participated in the previously occurring game play, and: (a) retrieve the previously stored data comprising documentation of the designated event, and (b) transmit the signal to cause the display device to replay the designated event after: (a) receiving the request for replay from the player, (b) determining that the one or more pre-conditions are satisfied, and (c) determining that the player participated in the previously occurring game play.

17. A non-transitory computer readable medium storing a plurality of instructions which, when executed by at least one processor, cause the at least one processor to:
   receive a request for replay of a designated event from a player, the designated event being associated with a game play that had previously occurred at a gaming device;
   in addition to the request for replay and in addition to a completion of the previously occurring game play, determine whether one or more pre-conditions are satisfied, wherein the one or more pre-conditions are satisfied distinct from any request from the player to store any data associated with the designated event; and
   after receiving the request for replay from the player and after determining that the one or more pre-conditions are satisfied, automatically:
      (a) retrieve previously stored data including documentation of the designated event, the documentation being associated with the previously occurring game play; and
      (b) transmit a signal to cause a display device to display a replay of the designated event.

18. The non-transitory computer readable medium as recited in claim 17, wherein the gaming device on which the game play associated with the designated event previously occurred includes the display device on which the designated event is replayed.

19. The non-transitory computer readable medium as recited in claim 18, wherein the replay of the designated event includes a viewer discernable indication that the replay corresponds to the previously occurring game play as opposed to a current game play.

20. The non-transitory computer readable medium as recited in claim 17, wherein the display device on which the designated event is replayed is not a display device of the gaming device on which game play associated with the designated event previously occurred.

21. The non-transitory computer readable medium as recited in claim 17, wherein at least one of the one or more pre-conditions is satisfied:
   upon receipt of payment for the replay of the designated event;
   upon receipt of an identification of a player associated with the designated event;
   based on a status of gaming activity associated with the player who is requesting the replay of the designated event;
   based on a status of gaming activity associated with a device via which the replay of the designated event is to be provided;
   upon agreement by the player who sis requesting the replay of the designated event to an obligation in exchange for the replay of the designated event;
   based on an identity of a device via which the replay is to be provided;
   upon receipt of the request for replay of the designated event at a predetermined time;
   based on a characteristic of the player who is requesting the replay of the designated event;
   upon receipt of an identification of the player who is requesting the replay of the designated event; or
   based on obtainment of a predetermined outcome or payout during a game play.

22. The non-transitory computer readable medium as recited in claim 21, wherein the designated event is selected from the group consisting of:
   the player achieving a designated outcome on a gaming device;
   the player achieving a payout greater than a threshold payout;
   the player achieving at least a designated quantity of winning outcomes;
   the player almost achieving a winning outcome;
   the house losing;
   the player's bankroll exceeding a threshold bankroll;
   the player losing with a predetermined hand;
   the player achieving at least a designated quantity of losing outcomes;
   the player initiating a first game play at a designated gaming device; and
   the player activating a particular gaming device.

23. The non-transitory computer readable medium as recited in claim 17, wherein the documentation of the designated event is captured with one or more devices selected from the group consisting of: a camera and a microphone.

24. The non-transitory computer readable medium as recited in claim 17, wherein the plurality of instructions, when executed by the at least one processor, cause the at least one processor to determine whether the player participated in the previously occurring game play, and: (a) retrieve the previously stored data comprising documentation of the designated event, and (b) transmitting the signal to cause the display device to replay the designated event after: (a) receiving the request for replay from the player, (b) determining that the one or more pre-conditions are satisfied, and (c) determining that the player participated in the previously occurring game play.

25. A method of operating a gaming system, the method comprising:
   determining whether an input from a player has been received, the input defining a designated event;
   thereafter, determining whether the designated event has occurred at a gaming device; and
   upon a determination that the designated event occurred:
      (a) if the input from the player was received prior to the occurrence of the designated event and one or more rules are satisfied, storing data including documentation of the designated event;
      (b) if the input from the player was not received prior to the occurrence of the designated event, and at least one of the rules is not satisfied, not storing the data including documentation of the designated event; and
      (c) if the input from the player was received prior to the occurrence of the designated event, and at least one of the rules is not satisfied, not storing the data including documentation of the designated event.

26. The method as recited in claim 25, wherein the player provides said input by filling out a form when registering for a player tracking card.

27. The method as recited in claim 25, wherein the player provides said input by informing casino personnel of a desire to document the designated event.

28. The method as recited in claim 25, wherein the player provides said input by:
   selecting one of a pre-determined list of a plurality of designated events that may occur during game play; and providing an indication that documentation of the selected designated event is to be captured in response to detecting an occurrence of the selected designated event.

29. The method as recited in claim 28, which includes enabling the player to add a player-defined event to the list of pre-determined designated events.

30. The method as recited in claim 25, which includes storing the data including documentation of the designated event if the input has been received from a predetermined quantity of one or more players.

31. A system comprising:
a gaming device;
a user interface; and
a controller operatively coupled to the user interface and the gaming device, wherein said controller is configured to operate with the gaming device and the user interface to:
(a) determine whether an input from a player has been received, the input defining a designated event;
(b) thereafter, determine whether the designated event has occurred at the gaming device; and
(c) upon a determination that the designated event occurred:
(i) if the input from the player was received prior to the occurrence of the designated event and one or more rules are satisfied, store data including documentation of the designated event;
(ii) if the input from the player was not received prior to the occurrence of the designated event, and at least one of the rules is not satisfied, not store the data including documentation of the designated event; and
(c) if the input from the player was received prior to the occurrence of the designated event, and at least one of the rules is not satisfied, not storing the data including documentation of the designated event.

32. The system as recited in claim 31, wherein the player provides said input by filling out a form when registering for a player tracking card.

33. The system as recited in claim 31, wherein the player provides said input by informing casino personnel of a desire to document the designated event.

34. The system as recited in claim 31, wherein the player provides said input by:
selecting one of a pre-determined list of a plurality of designated events that may occur during game play; and
providing an indication that documentation of the selected designated event is to be captured in response to detecting an occurrence of the selected designated event.

35. The system as recited in claim 34, wherein the controller is configured to operate with the gaming device and the user interface to enable the player to add a player-defined event to the list of pre-determined designated events.

36. The system as recited in claim 31, wherein the controller is configured to store the data including documentation of the designated event if the input has been received from a predetermined quantity of one or more players.

37. A non-transitory computer readable medium storing a plurality of instructions which, when executed by at least one processor, cause the at least one processor to:
determine whether an input from a player has been received, the input defining a designated event;
thereafter, determine whether the designated event has occurred at a gaming device; and
upon a determination that the designated event occurred:
(a) if the input from the player was received prior to the occurrence of the designated event and one or more rules are satisfied, store data including documentation of the designated event;
(b) if the input from the player was not received prior to the occurrence of the designated event, and at least one of the rules is not satisfied, not store the data including documentation of the designated event; and
(c) if the input from the player was received prior to the occurrence of the designated event, and at least one of the rules is not satisfied, not storing the data including documentation of the designated event.

38. The non-transitory computer readable medium as recited in claim 37, wherein the player provides said input by filling out a form when registering for a player tracking card.

39. The non-transitory computer readable medium as recited in claim 37, wherein the player provides said input by informing casino personnel of a desire to document the designated event.

40. The non-transitory computer readable medium as recited in claim 37, wherein the player provides said input by:
selecting one of a pre-determined list of a plurality of designated events that may occur during game play; and
providing an indication that documentation of the selected designated event is to be captured in response to detecting an occurrence of the selected designated event.

41. The non-transitory computer readable medium as recited in claim 40, wherein the plurality of instructions, when executed by the at least one processor, cause the at least one processor to operate with at least one input device to enable a player to add a player-defined event to the list of predetermined designated events.

42. The non-transitory computer readable medium as recited in claim 37, wherein the plurality of instructions, when executed by the at least one processor, cause the at least one processor to store the data including documentation of the designated event if the input has been received from a predetermined quantity of one or more players.

* * * * *